US007613768B2

(12) United States Patent
Harville et al.

(10) Patent No.: US 7,613,768 B2
(45) Date of Patent: Nov. 3, 2009

(54) METHOD AND SYSTEM FOR MANAGING A STREAMING MEDIA SERVICE

(75) Inventors: Michael Harville, Palo Alto, CA (US); Michele Covell, Palo Alto, CA (US); John Ankcorn, Palo Alto, CA (US); John Apostolopoulos, Palo Alto, CA (US); Sumit Roy, Menlo Park, CA (US); Bo Shen, Fremont, CA (US); Wai-tian Tan, Sunnyvale, CA (US); Susie Wee, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1082 days.

(21) Appl. No.: 10/698,685

(22) Filed: Oct. 30, 2003

(65) Prior Publication Data

US 2004/0236826 A1 Nov. 25, 2004

Related U.S. Application Data

(60) Provisional application No. 60/471,851, filed on May 19, 2003.

(51) Int. Cl.
  *G06F 15/16* (2006.01)
(52) U.S. Cl. .................. 709/203; 709/231; 709/233; 707/10
(58) Field of Classification Search .............. 709/231, 709/203, 233, 232, 10
  See application file for complete search history.

(56) References Cited

U.S. PATENT DOCUMENTS 5,583,995 A * 12/1996 Gardner et al. .............. 709/219
5,892,913 A * 4/1999 Adiga et al. ................ 709/219
5,937,388 A 8/1999 Davis et al.
5,996,025 A * 11/1999 Day et al. .................... 719/328

(Continued)

FOREIGN PATENT DOCUMENTS

EP    1035718 A1    9/2000

(Continued)

OTHER PUBLICATIONS

Marcus Brunnet A.O.—"Requirements for QoS Signaling Protocols"—Draft—Nov. 2001—pp. 1-27.

(Continued)

*Primary Examiner*—Ario Etienne
*Assistant Examiner*—Uzma Alam

(57) ABSTRACT

One embodiment of the invention includes a method for managing a streaming media service. The method includes receiving a request for a streaming media service from a client and the streaming media service includes a media service component. A service location manager is selected to which to provide the request from a plurality of service location managers. Additionally, a service provider is selected to which to assign the media service component from a plurality of service providers of a network. Furthermore, the service provider is informed of the assignment to perform the media service component. The service provider is caused to prepare to perform the streaming media service on streaming media. Moreover, information is used to determine whether to initiate a handoff of the streaming media service from the service provider to another service provider. If it is determined to initiate the handoff, the handoff is initiated.

40 Claims, 24 Drawing Sheets

U.S. PATENT DOCUMENTS

| | | | |
|---|---|---|---|
| 6,055,433 A | | 4/2000 | Yuan et al. |
| 6,058,424 A * | | 5/2000 | Dixon et al. ............... 709/226 |
| 6,101,547 A * | | 8/2000 | Mukherjee et al. .......... 709/231 |
| 6,141,693 A * | | 10/2000 | Perlman et al. ............. 709/236 |
| 6,263,371 B1 * | | 7/2001 | Geagan et al. .............. 709/231 |
| 6,442,165 B1 | | 8/2002 | Sitaraman et al. |
| 6,463,454 B1 | | 10/2002 | Lumelsky et al. |
| 6,484,212 B1 * | | 11/2002 | Markowitz et al. .......... 709/246 |
| 6,516,350 B1 | | 2/2003 | Lumelsky et al. |
| 6,529,950 B1 * | | 3/2003 | Lumelsky et al. ........... 709/218 |
| 6,665,706 B2 * | | 12/2003 | Kenner et al. ............... 709/203 |
| 7,039,784 B1 * | | 5/2006 | Chen et al. .................. 711/170 |
| 7,143,433 B1 * | | 11/2006 | Duan et al. ................. 725/115 |
| 7,353,277 B1 * | | 4/2008 | Carney ....................... 709/226 |
| 2002/0082015 A1 | | 6/2002 | Wu |
| 2002/0152305 A1 | | 10/2002 | Jackson et al. |
| 2002/0193110 A1 | | 12/2002 | Julka et al. |
| 2003/0046396 A1 | | 3/2003 | Richter et al. |

FOREIGN PATENT DOCUMENTS

WO    WO02/058396    7/2002

OTHER PUBLICATIONS

R. Bagrodia et al—"iMash: Interactive Mobile Application Session Handoff"—MOBISYS 2003—May 8, 2003—pp. 1-14.

Schulzrinne, H. et al., "RTP: A Transport Protocol for Real-Time Application.", http://www.ietf.org/rfc/rfc1889.txt, (Jan. 1996),1-75.

Schulzrinne, H. et al., "RFC 2326: Real Time Streaming Protocol (RTSP)", (Apr. 1998),1-92.

Sun, H. et al., "Architectures for MPEG Compressed Bitstream Scaling", (Apr. 1996),191-199.

"Internet Streaming Media Alliance Implementation Specification", Version1.0; Aug. 28, 2001; Internet Streaming Media Alliance (ISMA); 68 pages.

M. Handley, et al.; "SDP: Session Description Protocol"; copyright: The Internet Society (1998); Apr. 1998; 40 Pages.

Don Box, et al.; "Simple Object Access Protocol (SOAP) 1.1"; May 8, 2000; W3C; 35 pages.

H. Schilzrinne, et al., "Real Time Streaming Protocol (RTSP)"; copyright: The Internet Society (1998); Apr. 1998; 87 pages.

A. Babir, et al.; "OPES Use Cases and Deployment Scenarios draft-ietf-opes-scenarios-01" copyright: The Internet Society (2002); Aug. 5, 2002; 16 pages.

Takeshi Yoshimura, et al.; "Mobile Streaming Media CDN Enabled by Dynamic SMIL"; May 7-11, 2002; Honalulu, Hawaii; pp. 651-661.

Susie J. Wee, et al.; "Field-To-Frame Transcoding With Spatial and Temporal Downsampling"; IEEE International conference on Image Processing, Kobe, Japan, Oct. 1999; 5 pages.

Sumit Roy, et al.; "Application Level Hand-Off Support for Mobile Media Transcoding Sessions"; NOSSDAV 2002, May 12-14, 2002, Miami, Florda; 10 pages.

3GPP TS 26.244 V0.1.2 (Feb. 19, 2003); 3rd Generation Partnership Project: Technical Specification Group Services and System Aspects Transparent end-to-end packet switched streaming service (PSS); 3GPP file format (3GP) (Release 6).

3GPP TS 26.234 V5.0.0 (Mar. 2000); 3rd Generation Partnership Project: Technical Specification Group Services and System Aspects; Transparent end-to-end packet switched streaming service (PSS); Protocols and codecs (Release 5).

H. Schilzrinne, et al.; "Real Time Streaming Protocol (RTSP)"; copyright: The Internet Society (1998); Apr. 1998; 87 pages.

H. Schilzrinne, et al.; "RTP: A Transport Protocol For Real-Time Applications"; 70 pages.

A. Babir, et al.; "OPES Use Cases and Deployment Scenarios draft-ietf-opes-scenarios-01" copyright: The Internet Society (2002); Aug. 5, 2002; 16 pages.

Elan Amir, et al.; "An Active Service Framework and its Application to Real-Time Multimedia Transcoding"; available at www.net-tech.bbn.com/smtpkts/baltimore/index.html; 12 pages.

Michael Harville, et al.; "An Architecture for Componentized, Network-Based Media Services"; Hewlett-Packard Laboratories, Palo Alto, CA; 7 pages.

Michael Harville, et al.; "An Architecture for Componentized, Network-Based Media Services" Streaming Media Systems Group, HP Labs, Palo Alto, CA; 4 pages.

Sumit Roy, et al.; "IM Plementation of an Algorithm For Fast Down-Scale Transcoding of Compressed Video on the Itanium"; Hewlett-Packard Laboratories, Palo Alto, CA; 8 pages.

3GPP TS 26.244 V0.1.2 (Feb. 19, 2003); 3rd Generation Partnership Project: Technical Specification Group Services and System Aspects Transparent end-to-end packet switched streaming service (PSS); 3GPP file format (3GPP) (Release 6).

3GPP TS 26.234 V5.0.0 (Mar. 2000); 3rd Generation Partnership Project: Technical Specification Group Services and System Aspects Transparent end-to-end packet switched streaming service (PSS); Protocols and codecs (Release 5).

Roger Karrer, et al.; "Dynamic Handoff of Multimedia Streams"; Institute of Computer Systems, ETH Qurlich; 5 pages.

* cited by examiner

METHOD AND SYSTEM FOR MANAGING A STREAMING MEDIA SERVICE

RELATED APPLICATION

This application claims priority to the copending provisional patent application, Ser. No. 60/471,851, entitled "Architecture for Distributing and Managing Streaming Media Services" that was filed May 19, 2003, and assigned to the assignee of the present application, and is hereby incorporated by reference in its entirety.

BACKGROUND

There are networks wherein a client device can request delivery of a media file along with some processing done to that requested media file such as noise reduction. Once the request for media delivery and processing is received by a server, the media file is retrieved and then the requested processing is performed on that media file by the server. Once the processing is completely done, the server provides streaming delivery of the processed media file to the client device. However, there are disadvantages associated with this type of system.

For example, one of the disadvantages is that the user of the client device may have to wait quite a while if the server is trying to handle many separate requests for processing and streaming media files to different requesting client devices. Also, the streaming media file can be very large, and it can take a long time to complete the requested processing on the content prior to initiation of streaming delivery. This can be frustrating to the client device user especially if he or she is trying to complete something before a deadline.

For these and other reasons, there is a need for the present invention.

SUMMARY OF THE INVENTION

One embodiment of the invention includes a method for managing a streaming media service. The method includes receiving a request for a streaming media service from a client and the streaming media service includes a media service component. A service location manager is selected to which to provide the request from a plurality of service location managers. Additionally, a service provider is selected to which to assign the media service component from a plurality of service providers of a network. Furthermore, the service provider is informed of the assignment to perform the media service component. The service provider is caused to prepare to perform the streaming media service on streaming media. Moreover, information is used to determine whether to initiate a handoff of the streaming media service from the service provider to another service provider. If it is determined to initiate the handoff, the handoff is initiated.

DETAILED DESCRIPTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

Aspects of the present invention may be practiced on an intelligent device such as a computer system that includes, in general, a processor for processing information and instructions, random access (volatile) memory (RAM) for storing information and instructions, read-only (non-volatile) memory (ROM) for storing static information and instructions, a data storage device such as a magnetic or optical disk and disk drive for storing information and instructions, an optional user output device such as a display device (e.g., a monitor) for displaying information to the computer user, an optional user input device including alphanumeric and function keys (e.g., a keyboard) for communicating information and command selections to the processor, and an optional user input device such as a cursor control device (e.g., a mouse) for communicating user input information and command selections to the processor.

Figure 1:
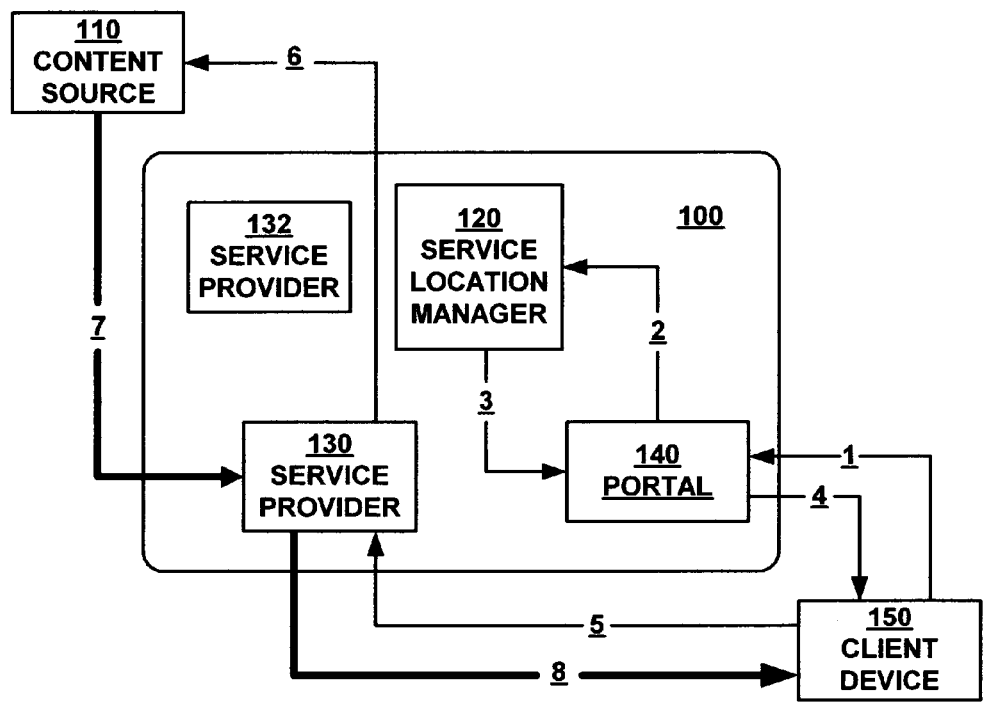
FIG. 1 is a block diagram showing information flow in and out of a system for servicing and delivering content to a client device according to one embodiment of the present invention.

FIG. 1 is a block diagram of a system 100 for servicing content from a content source 110 and for delivering the service result content to a client device 150 according to one embodiment of the present invention. In overview, a client device 150 seeking a service contacts system 100 (e.g., via portal 140). The client device 150 is redirected to a provider of the service (e.g., service provider 130). Content from a content source (e.g., content source 110) is sent (e.g., streamed) to the client device via the service provider. Thus, in one embodiment, system 100 is for streaming media from a content source to a client device.

For purposes of the present application, streaming media as used herein means data that is communicated between network nodes in a continual manner. Examples include streaming audio and video, which may have strict time constraints on delivery. In these examples, if portions of these streams are delivered too late, the portions will be ignored due to their tardiness, since they are too late to affect what is being played by the client application and are therefore largely useless. Alternatively, if portions of these streams are delivered too early, they will be lost due to buffer constraints within the service or client application. Other examples of data that is transmitted in a continual manner include streams of measurements, streams of financial information, and streams of experimental results. These types of streams include weather readings from remote sensors, temperature readings from cooling systems, and streams of recent stock transactions at a stock exchange. In these examples, there are no strict time constraints on the delivery; however, the data transmission has a temporal component that is best served by seamlessly ongoing transmissions.

As such, by using streaming media, service placement has a long-lived effect on resources of both the network and the server nodes. For example, in transcoding a movie for viewing under streaming conditions, the data may span as much as two hours and therefore the transcoding session may span as much as two hours of the server time. For other types of streaming (e.g., instrument readings), the duration of the stream and of the service being done on the stream can be effectively never-ending. The computational resources of the server node are affected for long periods of time with uncertain durations. Similarly, the network resources at the server node, on all the links between the server and the content provider, and between the server and the client machine, will be affected for long periods of time with uncertain durations. This is in marked contrast to more classic network transactions in which the data transfer is done in a block, often in a small number of seconds or minutes and in which the service performed on that data has a constrained duration.

In an embodiment that deals with streaming media, the following are some of the issues that need to be considered; that is, in comparison to web-based distribution, and web-based business transactions and/or downloads, streaming media has the following characteristics that need to be addressed:

a large amount of data: the end point of the data may not be known, and caching of a number of items of content can consume significant memory resources;

time-ordered data: the temporal order in which data is received can be important;

access may not be carried through to completion: for example, only some portion of an item of content may be accessed (e.g., the first couple of minutes of a full-length movie);

bandwidth needed cannot be determined without some degree of understanding of the subject media: for example, one video file may be at a high spatial resolution, and another video file may not, and so while the files, both being video files, may appear to be the same, their respective bandwidth may be quite different;

fluctuations in latency or bandwidth can be problematic: a consistent latency may be acceptable, but latency that varies considerably during a session can be problematic because of buffer overflow or underflow;

inadequate computation or bandwidth resources can make results useless due to time constraints;

data is typically encoded (compressed), and so loss or lateness of some part of the data can have consequences on subsequent data decoding (decompression);

lost data is not typically retransmitted due to time constraints; and a record of state should be maintained for all client devices: for streaming media, the streaming node needs to continue streaming data, and cannot wait to receive state information from clients.

The result of these differences is to greatly increase the need for management and monitoring of services performed on streaming media.

In the present embodiment, system 100 includes a service location manager 120, a plurality of service providers exemplified by a service provider 130 and service provider 132, and a portal 140. The service location manager 120, the service providers 130 and 132, and the portal 140 are logical entities that can be implemented on a single device or using multiple devices. Thus, system 100 can be representative of, for example, a single computer system that implements the functionality of service location manager 120, service providers 130 and 132, and portal 140. Alternatively, system 100 can encompass different nodes or devices in a computer system network. These nodes may be server computer systems, switches, routers or the like, having processing and memory capabilities sufficient to perform the various functionalities to be described herein. Generally speaking, the functionality provided by system 100 can be implemented using one or more devices. Furthermore, although system 100 is described for a single service location manager 120 and portal 140, there can be more than one of any of those elements. In addition, there can be more than two service providers.

System 100 can be implemented in an existing computer system network by overlaying the functionality of service location manager 120, service providers 130 and 132, and/or portal 140 onto the existing network. That is to say, all or a part of the functionality provided by system 100 can be incorporated into existing network nodes. Alternatively, all or part of system 100 can be implemented by adding nodes into an existing network. For example, existing content sources and portals may be used, with nodes added for servicing content and for managing service providers.

In the present embodiment, system 100 can communicate with a content source 110 and a client device 150. Although described for a single content source 110 and client device 150, there can be more than one of each of those elements. Communication between system 100, content source 110 and client device 150, as well as communication within system 100, can be wireless.

Portal 140 is a well-published portal site that serves as the first point of contact between client device 150 and system 100. Content source 110 is the source of the item of content.

Client device 150 can be virtually any kind of user device such as, but not limited to, a desktop or laptop computer system, or a video-enabled handheld computer system (e.g., a portable digital assistant) or cell phone. In general, client device 150 is used to request and subsequently receive an item of content.

An item of content refers to media or non-media data that can be live or recorded. An item of content can include, but is not limited to, video-based data, audio-based data, image-based data, web page-based data, graphic data, text-based data or some combination thereof. For example, an item of content can be a movie of digital video disk (DVD) quality.

A type of service may need to be performed on the item of content before the content is provided to client device 150. Types of services can include the processing of an item of content and/or the analysis of an item of content. For example, types of services can include video processing such as, but not limited to, transcoding, jitter removal, dynamic clipping and cropping based on facial recognition, video analysis, resizing of the video, optical character reading from video, background removal, and the like. Additionally, types of services can include audio processing such as, but not limited to, background removal, audio enhancement, audio speed up or slow down, audio enhancement, noise reduction, speech recognition, audio analysis, and the like. The analysis of an item of content can include, for example, speech recognition that produces a text transcript, or optical character recognition applied to one or more video images of a video stream to produce a text output. A video-based person tracking service that outputs a stream of records of person location and times is another example that can be used to illustrate analysis of an item of content. The locations might be expressed in terms of image coordinates, but may be more useful when expressed in terms of physical world coordinates (e.g., "x,y" coordinates referenced to the floor of a room). Another example that can be used to illustrate an analysis of an item of content pertains to a face detector service that outputs snapshots of faces extracted from a video stream, the times and image locations at which the snapshots were detected, identities for the faces, and/or the classification of the faces. Some portion of this information can be represented as text data.

As used herein, an item of content may have been serviced, may be in the process of being serviced, may not be serviced, or may not yet be serviced. In other words, an item of content, whether serviced or not, can still be referred to as an item of content. Servicing of an item of content can include the analysis or processing of an item of content. When necessary for clarity of discussion, the result of servicing an item of content is referred to herein using terms such as "service result" or "service result content" or "service result data." Service result content may consist of: a modified version of the original serviced item of content (e.g., when background removal is applied to a video stream); an item of content that is derived from the original item of content (e.g., when optical character recognition is used to produce text output); an item of content that is passed through a service provider and is not modified but merely forwarded (e.g., content that does not require transcoding when received by a transcoding service provider); or an item of content that has been previously sent to a service provider and is now cached/stored on the service provider (e.g., content that was previously serviced and is now stored in memory at the service provider). Additionally, service result content may consist of any combination of the above examples.

Continuing with reference to FIG. 1, services such as those described above are performed by service providers 130 and 132. Service providers 130 and 132 each function to provide one or more types of service. That is, service providers 130 and 132 can each provide multiple and different types of services. For example, service provider 130 can be used for transcoding one item of content and for background removal of another item of content. Different types of services can be performed in parallel on different items of content. That is, service providers 130 and 132 can perform a service on different but concurrent content streams. Service providers 130 and 132 can also provide caching services. For example, service provider 130 or 132 can cache an item of content, in whole or in part, before the item of content is serviced by service provider 130 or 132. Similarly, service provider 130 or 132 can cache the service result, in whole or in part, before the service result content is forwarded to the client device 150.

Service location manager 120 functions to select a service provider (e.g., service provider 130 or 132) that can perform the type of service that may need to be performed on an item of content before the service result is provided to the client device 150. Service providers 130 and 132, and any other available service providers, are known to service location manager 120. In one embodiment, service location manager 120 maintains a record or listing of the service providers known to service location manager 120. The type or types of services that each service provider can perform, or can be made to perform, are also known to and recorded by service location manager 120.

In one embodiment, the resources associated with the service providers 130 and 132 are also known to and recorded by service location manager 120. The resources associated with service providers 130 and 132 can include computational or hardware resources, such as but not limited to the processor speed and total memory capacity associated with each of the service providers. The resources associated with service providers 130 and 132 can also include network resources, such as but not limited to the total bandwidth available at each of the service providers for receiving content and for sending content. In general, in one embodiment, service location manager 120 has knowledge of the total capacities of service providers 130 and 132.

In another embodiment, the resources available at each of the service providers 130 and 132 are known to and recorded by service location manager 120. That is, resources available may be less than total capacity.

In yet another embodiment, when service location manager 120 receives a request for an item of content that entails performing a service on the item of content, the service location manager 120 makes a prediction or estimate of the resources needed to perform that service. When a service provider is selected, the record can be revised to reflect that the resources associated with the selected service provider are at least partially allocated to performing the service at hand. For example, if the service is expected to require N megabytes of memory in service provider 130, then the record is updated to indicate that, for service provider 130, N megabytes of memory have been allocated. Alternatively, the amount of memory recorded by service location manager 120 for service provider 130 can be reduced by N megabytes. As will be seen, the record of resources associated with a service provider can be similarly adjusted (e.g., increased) when, for example, a service is completed by a service provider.

As mentioned previously, there can be multiple client devices, each participating in a session (e.g., each requesting an item of content) that may require a service. For each session handled by service location manager 120 in which an item of content is to be serviced, service location manager 120 will select a service provider to perform the service. The various embodiments of the methodology described above are applied to each session in progress, so that service location manager 120 has an updated record of the resources allocated and/or the resources available for each service provider known to service location manager 120.

In essence, according to one embodiment, service location manager 120 has a budget of resources available to perform services. More specifically, service location manager 120 has a budget of the resources available at each service provider. For each session requesting that a service be performed, an estimate of the resources needed for that service can be made. For each session dispatched to a service provider, the budget of available resources for that service provider can be reduced by the estimate. As sessions are terminated, or as services are completed, the budget of available resources can be increased to reflect that resources have become available again. The budget is thereby relatively current, and can be used as the basis for selecting a service provider for each new session.

Note that, in alternative embodiments, a service provider can be selected to perform a service based on the resources available for each service provider or based on the resources already allocated, without regard to the estimate of resources needed to perform that service, or a service provider can be selected to perform a service based on the estimate of resources needed to perform that service, without regard to the resources available or previously allocated for each service provider.

System 100 in operation is now more fully described. At the beginning of a session, client device 150 sends message 1 to portal 140. Message 1 identifies a particular item of content (e.g., the name of a movie).

Also, in one embodiment, message 1 includes information sufficient for identifying a type of service that should be performed on the item of content before the service result is delivered to client device 150. That information can take many forms. In one form, message 1 specifically identifies a type of service (e.g., background removal or speech recognition). In another form, message 1 identifies attributes of client device 150, such as its memory capacity, screen size, processing capability and the like. Based on these attributes, system 100 (e.g., portal 140) can derive a type of service that should be performed (e.g., transcoding). In yet another form, message 1 identifies the type of client device 150, and based on stored knowledge of that type of device, system 100 (e.g., portal 140) can derive a type of service that should be performed (e.g., transcoding).

Message 1 can include other information. If the source of the item of content is known by client device 150, then the content source can also be identified in message 1. For example, message 1 can include the Uniform Resource Locator (URL) for content source 110. If the source of the item of content is not known to client device 150, the content source can be located by system 100 (e.g., by portal 140) if that information is not already known to system 100.

After receiving message 1, portal 140 sends message 2 to service location manager 120. In one embodiment, message 2 includes information sufficient for identifying a type of service that should be performed on the item of content before the service result is delivered to client device 150. As just described, that information can take many forms. In one form, message 2 specifically identifies a type of service (e.g., background removal or speech recognition). In another form, message 2 identifies attributes of client device 150, such as its memory capacity, screen size, processing capability and the like. Based on these attributes, system 100 (e.g., service location manager 120) can derive a type of service that should be performed (e.g., transcoding). In yet another form, message 2 identifies the type of client device 150, and based on stored knowledge of that type of device, system 100 (e.g., service location manager 120) can derive a type of service that should be performed (e.g., transcoding). Based on the information provided by message 2, service location manager 120 identifies the type of service to be performed.

Message 2 can include other information. For example, message 2 can also identify the item of content and/or the content source.

In one embodiment, service location manager 120 maintains a record that includes a list of the service providers 130 and 132 and the services they are capable of providing. In one such embodiment, the record maintained by service location manager 120 also includes the total resource capacities associated with the service providers 130 and 132. The record maintained by service location manager 120 can also include the resources that are available at each of the service providers 130 and 132. The record maintained by service location manager 120 can also include the resources for each of the service providers 130 and 132 that have been previously allocated to other sessions.

Service location manager 120 selects either service provider 130 or 132 to perform the service identified from message 2. In one embodiment, service location manager 120 selects a service provider based on the information provided in the record described above. For example, service location manager 120 can select a service provider based on which service provider has the least amount of resources being utilized or the greatest amount of resources available.

In another embodiment, service location manager 120 estimates the amount of resources associated with performing the service identified in message 2, and uses the estimate to select either service provider 130 or 132 to perform the service.

Alternatively, service location manager 120 can select a service provider to perform a service based on both the amount of resources available to the various service providers (or the amount of resources previously allocated) and the amount of resources estimated to be consumed by performing the service.

In the example of FIG. 1, service location manager 120 selects service provider 130. The aforementioned service provider record is updated by service location manager 120 to reflect the selection of service provider 130. In one embodiment, the amounts of the various resources associated with service provider 130 are reduced by the estimated amount of resources expected to be used to perform the service (or the amount of resources allocated is increased).

Also, service location manager 120 sends message 3 to portal 140. Message 3 includes information sufficient for locating and contacting service provider 130. For example, message 3 can include the URL for service provider 130.

Message 3 can include other information. For example, message 3 can also identify the item of content and/or the content source.

After receiving message 3, portal 140 sends message 4 to client device 150. Message 4 includes the information for locating and contacting service provider 130 that was provided by message 3. Message 4 can be identical to message 3 (message 4 may simply be a forwarding of message 3). However, message 4 can include other (additional) information added by portal 140. For example, message 4 can also identify the item of content and/or the content source if that information is determined by portal 140 instead of service location manager 120.

In an alternate embodiment, in lieu of messages 3 and 4, service location manager 120 sends a message directly to client device 150. The message from service location manager 120 to client device 150 includes the information for locating and contacting service provider 130. The message can include other information such as the identity of the item of content and/or the content source.

In any case, client device 150 receives a message that includes information sufficient for locating and contacting service provider 130. Based on that information, communication is established between client device 150 and the service provider 130. In other words, the session initiated by client device 150 is automatically transferred from portal 140 to service provider 130. Importantly, the transfer from portal 140 to service provider 130 is seamless and transparent to an end user at client device 150.

In one embodiment, the message received by client device 150 (e.g., message 4) uses or is based on Synchronized Multimedia Integration Language (SMIL). Redirection of client device 150 from portal 140 to service provider 130 can be accomplished using dynamic SMIL rewriting.

Continuing with the example in view of FIG. 1, after receiving message 4 from portal 140 (or an equivalent message from service location manager 120), client device 150 sends message 5 to service provider 130. Message 5 identifies the item of content and the type of service to be performed by service provider 130. Message 5 can include other information. For example, if the content source is known at this point to client device 150, that information can be included in message 5.

Upon receiving message 5, service provider 130 sends message 6 to content source 110. As mentioned above, content source 110 can be identified to service provider 130 in message 5. Otherwise, service provider 130 can locate content source 110. In message 6, service provider 130 requests that the item of content be provided.

In response to message 6, content source 110 sends the item of content to service provider 130 for servicing (illustrated by arrow 7 in FIG. 1). In one embodiment, the item of content is streamed to service provider 130.

In one embodiment, service provider 130 is always set up and ready to execute the specified service. That is, the specified service can be continuously executing on service provider 130, waiting for data to operate on. In another embodiment, the specified service is quiescent until either message 5 or the item of content is received by service provider 130. That is, service provider 130 may need to set up or start up the specified service, and will not do so until the potential need for the service is identified or until there is an actual need to perform the service.

In any case, service provider 130 can then perform the specified service on the item of content. The item of content can be cached by service provider 130 in whole or in part before servicing, or the item of content can be serviced as it is received by service provider 130.

The service result content is then sent by service provider 130 to client device 150 (illustrated by arrow 8 in FIG. 1). In one embodiment, the service result content is streamed to client device 150. The service result content can be cached by service provider 130 in whole or in part after servicing (before streaming), or the service result content can be streamed as it is serviced by service provider 130.

Once the service result content has been delivered by the selected service provider (e.g., service provider 130) and received by client device 150, the ongoing session can be terminated. Accordingly, the service provider history or record maintained by service location manager 120 can be updated to reflect that the service provider 130 has completed its servicing tasks or that the session has been terminated. The record can also be updated to show that resources allocated to performing the service are available again. For example, the amount of available resources recorded for service provider 130 can be increased.

Different approaches can be used to prompt an update of the record. In one approach, at or around the time that the service location manager 120 is making a selection of a service provider, the service location manager 120 estimates the amount of time needed to complete the service to be performed on the item of content. The record can be updated to reflect that the service has been completed when that amount of time has passed. Alternatively, the selected service provider (e.g., service provider 130) can indicate to service location manager 120 when it has completed a service, and the record can be updated accordingly. These approaches can be extended to account for the delivery of the service result content to client device 150. For example, the amount of time estimated by the service location manager 120 for service provider 130 to perform the service can be increased to account for any additional time needed by service provider 130 to send the service result content to client device 150. Similarly, service location manager 120 can estimate the length of time that the session is expected to last (e.g., if the item of content is a movie that lasts two hours, the session may be estimated as lasting about two hours). Alternatively, service provider 130 can indicate to service location manager 120 when it has completed sending the service result content to client device 150.

In the discussion above, the item of content is sent to service provider 130 in response to message 6. As mentioned previously herein, service provider 130 can instead store or cache content previously received and/or serviced, obviating the use of message 6 and the response to message 6 (e.g., obviating the data flow indicated by arrow 7 in FIG. 1).

Figure 2A:
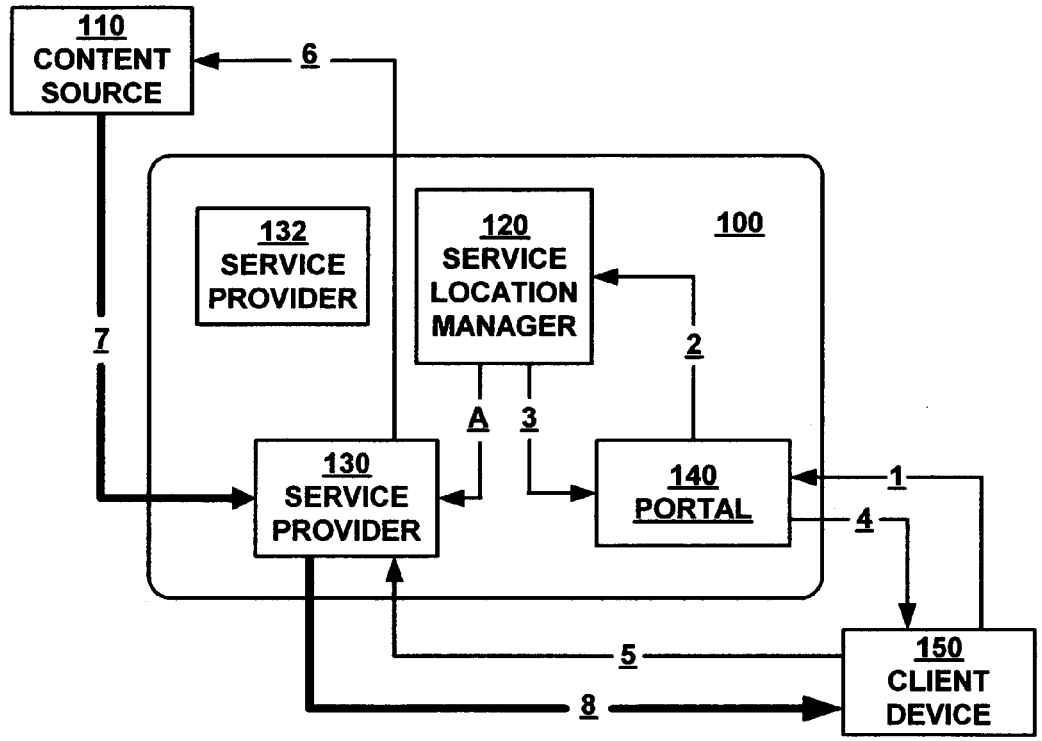
FIG. 2A is a block diagram showing information flow in and out of a system for servicing and delivering content to a client device according to another embodiment of the present invention.

FIG. 2A is a block diagram showing information flow in and out of system 100 according to another embodiment of the present invention. A difference between FIG. 1 and FIG. 2A is the addition of message A from service location manager 120 to the selected service provider (e.g., service provider 130). The message A can be sent from service location manager 120 to service provider 130 at any time after message 2 and before message 5.

Message A can be used for any number of different purposes. For example, in a situation in which the type of service to be performed on the specified item of content is not continuously executing on service provider 130, message A can be used to alert service provider 130 to the approaching need for the service. Consequently, the set up and/or start up of the service can be initiated and perhaps completed before message 5 is received from client device 150, reducing overall latency.

Also, message A can be used to provide to service provider 130 the identity of the item of content and perhaps the identity of the content source 110. With this information, service provider 130 can request content source 110 to provide (e.g., begin streaming) the item of content before message 5 is received, further contributing to a reduction in latency. In addition, the use of message A in this manner can result in improved security, because the content source 110 does not have to be identified to the client device 150, for example.

Figure 2B:
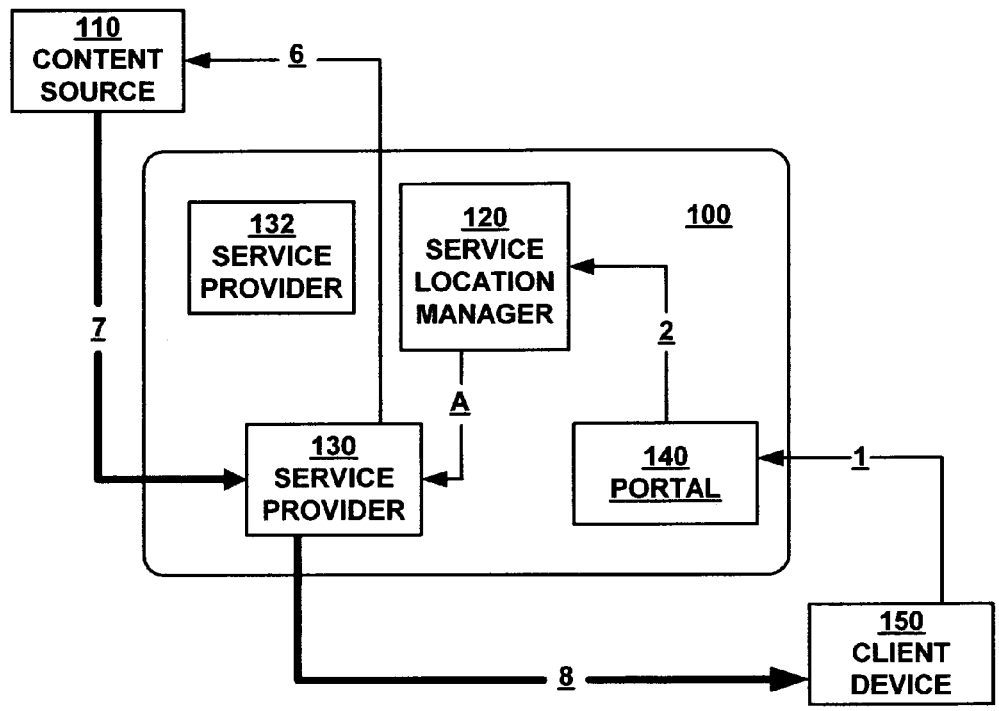
FIG. 2B is a block diagram showing information flow in and out of a system for servicing and delivering content to a client device according to yet another embodiment of the present invention.

Furthermore, message A can be used in lieu of messages 3, 4 and 5, as illustrated by FIG. 2B. For instance, in addition to identifying the item of content and perhaps the content source, message A can also include information enabling service provider 130 to establish communication with client device 150. In other words, instead of having client device 150 initiate the transfer of communication from portal 140 to service provider 130, the transfer of communication can be initiated by service provider 130 in a manner that is still seamless and transparent to a user of client device 150.

Figure 3:
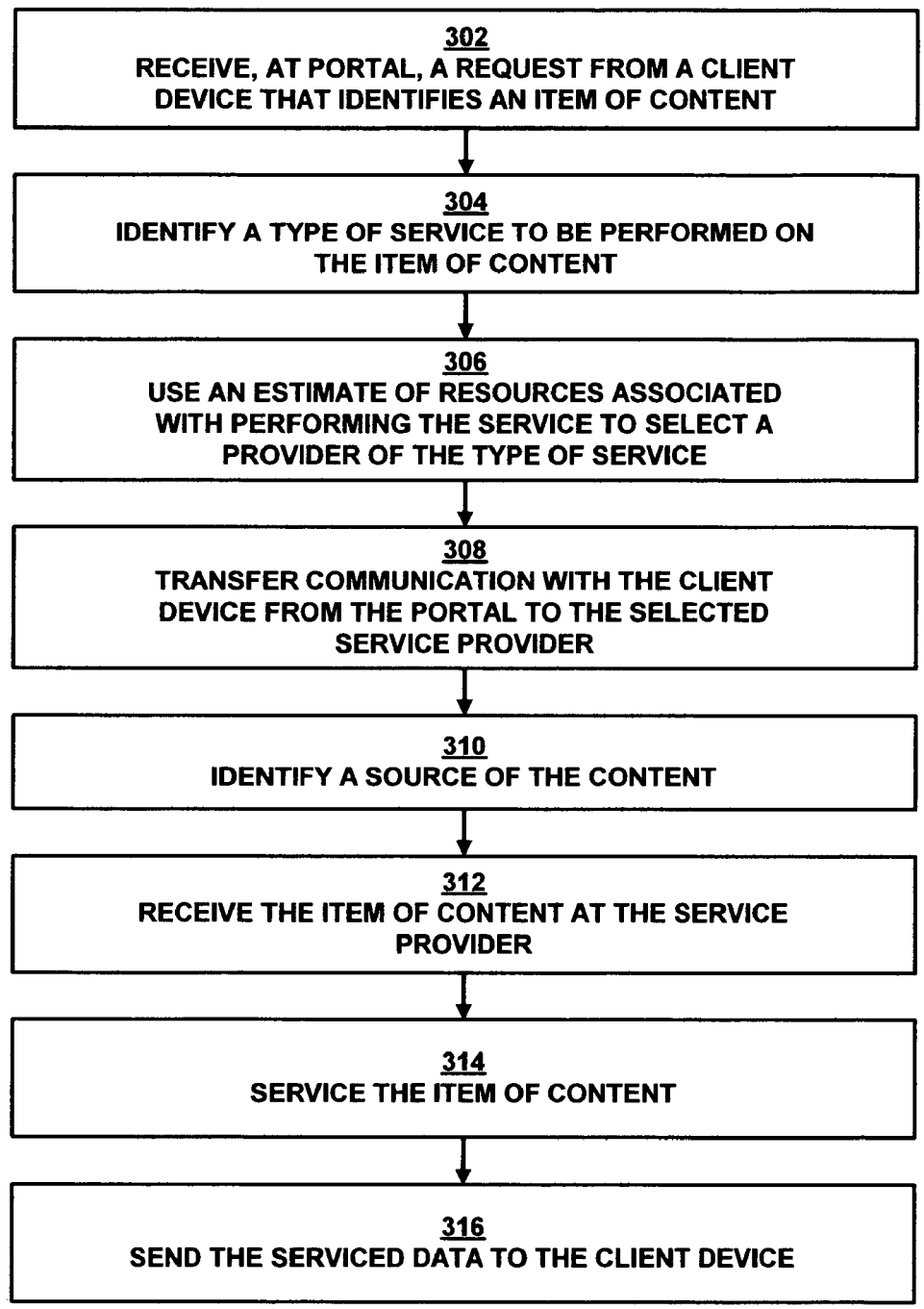
FIG. 3 illustrates a method for servicing and delivering content according to one embodiment of the present invention.

FIG. 3 is a flowchart 300 of a method for servicing and delivering service result content according to one embodiment of the present invention. Although specific operations are disclosed in flowchart 300, such operations are exemplary. That is, embodiments of the present invention are well suited to performing various other operations or variations of the operations recited in flowchart 300. It is appreciated that the operations in flowchart 300 may be performed in an order different than presented, and that not all of the operations in flowchart 300 may be performed.

All of, or a portion of, the methods described by flowchart 300 can be implemented using computer-readable and computer-executable instructions which reside, for example, in computer-usable media of a computer system or like device. In the present embodiment, flowchart 300 is implemented by system 100 of FIGS. 1, 2A and 2B. That is, some of the operations recited in flowchart 300 are performed by portal 140, others by service location manager 120, and yet others by service provider 130 of FIGS. 1, 2A and 2B.

In operation 302 of FIG. 3, during a session with a client device, a portal receives a request from the client device, identifying an item of content. The request can include other information. In one embodiment, with reference to FIGS. 1, 2A and 2B, portal 140 receives message 1 from client device 150.

In operation 304 of FIG. 3, a type of service to performed on the item of content is identified. The type of service can be identified in the request of operation 302, or it can be derived based on information provided in that request. Referring to FIGS. 1, 2A and 2B, the type of service can be identified by the client device 150, by the portal 140, or by the service location manager 120.

In operation 306 of FIG. 3, in one embodiment, an estimate of the amount of resources associated with performing the service is made. The estimate can include, for example, the amount of computational and/or network resources associated with performing the service. The estimated resources associated with performing the service can be used to select a service provider.

In one embodiment, a record is maintained of the amount of resources available at each of the service providers (or of the amount of each service provider's resources already allocated to other sessions in progress). A service provider can be selected by selecting the service provider with the most resources available or the least resources in use, for example. Alternatively, the combination of the resource estimate and the record of available/allocated resources can be used to select a service provider. In general, a service provider with enough resources available to perform the service can be selected to perform the service. When more than one service provider has sufficient resources available, the selection of a service provider can be made using a secondary selection scheme such as a round-robin scheme.

Concurrent with or subsequent to the selection of a service provider, the record of service provider resources can be updated, based on the selected provider performing the service. That is, once a service provider has been selected, the record can be updated to reflect a change to the resources associated with the selected service provider, assuming that the service provider is going to perform the service. For example, the amount of resources recorded for the selected service provider can be reduced by the estimate of resources needed to perform the service.

In operation 308 of FIG. 3, communication with the client device is transferred from the portal to the selected service provider. In other words, the session is transferred from the portal to the selected service provider.

In operation 310, a source of the item of content is identified. Referring to FIGS. 1, 2A and 2B, the source of the item of content can be identified by the client device 150, by the portal 140, by the service location manager 120, or by the selected service provider (e.g., service provider 130). The content source is then contacted to begin delivery of data for the item of content to the selected service provider.

In operation 312 of FIG. 3, the item of content is received by (e.g., streamed to) the selected service provider.

In operation 314, the item of content is serviced according to the specified type of service. Data constituting the item of content can be serviced as the data are received at the service provider, or the data can be cached before servicing. As mentioned above, an item of content may have been serviced, may be in the process of being serviced, may not be serviced, or may not yet be serviced. Servicing of an item of content can include the analysis or processing of an item of content. Service result content may consist of: a modified version of the original serviced item of content (e.g., when background removal is applied to a video stream); an item of content that is derived from the original item of content (e.g., when optical character recognition is used to produce text output); an item of content that is passed through a service provider and is not modified but merely forwarded (e.g., content that does not require transcoding when received by a transcoding service provider); or an item of content that has been previously sent to a service provider and is now cached/stored on the service provider (e.g., content that was previously serviced and is now stored in memory at the service provider). Additionally, service result content may consist of any combination of the above examples.

In one embodiment, the service is executed continuously by the service provider. In another embodiment, the service is not set up or does not start operating until the client device establishes communication with the service provider. In yet another embodiment, the service is set up and/or starts up after the service provider is identified by the service location manager, before the client device establishes communication with the service provider. For example, with reference to FIGS. 2A and 2B, after service location manager 120 selects service provider 130 as a provider of the specified type of service, a message A is sent to service provider 130, causing service provider 130 to set up and/or start up the service.

In operation 316 of FIG. 3, the service result content is sent (e.g., streamed) to the client device. The data constituting the service result can be sent as the input data are serviced, or the service result data can be cached before it is sent.

The operations 312, 314 and 316 can be performed concurrently. That is, the selected service provider (e.g., service provider 130 of FIGS. 1, 2A and 2B) can begin servicing the item of content before the entire item of content is received at service provider 130, and service result data can begin to flow out of service provider 130 before the servicing of the entire item of content is completed. Similarly, the servicing of one portion of an item of content can be in progress while the result of servicing another portion of the item of content is being received by the client device.

When the service result content is delivered to client device 150, the session can be terminated.

Also, once the session is terminated, or upon the service provider completing the service, the service provider record maintained by service location manager 120 can be updated. In other words, when a service is completed or a session is terminated, the resources associated with performing the service are now available for use in another session, and the record can be updated to reflect that. For example, the amount of resources recorded for the selected service provider can be increased by the appropriate amount once the selected service provider has performed the service or once the session has been terminated.

Figure 4:
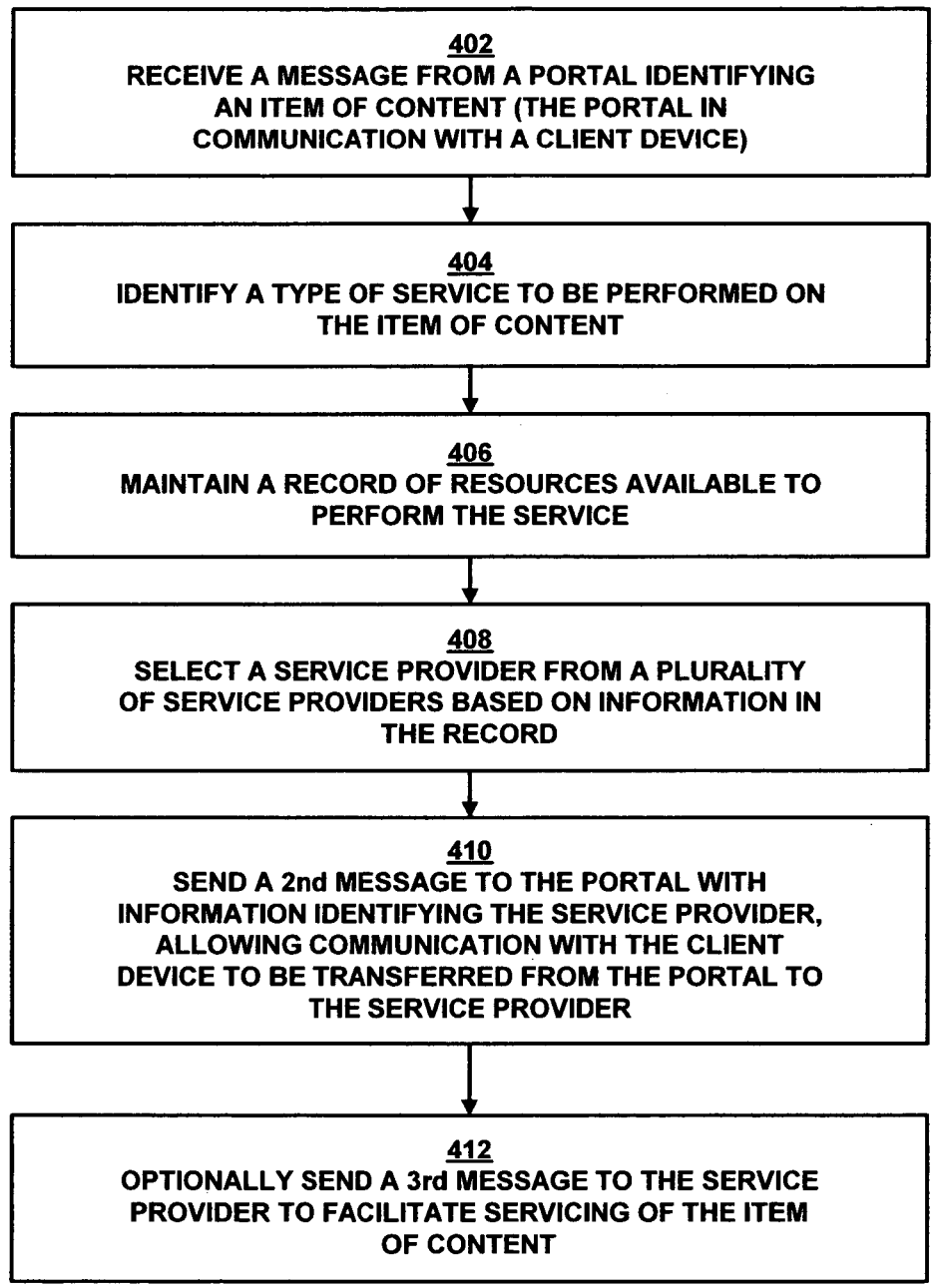
FIG. 4 illustrates a method for managing the servicing of content according to one embodiment of the present invention.

FIG. 4 is a flowchart 400 of a method for managing the servicing of content according to one embodiment of the present invention. Although specific operations are disclosed in flowchart 400, such operations are exemplary. That is, embodiments of the present invention are well suited to performing various other operations or variations of the operations recited in flowchart 400. It is appreciated that the operations in flowchart 400 may be performed in an order different than presented, and that not all of the operations in flowchart 400 may be performed.

All of, or a portion of, the methods described by flowchart 400 can be implemented using computer-readable and computer-executable instructions which reside, for example, in computer-usable media of a computer system or like device. In the present embodiment, flowchart 400 is implemented by system 100 of FIGS. 1, 2A and 2B. Specifically, flowchart 400 is implemented by service location manager 120 of FIGS. 1, 2A and 2B.

In operation 402 of FIG. 4, referring also to FIGS. 1, 2A and 2B, a first message (e.g., message 2) is received from portal 140, identifying an item of content. Portal 140 is in communication with client device 150.

In operation 406 of FIG. 4, in one embodiment, a record is maintained of the resources available to perform the service, as previously described herein. More specifically, a record can be maintained that identifies each of the service providers known to service location manager 120 (FIGS. 1, 2A and 2B). The record can also identify the available resources associated with each of those service providers, or the amount of each service provider's resources already allocated to other sessions in progress. In another embodiment, an estimate of the resources needed to perform the service can be made.

In operation 408 of FIG. 4, in one embodiment, the information in the aforementioned record is used to select a service provider, as previously described herein. In another embodiment, the estimate of the resources needed to perform the service is used to select a service provider. In yet another embodiment, the combination of the record information and the resource estimate is used to select a service provider.

In operation 410 of FIG. 4, in one embodiment, a second message (e.g., message 3 of FIGS. 1, 2A and 2B) is sent to the portal. In another embodiment, the second message is sent to the client device, bypassing the portal. The second message includes information that identifies the selected service provider, allowing communication between the client device to be transferred from the portal to the service provider (e.g., from portal 140 to service provider 130 of FIGS. 1, 2A and 2B).

In operation 412 of FIG. 4, in one embodiment, a third message (e.g., message A of FIGS. 2A and 2B) is sent to the selected service provider. The third message can include the identity of the item of content and/or the identity of the content source. The third message can also be used to alert the service provider, allowing the service provider to begin setting up and/or executing the service (if the service is not already executing). In response to the third message, the service provider can also contact the content source, to initiate delivery (e.g., streaming) of the item of content from the content source to the service provider. In lieu of a third message, the activities just described can begin in response to the client device and the service provider establishing communication. Service result content is then sent (e.g., streamed) from the service provider to the client device.

In summary, embodiments of the present invention provide methods and systems that can provide services to a large number of diverse client devices. A variety of services are provided to accommodate the preferences and requirements of the diverse clients. To avoid congestion, the services are provided by a number of service providers managed by a service location manager. A service provider is selected to perform services based on its capacities. Also, a service provider can be selected based on the amount of resources associated with performing the service versus the remaining resources available at the service provider. Items of content requested by the client devices are directed to the selected service provider for servicing.

However, the client devices need only contact a well-published portal site to begin a session and to request items of content. The client devices are automatically and transparently transferred to the selected service provider during the session. From the perspective of the client device, there is a single point of contact. Transparent to the client device is the flow of messages and data through the content delivery system that results in the delivery of service result content to the client device via a service provider selected by the system.

Transparent to the end user at the client device is the seamless transfer of the session from the initial point of contact to the selected service provider.

Figure 5:
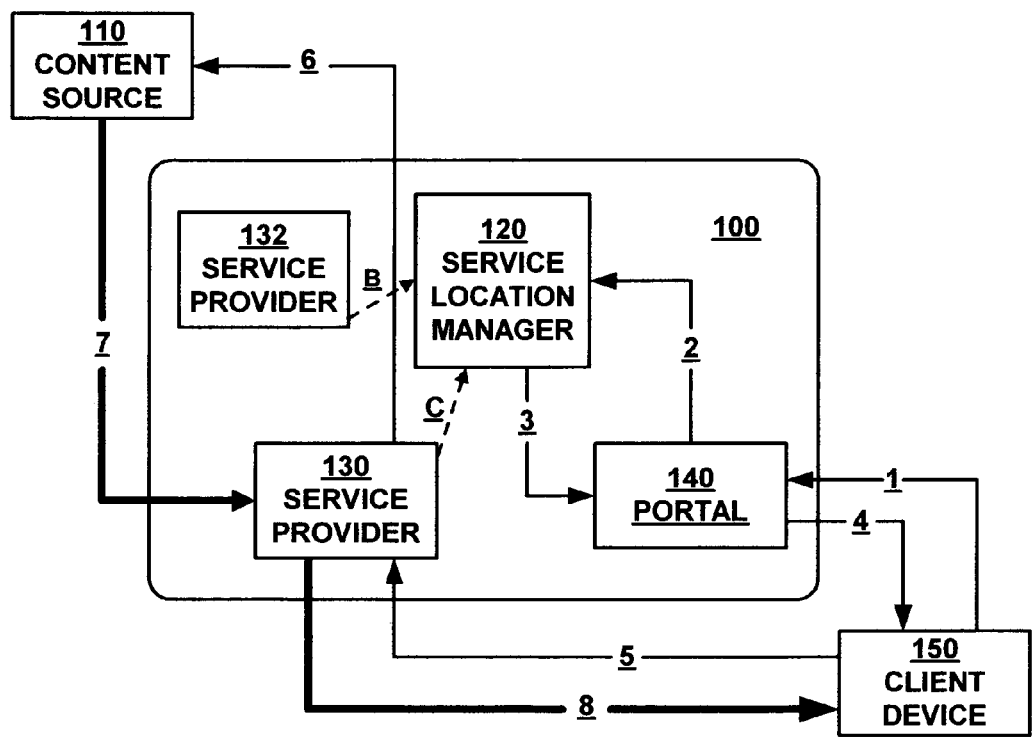
FIG. 5 is a block diagram showing information flow in and out of a system for servicing and delivering content based on resource availability according to another embodiment of the present invention.

Systems and Methods for Selecting Media Service Providers Based on Static Resource Information FIG. 5 is a block diagram of a system 100 for servicing content supplied by a content source 110 and for delivering the service result content to a client device 150 according to one embodiment of the present invention. According to one embodiment of the present invention, service location manager (SLM) 120 can select a service provider (e.g., 130 and 132) based on static resource information. For purposes of the present application static resource information is comprised of known network and service provider characteristics that includes but is not limited to, computational and memory resources of network coupled devices, expected bandwidth/latency between servers, dispatch history, network proximity, session information (e.g., session initiation and termination information) and client/content addresses. In addition, according to some embodiments special purpose hardware (e.g., encryption or compression) will be known, allowing the SLM 120 to take into account characteristics of the special purpose hardware in its selection of suitable service providers. According to one embodiment, service providers under the control of the SLM 120 can transmit information to the SLM 120 that indicates that a session has been initiated and terminated. This information allows the SLM 120 to adapt its selection of a service location (e.g., service provider) to coincide with available resources, without relying on measurement collection. FIG. 5 shows content source 110, service provider 132, service location manager 120, service provider 130, portal 140 and client device 150.

Messages B and C represent (shown in FIG. 5) information transmissions sent from the service providers (e.g., 130 and 132) to SLM 120 that indicate that a service session has been initiated and terminated. This information provides the SLM 120 with useful data regarding the computational resources used in previous service sessions, and provides an accurate view of service provider (e.g., 130 and 132) resource state.

The service location manager (SLM) 120, the service providers 130 and 132, and the portal 140 are logical entities that can be implemented on a single device or using multiple devices. Thus, system 100 can be representative of, for example, a single computer system that implements the functionality of SLM 120, service providers 130 and 132, and portal 140. Alternatively, system 100 can encompass different nodes or devices in a computer system network. These nodes may be server computer systems, switches, routers or the like, having processing and memory capabilities sufficient to perform the various functionalities to be described herein. Generally speaking, the functionality provided by system 100 can be implemented using one or more devices. Furthermore, although system 100 is described for a single service location manager 120 and portal 140, there can be more than one of any of those elements. In addition, there can be more than two service providers (e.g., 130 and 132).

System 100 can be implemented in an existing computer system network by overlaying the functionality of SLM 120, service providers 130 and 132, and/or portal 140 onto the existing network. That is to say, all or a part of the functionality provided by system 100 can be incorporated into existing network nodes. Alternatively, all or part of system 100 can be implemented by adding nodes into an existing network. For example, existing content sources and portals may be used, with nodes added for servicing content and for managing service providers.

In the present embodiment, system 100 can communicate with a content source 110 and a client device 150. Although described for a single content source 110 and client device 150, there can be more than one of each of those elements. Communication between system 100, content source 110 and client device 150, as well as communication within system 100, can be wireless.

Client device 150 can be virtually any kind of user device such as, but not limited to, a desktop or laptop computer system, or a video-enabled handheld computer system (e.g., a portable digital assistant) or cell phone. In general, client device 150 is used to request and subsequently receive an item of content.

An item of content refers to media or non-media data that can be live or recorded. An item of content can include, but is not limited to, video-based data, audio-based data, image-based data, web page-based data, graphic data, text-based data or some combination thereof. For example, an item of content can be a movie of digital video disk (DVD) quality.

A type of service may need to be performed on the item of content before the content is provided to client device 150. Types of services can include the processing of an item of content and/or the analysis of an item of content. For example, types of services can include video processing such as, but not limited to, transcoding, jitter removal, dynamic clipping based on facial recognition, video analysis, resizing of the video, optical character reading from video, background removal, and the like.

Additionally, types of services can include audio processing such as, but not limited to, background removal, audio enhancement, audio speed up or slow down, audio enhancement, noise reduction, speech recognition, audio analysis, and the like. The analysis of an item of content can include, for example, speech recognition that produces a text transcript, or optical character recognition applied to one or more video images of a video stream to produce a text output. A video-based person tracking service that outputs a stream of records of person location and times is another example that can be used to illustrate analysis of an item of content. The locations might be expressed in terms of image coordinates, but may be more useful when expressed in terms of physical world coordinates (e.g., "x,y" coordinates referenced to the floor of a room). Another example that can be used to illustrate an analysis of an item of content pertains to a face detector service that outputs snapshots of faces extracted from a video stream, the times and image locations at which the snapshots were detected, identities for the faces, and/or the classification of the faces. Some portion of this information can be represented as text data.

As used herein, an item of content may have been serviced, may be in the process of being serviced, may not be serviced, or may not yet be serviced. In other words, an item of content, whether serviced or not, can still be referred to as an item of content. Servicing of an item of content can include the analysis or processing of an item of content. When necessary for clarity of discussion, the result of servicing an item of content is referred to herein using terms such as "service result" or "service result content" or "service result data." Service result content may consist of: a modified version of the original serviced item of content (e.g., when background removal is applied to a video stream); an item of content that is derived from the original item of content (e.g., when optical character recognition is used to produce text output); an item of content that is passed through a service provider and is not modified but merely forwarded (e.g., content that does not require transcoding when received by a transcoding service provider); or an item of content that has been previously sent to a service provider and is now cached/stored on the service provider (e.g., content that was previously serviced and is now stored in memory at the service provider). Additionally, service result content may consist of any combination of the above examples.

Continuing with reference to FIG. 5, service providers 130 and 132 each function to provide one or more types of service. That is, service providers 130 and 132 can each provide multiple and different types of services. For example, service provider 130 can be used for transcoding one item of content and for background removal of another item of content. Different types of services can be performed in parallel on different items of content. That is, service providers 130 and 132 can perform a service on different but concurrent content streams. Service providers 130 and 132 can also provide caching services. For example, service provider 130 or 132 can cache an item of content, in whole or in part, before the item of content is serviced by service provider 130 or 132. Similarly, service provider 130 or 132 can cache the service result, in whole or in part, before the service result content is forwarded to the client device 150.

Portal 140 is a well-published portal site that serves as the first point of contact between client device 150 and system 100. Content source 110 is the source of the item of content.

Service location manager (SLM) 120 selects a service provider (e.g., service provider 130 or 132) that can perform the type of service that may need to be performed on the item of content before the service result is provided to the client device 150. According to one embodiment, this selection can be made based on available service provider resources determined as described herein. Service providers 130 and 132, and any other available service providers, are known to SLM 120. The type or types of services that each service provider can perform, or can be made to perform, are also known to service location manager 120.

The manner in which SLM 120 selects a service provider is more fully described below. Operations in this process are represented by single headed arrows and correspond to messages 1-6 shown in FIG. 5. The single headed arrows B and C shown in FIG. 5 represent communications from the service providers (e.g., 130 and 132) to the SLM 120. According to one embodiment, these communications can involve session startup and teardown information (e.g., session initiation and termination information) that provides the SLM 120 with an accurate view of service provider (e.g., 130 and 132) resource state. This information along with information that is maintained or is accessible by the SLM 120 regarding other network and service provider characteristics is used by the SLM 120 in the selection of a service provider (e.g., 130 and 132) that is suitable to perform a particular service based on available resources.

Again referring to FIG. 5, at the beginning of a session, client device 150 sends message 1 to portal 140. Message 1 identifies a particular item of content (e.g., the name of a movie).

Also, in one embodiment, message 1 includes information sufficient for identifying a type of service that should be performed on the item of content before the service result is delivered to client device 150. That information can take many forms. In one form, message 1 specifically identifies a type of service (e.g., background removal or speech recognition). In another form, message 1 identifies attributes of client device 150, such as its memory capacity, screen size, processing capability and the like. Based on these attributes, system 100 (e.g., portal 140) can derive a type of service that should be performed (e.g., transcoding). In yet another form, message 1 identifies the type of client device 150, and based on stored knowledge of that type of device, system 100 (e.g., portal 140) can derive a type of service that should be performed (e.g., transcoding).

Message 1 can include other information. If the source of the item of content is known by client device 150, then the content source can also be identified in message 1. For example, message 1 can include the Uniform Resource Locator (URL) for content source 110. If the source of the item of content is not known to client device 150, the content source can be located by system 100 (e.g., by portal 140) if that information is not already known to system 100.

After receiving message 1, portal 140 sends message 2 to SLM 120. In one embodiment, message 2 includes information sufficient for identifying a type of service that should be performed on the item of content before the service result is delivered to client device 150. As just described, that information can take many forms. In one form, message 2 specifically identifies a type of service (e.g., background removal or speech recognition). In another form, message 2 identifies attributes of client device 150, such as its memory capacity, screen size, processing capability and the like. Based on these attributes, system 100 (e.g., SLM 120) can derive a type of service that should be performed (e.g., transcoding). In yet another form, message 2 identifies the type of client device 150, and based on stored knowledge of that type of device, system 100 (e.g., SLM 120) can derive a type of service that should be performed (e.g., transcoding). Based on the information provided by message 2, SLM 120 identifies the type of service to be performed.

Message 2 can include other information. For example, message 2 can also identify the item of content and/or the content source.

Service providers 130 and 132, and the services they are capable of providing, are known to SLM 120. Also known to the SLM 120 are certain static server provider and network characteristics, such as computational and memory resources of network coupled devices, connectivity and expected bandwidth and latency between servers, client/content addresses, session dispatch history, and network proximity. In addition, according to some embodiments the identity of special purpose hardware (e.g., encryption or compression) used by the service provider will be known, allowing the SLM 120 to take into account static characteristics of the special purpose hardware in its selection of suitable service providers. Moreover, the SLM may receive periodic transmissions of service session information from service providers 130 and 132. This information may come in the form of service session start-up and tear-down information (e.g., service session initiation and termination information). It should be appreciated that a combination of some or all of the service provider and network characteristics and service session information described using static information and dynamic measurements can be employed by the SLM in the selection of a service provider. It should be appreciated that using this information SLM 120 selects either service provider 130 or 132 (or other coupled service providers) to perform the service identified from message 2.

According to one embodiment, SLM 120 selects either service provider 130 or 132 at based on their suitability (in terms of determined resource availability, e.g., service capability and resource usage) to provide a particular service. Also, in one embodiment, service location manager 120 can select either service provider 130 or 132 at random. In another embodiment, SLM 120 can select either service provider 130 or 132 using a scheme such as a round-robin scheme.

In yet another embodiment, SLM 120 maintains a history or record of service providers which are servicing other sessions already in progress. That is, as mentioned previously, there can be multiple client devices, each participating in a session (e.g., each requesting an item of content). For those other sessions in which the item of content is being serviced, SLM 120 will have selected a service provider to perform the service. In the present embodiment, SLM 120 maintains a record of the service providers that were selected to provide services for those other sessions. It should be appreciated that session dispatch history may include information concerning content length. Based on the information in the record, SLM 120 can select a service provider for the new session with client device 150. For example, based on the information in the record, SLM 120 can assess which service providers are busiest relative to the other service providers. The record can be updated by SLM 120 using a variety of approaches to be described further below.

In the example of FIG. 5, SLM 120 selects service provider 130. SLM 120 then sends message 3 to portal 140. Message 3 includes information sufficient for locating and contacting service provider 130. For example, message 3 can include the URL for service provider 130.

Message 3 can include other information. For example, message 3 can also identify the item of content and/or the content source.

After receiving message 3, portal 140 sends message 4 to client device 150. Message 4 includes the information for locating and contacting service provider 130 that was provided by message 3. Message 4 can be identical to message 3 (message 4 may simply be a forwarding of message 3). However, message 4 can include other (additional) information added by portal 140. For example, message 4 can also identify the item of content and/or the content source if that information is determined by portal 140 instead of service location manager 120.

In an alternate embodiment, in lieu of messages 3 and 4, SLM 120 sends a message directly to client device 150. The message from SLM 120 to client device 150 includes the information for locating and contacting service provider 130. The message can include other information such as the identity of the item of content and/or the content source.

In any case, client device 150 receives a message that includes information sufficient for locating and contacting service provider 130. Based on that information, communication is established between client device 150 and the service provider 130. In other words, the session initiated by client device 150 is automatically transferred from portal 140 to service provider 130. Importantly, the transfer from portal 140 to service provider 130 is seamless and transparent to an end user at client device 150.

In one embodiment, the message received by client device 150 (e.g., message 4) uses or is based on Synchronized Multimedia Integration Language (SMIL). Redirection of client device 150 from portal 140 to service provider 130 can be accomplished using dynamic SMIL rewriting.

Continuing with the example in view of FIG. 5, after receiving message 4 from portal 140 (or an equivalent message from SLM 120), client device 150 sends message 5 to service provider 130. Message 5 identifies the item of content and the type of service to be performed by service provider 120. Message 5 can include other information. For example, if the content source is known at this point to client device 150, that information can be included in message 5.

Upon receiving message 5, service provider 130 sends message 6 to content source 110. As mentioned above, content source 110 can be identified to service provider 130 in message 5. Otherwise, service provider 130 can locate content source 110. In message 6, service provider 130 requests that the item of content be provided.

In response to message 6, content source 110 sends the item of content to service provider 130 for servicing (illustrated by arrow 7 in FIG. 5). In one embodiment, the item of content is streamed to service provider 130.

In one embodiment, service provider 130 is always set up and ready to execute the specified service. That is, the specified service can be continuously executing on service provider 130, waiting for data to operate on. In another embodiment, the specified service is quiescent until either message 5 or the item of content is received by service provider 130. That is, service provider 130 may need to set up or start up the specified service, and will not do so until the potential need for the service is identified or until there is an actual need to perform the service.

In any case, service provider 130 can then perform the specified service on the item of content. The item of content can be cached by service provider 130 in whole or in part before servicing, or the item of content can be serviced as it is received by service provider 130.

The service result content is then sent by service provider 130 to client device 150 (illustrated by arrow 8 in FIG. 5). In one embodiment, the service result content is streamed to client device 150. The service result content can be cached by service provider 130 in whole or in part after servicing (before streaming), or the service result content can be streamed as it is serviced by service provider 130.

Once the service result content has been delivered by the selected service provider (e.g., service provider 130) and received by client device 150, the ongoing session can be terminated. In an embodiment in which a history or record is maintained by SLM 120, the history or record can be updated to reflect that the service provider 130 has completed its servicing tasks. Different approaches can be used to prompt an update of the record. In one approach, at or around the time that the SLM 120 is making a selection of a service provider, the SLM 120 estimates the amount of time needed to complete the service to be performed on the item of content. The record can be updated to reflect that the service has been completed when that amount of time has passed.

Alternatively, the selected service provider (e.g., service provider 130) can provide an indication to the SLM 120 when it has completed a service, and the record can be updated accordingly (e.g., messages B and C). These approaches can be extended to account for the delivery of the service result content to client device 150. For example, the amount of time estimated by the SLM 120 for service provider 130 to perform the service can be increased to account for any additional time needed by service provider 130 to send the service result content to client device 150. Similarly, service provider 130 can indicate to SLM 120 when it has completed sending the service result content to client device 150.

In the discussion above, the item of content is sent to service provider 130 in response to message 6. As mentioned previously herein, service provider 130 can instead store or cache content previously received and/or serviced, obviating the use of message 6 and the response to message 6 (e.g., obviating the data flow indicated by arrow 7 in FIG. 5).

It should be appreciated that, as previously discussed, the selection of a service provider (e.g., 130 etc.) can be made based on a combination of data that is maintained by the SLM 120 and data that is transmitted to the SLM 120 from the service providers (e.g., 130 and 132). By using both types of data a more complete picture of available resources may be ascertained. This approach allows the service location manager to adapt its selection of a service location (e.g., service provider) to more closely coincide with available resources.

Figure 6A:
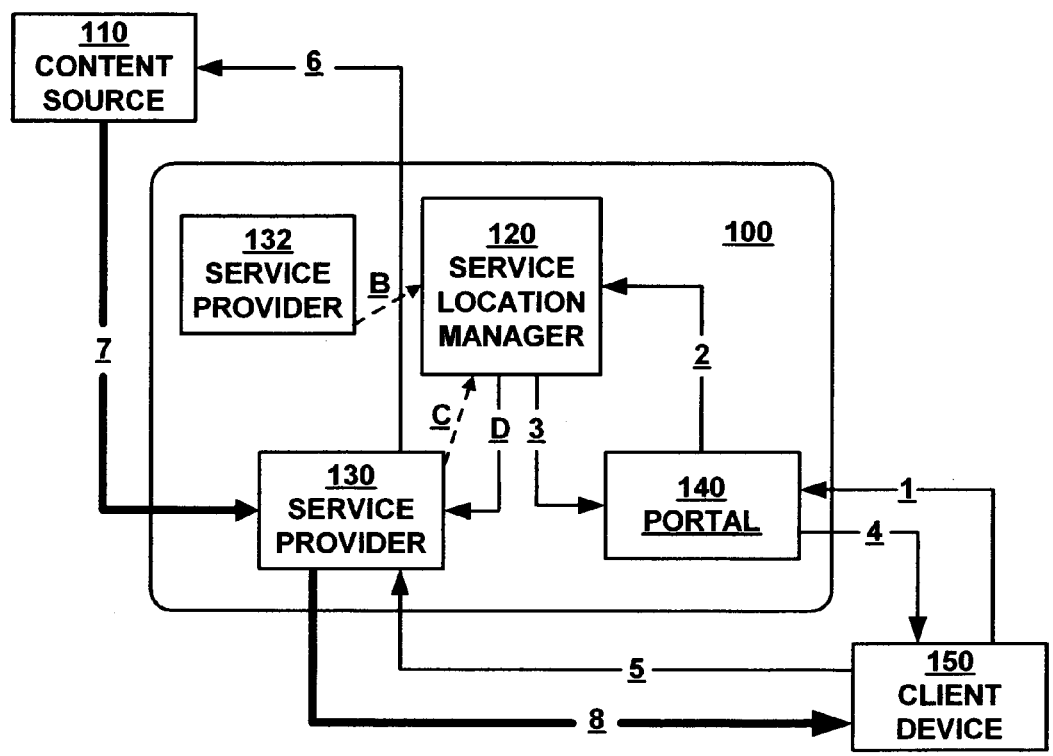
FIG. 6A is a block diagram showing information flow in and out of a system for servicing and delivering content based on resource availability according to yet another embodiment of the present invention.

FIG. 6A is a block diagram showing information flow in and out of system 100 according to another embodiment of the present invention. A difference between FIG. 5 and FIG. 6A is the addition of message D from service location manager (SLM) 120 to the selected service provider (e.g., service provider 130). The message D can be sent from service location manager 120 to service provider 130 at any time after message 2 and before message 5.

Message D can be used for any number of different purposes. For example, in a situation in which the type of service to be performed on the specified item of content is not continuously executing on service provider 130, message D can be used to alert service provider 130 to the approaching need for the service. Consequently, the set up and/or start up of the service can be initiated and perhaps completed before message 5 is received from client device 150, reducing overall latency.

Also, message D can be used to provide to service provider 130 the identity of the item of content and perhaps the identity of the content source 110. With this information, service provider 130 can request content source 110 to provide (e.g., begin streaming) the item of content before message 5 is received, further contributing to a reduction in latency. In addition, the use of message D in this manner can result in improved security, because the content source 110 does not have to be identified to the client device 150, for example.

Figure 6B:
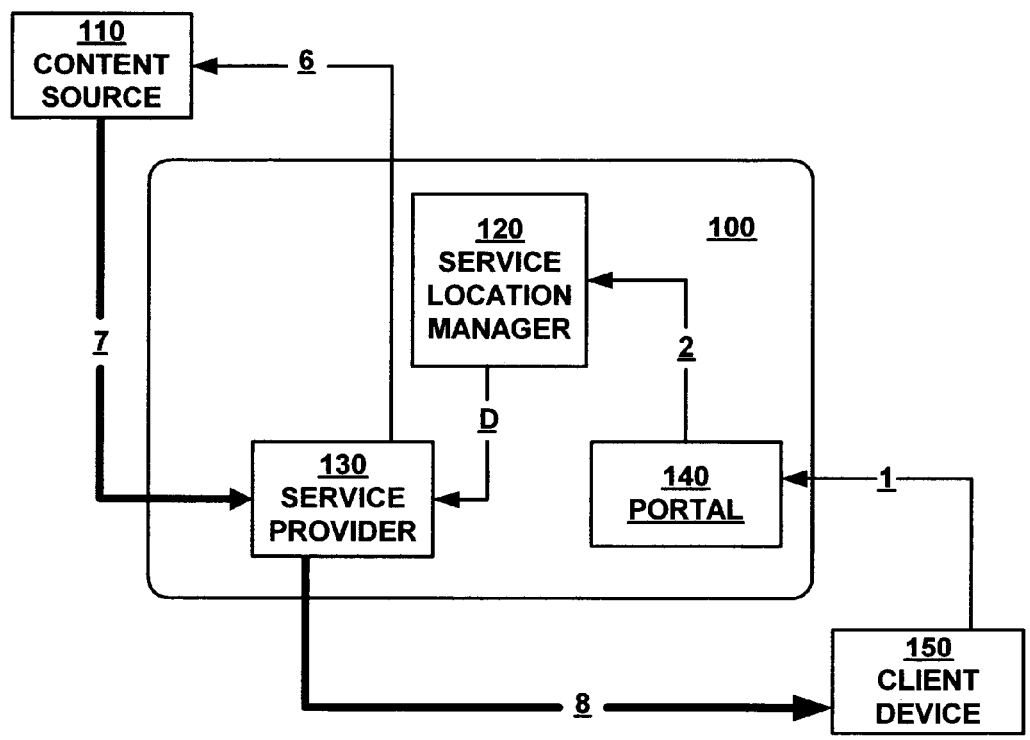
FIG. 6B is a block diagram showing information flow in and out of a system for servicing and delivering content to a client device according to still another embodiment of the present invention.

Furthermore, message D can be used in lieu of messages 3, 4 and 5 as illustrated by FIG. 6B. For instance, in addition to identifying the item of content and perhaps the content source, message D can also include information enabling service provider 130 to establish communication with client device 150. In other words, instead of having client device 150 initiate the transfer of communication from portal 140 to service provider 130, the transfer of communication can be initiated by service provider 130 in a manner that remains seamless and transparent to a user of client device 150.

As discussed with reference to FIG. 5, messages B and C represent (shown in FIG. 6A) information transmissions made from the service providers (e.g., 130 and 132) to SLM 120 that indicate that a service session has been initiated and terminated. This information provides the SLM 120 with useful data regarding the computational resources used in previous service sessions, and provides an accurate view of the service provider (e.g., 130) resource state.

Figure 7:
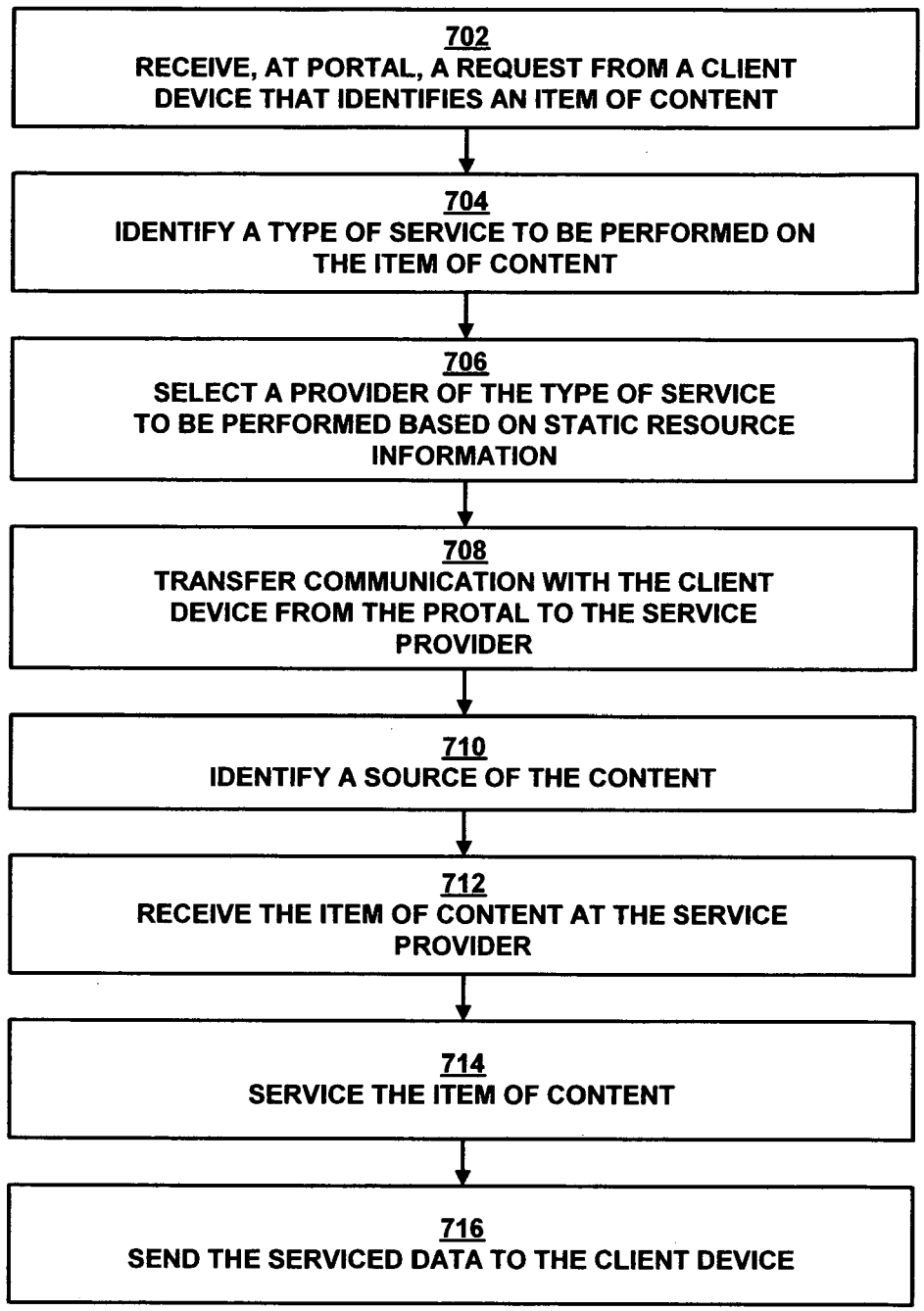
FIG. 7 illustrates a method for servicing and delivering content based on resource availability according to one embodiment of the present invention.

FIG. 7 is a flowchart 700 of a method for servicing content and delivering service result content according to one embodiment of the present invention. Although specific operations are disclosed in flowchart 700, such operations are exemplary. That is, embodiments of the present invention are well suited to performing various other operations or variations of the operations recited in flowchart 700. It is appreciated that the operations in flowchart 700 may be performed in an order different than presented, and that not all of the operations in flowchart 700 may be performed.

All of, or a portion of, the methods described by flowchart 700 can be implemented using computer-readable and computer-executable instructions which reside, for example, in computer-usable media of a computer system or like device. In the present embodiment, flowchart 700 is implemented by system 100 of FIGS. 5 and 6A. That is, some of the operations recited in flowchart 700 are performed by a portal (e.g., 140), others by a service location manager (e.g., SLM 120), and yet others by service providers (e.g., 130 and 132) of FIGS. 5 and 6A.

In operation 702 of FIG. 7, during a session with a client device, a portal receives a request from the client device, identifying an item of content. The request can include other information. In one embodiment, with reference to FIGS. 5 and 6A, portal 140 receives message 1 from client device 150.

In operation 704 of FIG. 7, a type of service to be performed on the item of content is identified. The type of service can be identified in the request of operation 702, or it can be derived based on information provided in that request. Referring to FIGS. 5 and 6A, the type of service can be identified by the client device 150, by the portal 140, or by the service location manager 120.

In operation 706 of FIG. 7, a provider of the type of service to be performed is selected from a number of providers capable of performing the service. In one embodiment, with reference also to FIGS. 5 and 6A, a service provider (e.g., service provider 130, etc.) is selected by SLM 120. According to one embodiment, the selection is based on static server provider and network characteristics known to the SLM 120. Static server provider an network characteristics can include but are not limited to dispatch history, and information provided by the service providers related to the initiation and termination of previous sessions if such information has been received. It should be appreciated that session initiation and termination information provides the SLM 120 with useful data regarding the computational resources used in previous sessions and allows the SLM 120 to adapt its selection of a service location (e.g., service provider) to coincide with available resources.

In addition, as mentioned above, SLM 120 can select a service provider at random or using a scheme such as a round-robin scheme. Alternatively, SLM 120 can maintain a record that reflects which of the service providers other sessions have been transferred to. In this latter approach, SLM 120 selects a service provider based on the information in the record. It should be appreciated that a combination of some or all of the service provider and network characteristics information and service session information noted above can be employed by the SLM in the selection of a service provider.

In operation 708 of FIG. 7, communication with the client device is transferred from the portal to the selected service provider. In other words, the session is transferred from the portal to the selected service provider.

In operation 710 of FIG. 7, a source of the item of content is identified. Referring to FIGS. 5 and 6A, the source of the item of content can be identified by the client device 150, by the portal 140, by the SLM 120, or by the selected service provider (e.g., service provider 130). The content source is then contacted to begin delivery of data for the item of content to the selected service provider.

In operation 712 of FIG. 7, the item of content is received by (e.g., streamed to) the selected service provider.

In operation 714, the item of content is serviced according to the specified type of service. Data constituting the item of content can be serviced as the data are received at the service provider, or the data can be cached before servicing. As mentioned above, an item of content may have been serviced, may be in the process of being serviced, may not be serviced, or may not yet be serviced. Servicing of an item of content can include the analysis or processing of an item of content. Service result content may consist of: a modified version of the original serviced item of content (e.g., when background removal is applied to a video stream); an item of content that is derived from the original item of content (e.g., when optical character recognition is used to produce text output); an item of content that is passed through a service provider and is not modified but merely forwarded (e.g., content that does not require transcoding when received by a transcoding service provider); or an item of content that has been previously sent to a service provider and is now cached/stored on the service provider (e.g., content that was previously serviced and is now stored in memory at the service provider). Additionally, service result content may consist of any combination of the above examples.

In one embodiment, the service is executed continuously by the service provider. In another embodiment, the service is not set up or does not start operating until the client device establishes communication with the service provider. In yet another embodiment, the service is set up and/or starts up after the service provider is identified by the service location manager, before the client device establishes communication with the service provider. For example, with reference to FIGS. 6A and 6B, after SLM 120 selects service provider 130 as a provider of the specified type of service, a message D is sent to service provider 130, causing service provider 130 to set up and/or start up the service.

In operation 716 of FIG. 7, the service result content is sent (e.g., streamed) to the client device. The data constituting the service result can be sent as the input data are serviced, or the service result data can be cached before it is sent.

The operations 712, 714 and 716 can be performed concurrently. That is, the selected service provider (e.g., service provider 130 of FIGS. 5 and 6A) can begin servicing the item of content before the entire item of content is received at service provider 130, and service result data can begin to flow out of service provider 130 before the servicing of the entire item of content is completed. Similarly, the servicing of one portion of an item of content can be in progress while the result of servicing another portion of the item of content is being received by the client device.

Once the service result content is delivered to client device 150 (FIGS. 5 and 6A), the session can be terminated. It should be noted that a session may be terminated either upon completion of a session or prior to completion if a tear down of the session is requested (e.g., such as by client device 150 or SLM 120). In an embodiment in which SLM 120 keeps some sort of record of providers that have been assigned sessions, the record can be updated once the session is terminated or once a service provider has serviced an item of content. Approaches for updating the record have been described above.

Figure 8:
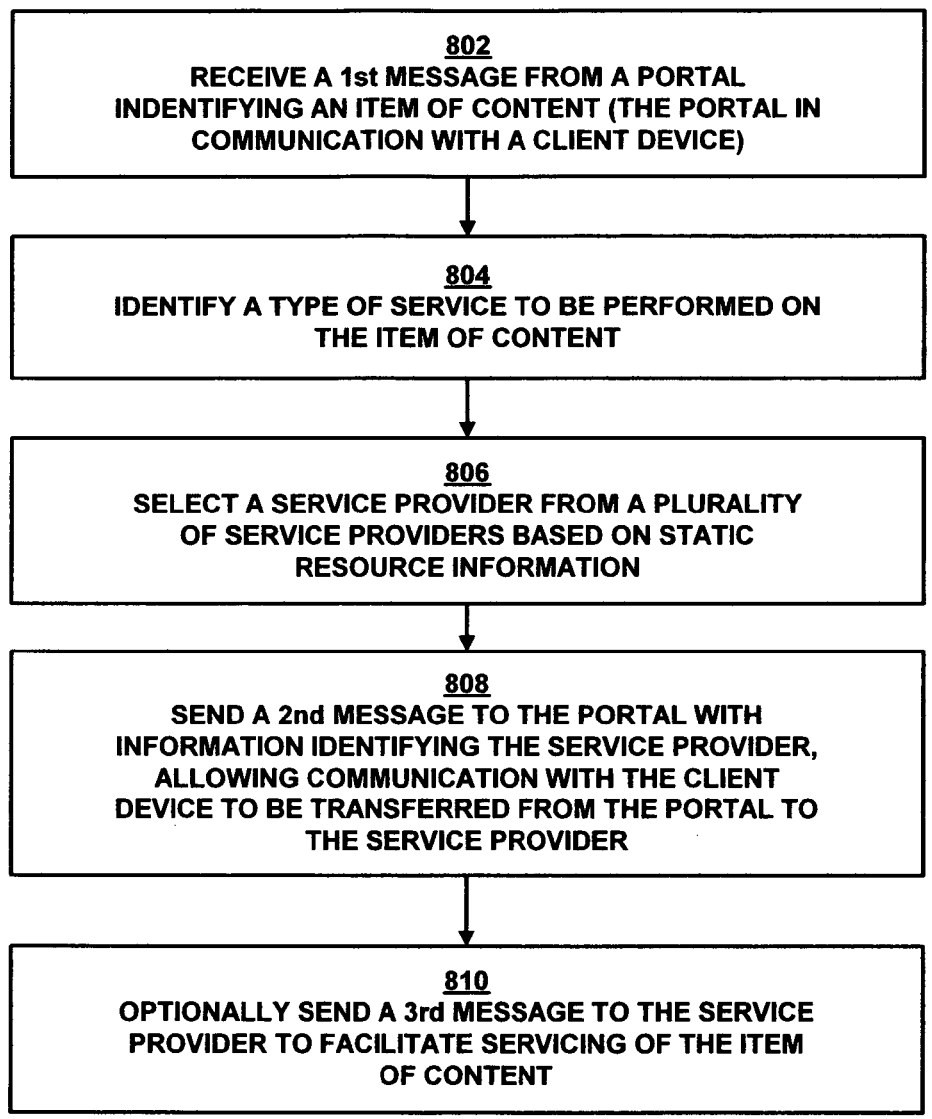
FIG. 8 illustrates a method for managing the servicing of content based on resource availability according to another embodiment of the present invention.

FIG. 8 is a flowchart 800 of a method for managing the servicing of content according to one embodiment of the present invention. Although specific operations are disclosed in flowchart 800, such operations are exemplary. That is, embodiments of the present invention are well suited to performing various other operations or variations of the operations recited in flowchart 800. It is appreciated that the operations in flowchart 800 may be performed in an order different than presented, and that not all of the operations in flowchart 800 may be performed.

All of, or a portion of, the methods described by flowchart 800 can be implemented using computer-readable and computer-executable instructions which reside, for example, in computer-usable media of a computer system or like device. In the present embodiment, flowchart 800 is implemented by system 100 of FIGS. 5 and 6A. Specifically, flowchart 800 is implemented by service location manager 120 of FIGS. 5 and 6A.

In operation 802 of FIG. 8, referring also to FIGS. 5 and 6A, a first message (e.g., message 2) is received from portal 140, identifying an item of content. Portal 140 is in communication with client device 150.

In operation 804 of FIG. 8, a type of service to be performed on the item of content is identified. The type of service can be identified in the message of operation 802. Referring to FIGS. 5 and 6A, the type of service can be identified by the client device 150, by the portal 140, or by the service location manager 120.

In operation 806 of FIG. 8, a provider of the type of service is selected from a number of providers capable of performing the service. In one embodiment, with reference also to FIGS. 5 and 6A, a service provider (e.g., service provider 130, etc.) is selected by SLM 120. According to one embodiment, the selection is based on static server provider and network characteristics known to the SLM, dispatch history, and information provided by the service providers related to the initiation and termination of previous sessions if such information has been received. It should be appreciated that session initiation and termination information provides the SLM 120 with useful data regarding the computational resources used in previous sessions and allows the SLM 120 to adapt its selection of a service location (e.g., service provider) to coincide with available resources.

In operation 808 of FIG. 8, in one embodiment, a second message (e.g., message 3 of FIGS. 5 and 6A) is sent to the portal. In another embodiment, the second message is sent to the client device, bypassing the portal. The second message includes information that identifies the selected service provider, allowing communication between the client device to be transferred from the portal to the service provider (e.g., from portal 140 to service provider 130 of FIGS. 5 and 6A).

In operation 810 of FIG. 8, in one embodiment, a third message (e.g., message D of FIGS. 6A and 6B) is sent to the selected service provider. The third message can include the identity of the item of content and/or the identity of the content source. The third message can also be used to alert the service provider, allowing the service provider to begin setting up and/or executing the service (if the service is not already executing). In response to the third message, the service provider can also contact the content source, to initiate delivery (e.g., streaming) of the item of content from the content source to the service provider. In lieu of a third message, the activities just described can begin in response to the client device and the service provider establishing communication. Service result content is then sent (e.g., streamed) from the service provider to the client device.

In summary, embodiments of the present invention provide methods and systems that can provide services to a large number of diverse client devices. A variety of services are provided to accommodate the preferences and requirements of the diverse clients. To avoid congestion, the services are provided by a number of service providers managed by a service location manager. Items of content requested by the client devices are directed to the service providers for servicing based on service provider resource availability. However, the client devices need only contact a well-published portal site to begin a session and to request items of content. The client devices are automatically and transparently transferred to the appropriate service provider during the session. From the perspective of the client device, there is a single point of contact. Transparent to the client device is the flow of messages and data through the content delivery system that results in the delivery of service result content to the client device via a service provider selected by the system. Transparent to the end user at the client device is the seamless transfer of the session from the initial point of contact to the selected service provider.

Figure 9:
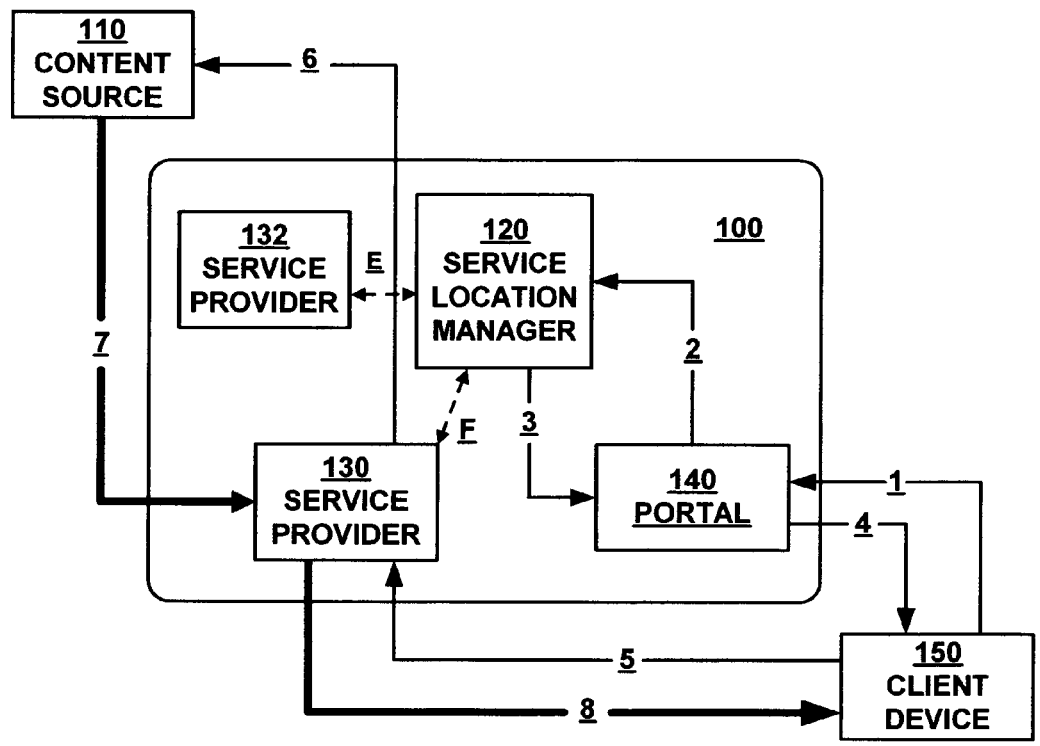
FIG. 9 is a block diagram showing information flow in and out of a system for servicing and delivering content based on resource availability according to another embodiment of the present invention.

Systems and Methods for Selecting Media Service Providers Based on Resource Availability FIG. 9 is a block diagram of a system 100 for servicing content supplied by a content source 110 and for delivering the service result content to a client device 150 according to one embodiment of the present invention. The selection of a service provider to service the content that is supplied by the content source 110 is made by a service location manager (SLM) 120. The selection made is based on dynamically collected resource measurements that are recently received by the SLM 120 that indicate the resource availability of service providers. The resource measurements that are received can include both poll-based and push-based data. According to one embodiment, the selection can be made based on a combination of poll-based and push-based data. This approach allows the SLM 120 to adapt its selection of a service location (e.g., service provider) to coincide with available resources. In the present embodiment, system 100 includes a service location manager (SLM) 120, a plurality of service providers exemplified by service providers 130 and 132, client device 150 and portal 140.

Service location manager (SLM) 120 can utilize both poll-based and push-based data gathering. Poll-based resource information gathering involves the transmission of requests to service providers (e.g., 130 and 132), by the SLM 120, as a means of eliciting information from the service providers regarding resource availability. Push-based information gathering involves the periodic "push" or transmission of information regarding resource availability to the SLM 120 by the service providers (e.g., 130 and 132). As mentioned above, a combination of both poll-based and push-based information gathering can be employed according to one embodiment.

Referring to FIG. 9, messages E and F represent the resource monitoring communications that are transmitted or received by service location manager (SLM) 120. These messages are shown in FIG. 9 by dashed double headed arrows E and F. These messages can constitute either a poll-based transmission of a request to a service provider, a push-based transmission of information regarding the resource availability of a service provider to the SLM 120, or a combination of both.

An approach that utilizes both types of information could involve: (1) the push by a service provider (e.g., 130 or 132) of information regarding resource availability to the SLM 120 in the same message that is used to notify the SLM 120 of the beginning and end of a session (stand alone updates could be transmitted if start-up/teardown session events did not occur often enough to satisfy the desired timing of statistics transmission), and (2) the SLM 120 could periodically poll the service providers (e.g., 130 and 132) when it is determined that statistics have not been received from the service providers (e.g., 130 and 132) in a predetermined period of time and could involve the restarting of daemons resident at the service providers to restart the periodic transmissions. It should be appreciated that the poll-based and the push-based information that is gathered can be combined at the SLM 120 with the recent history of service session dispatches to better predict the upcoming resource availability.

The service location manager (SLM) 120, the service providers 130 and 132, and the portal 140 are logical entities that can be implemented on a single device or using multiple devices. Thus, system 100 can be representative of, for example, a single computer system that implements the functionality of SLM 120, service providers 130 and 132, and portal 140. Alternatively, system 100 can encompass different nodes or devices in a computer system network. These nodes may be server computer systems, switches, routers or the like, having processing and memory capabilities sufficient to perform the various functionalities to be described herein. Generally speaking, the functionality provided by system 100 can be implemented using one or more devices. Furthermore, although system 100 is described for a single service location manager 120 and portal 140, there can be more than one of any of those elements. In addition, there can be more than two service providers.

System 100 can be implemented in an existing computer system network by overlaying the functionality of SLM 120, service providers 130 and 132, and/or portal 140 onto the existing network. That is to say, all or a part of the functionality provided by system 100 can be incorporated into existing network nodes. Alternatively, all or part of system 100 can be implemented by adding nodes into an existing network. For example, existing content sources and portals may be used, with nodes added for servicing content and for managing service providers.

In the present embodiment, system 100 can communicate with a content source 110 and a client device 150. Although described for a single content source 110 and client device 150, there can be more than one of each of those elements. Communication between system 100, content source 110 and client device 150, as well as communication within system 100, can be wireless.

Client device 150 can be virtually any kind of user device such as, but not limited to, a desktop or laptop computer system, or a video-enabled handheld computer system (e.g., a portable digital assistant) or cell phone. In general, client device 150 is used to request and subsequently receive an item of content.

An item of content refers to media or non-media data that can be live or recorded. An item of content can include, but is not limited to, video-based data, audio-based data, image-based data, web page-based data, graphic data, text-based data or some combination thereof. For example, an item of content can be a movie of digital video disk (DVD) quality.

A type of service may need to be performed on the item of content before the content is provided to client device 150. Types of services can include the processing of an item of content and/or the analysis of an item of content. For example, types of services can include video processing such as, but not limited to, transcoding, jitter removal, dynamic clipping based on facial recognition, video analysis, resizing of the video, optical character reading from video, background removal, and the like.

Additionally, types of services can include audio processing such as, but not limited to, background removal, audio enhancement, audio speed up or slow down, audio enhancement, noise reduction, speech recognition, audio analysis, and the like. The analysis of an item of content can include, for example, speech recognition that produces a text transcript, or optical character recognition applied to one or more video images of a video stream to produce a text output. A video-based person tracking service that outputs a stream of records of person location and times is another example that can be used to illustrate analysis of an item of content. The locations might be expressed in terms of image coordinates, but may be more useful when expressed in terms of physical world coordinates (e.g., "x,y" coordinates referenced to the floor of a room). Another example that can be used to illustrate an analysis of an item of content pertains to a face detector service that outputs snapshots of faces extracted from a video stream, the times and image locations at which the snapshots were detected, identities for the faces, and/or the classification of the faces. Some portion of this information can be represented as text data.

As used herein, an item of content may have been serviced, may be in the process of being serviced, may not be serviced, or may not yet be serviced. In other words, an item of content, whether serviced or not, can still be referred to as an item of content. Servicing of an item of content can include the analysis or processing of an item of content. When necessary for clarity of discussion, the result of servicing an item of content is referred to herein using terms such as "service result" or "service result content" or "service result data." Service result content may consist of: a modified version of the original serviced item of content (e.g., when background removal is applied to a video stream); an item of content that is derived from the original item of content (e.g., when optical character recognition is used to produce text output); an item of content that is passed through a service provider and is not modified but merely forwarded (e.g., content that does not require transcoding when received by a transcoding service provider); or an item of content that has been previously sent to a service provider and is now cached/stored on the service provider (e.g., content that was previously serviced and is now stored in memory at the service provider). Additionally, service result content may consist of any combination of the above examples.

Continuing with reference to FIG. 9, service providers 130 and 132 each function to provide one or more types of service. That is, service providers 130 and 132 can each provide multiple and different types of services. For example, service provider 130 can be used for transcoding one item of content and for background removal of another item of content. Different types of services can be performed in parallel on different items of content. That is, service providers 130 and 132 can perform a service on different but concurrent content streams. Service providers 130 and 132 can also provide caching services. For example, service provider 130 or 132 can cache an item of content, in whole or in part, before the item of content is serviced by service provider 130 or 132. Similarly, service provider 130 or 132 can cache the service result, in whole or in part, before the service result content is forwarded to the client device 150.

Portal 140 is a well-published portal site that serves as the first point of contact between client device 150 and system 100. Content source 110 is the source of the item of content.

Service location manager (SLM) 120 selects a service provider (e.g., service provider 130 or 132) that can perform the type of service that may need to be performed on the item of content before the service result is provided to the client device 150. According to one embodiment, this selection can be made based on available service provider resources determined as described herein. Service providers 130 and 132, and any other available service providers, are known to SLM 120. The type or types of services that each service provider can perform, or can be made to perform, are also known to service location manager 120.

The manner in which SLM 120 selects a service provider is more fully described below. Operations in this process are represented by single headed arrows and correspond to messages 1-6 shown in FIG. 9. The double headed arrows E and F shown in FIG. 9 represent resource monitoring (e.g., poll-based and push-based) communications between the SLM 120 and the service providers (e.g., 130 and 132).

Again referring to FIG. 9, at the beginning of a session, client device 150 sends message 1 to portal 140. Message 1 identifies a particular item of content (e.g., the name of a movie).

Also, in one embodiment, message 1 includes information sufficient for identifying a type of service that should be performed on the item of content before the service result is delivered to client device 150. That information can take many forms. In one form, message 1 specifically identifies a type of service (e.g., background removal or speech recognition). In another form, message 1 identifies attributes of client device 150, such as its memory capacity, screen size, processing capability and the like. Based on these attributes, system 100 (e.g., portal 140) can derive a type of service that should be performed (e.g., transcoding). In yet another form, message 1 identifies the type of client device 150, and based on stored knowledge of that type of device, system 100 (e.g., portal 140) can derive a type of service that should be performed (e.g., transcoding).

Message 1 can include other information. If the source of the item of content is known by client device 150, then the content source can also be identified in message 1. For example, message 1 can include the Uniform Resource Locator (URL) for content source 110. If the source of the item of content is not known to client device 150, the content source can be located by system 100 (e.g., by portal 140) if that information is not already known to system 100.

After receiving message 1, portal 140 sends message 2 to SLM 120. In one embodiment, message 2 includes information sufficient for identifying a type of service that should be performed on the item of content before the service result is delivered to client device 150. As just described, that information can take many forms. In one form, message 2 specifically identifies a type of service (e.g., background removal or speech recognition). In another form, message 2 identifies attributes of client device 150, such as its memory capacity, screen size, processing capability and the like. Based on these attributes, system 100 (e.g., SLM 120) can derive a type of service that should be performed (e.g., transcoding). In yet another form, message 2 identifies the type of client device 150, and based on stored knowledge of that type of device, system 100 (e.g., SLM 120) can derive a type of service that should be performed (e.g., transcoding). Based on the information provided by message 2, SLM 120 identifies the type of service to be performed.

Message 2 can include other information. For example, message 2 can also identify the item of content and/or the content source.

Service providers 130 and 132, and the services they are capable of providing, are known to SLM 120. Also known to the SLM 120 are certain static server provider and network characteristics, such as computational and memory resources of network coupled devices, connectivity and expected bandwidth and latency between servers, client/content addresses, session dispatch history, and network proximity. In addition, according to some embodiments the identity of special purpose hardware (e.g., encryption or compression) used by the service provider will be known, allowing the SLM 120 to take into account static characteristics of the special purpose hardware in its selection of suitable service providers. Moreover, the SLM may receive periodic transmissions of service session information from service providers 130 and 132. This information may come in the form of service session start-up and tear-down information (e.g., service session initiation and termination information).

It should be appreciated that a combination of some or all of the service provider and network characteristics and service session information described using static information and dynamic measurements can be employed by the SLM in the selection of a service provider. It should be appreciated that using this information SLM 120 selects either service provider 130 or 132 (or other coupled service providers) to perform the service identified from message 2.

According to one embodiment, SLM 120 selects either service provider 130 or 132 at based on their suitability (in terms of determined resource availability) to provide a particular service. In one embodiment, service location manager 120 selects either service provider 130 or 132 at random. In another embodiment, SLM 120 selects either service provider 130 or 132 using a scheme such as a round-robin scheme.

In yet another embodiment, SLM 120 maintains a history or record of service providers which are servicing other sessions already in progress. That is, as mentioned previously, there can be multiple client devices, each participating in a session (e.g., each requesting an item of content). For those other sessions in which the item of content is being serviced, SLM 120 will have selected a service provider to perform the service. In the present embodiment, SLM 120 maintains a record of the service providers that were selected to provide services for those other sessions. Based on the information in the record, SLM 120 can select a service provider for the new session with client device 150. For example, based on the information in the record, SLM 120 can assess which service providers are busiest relative to the other service providers. The record can be updated by SLM 120 using a variety of approaches to be described further below.

In the example of FIG. 9, SLM 120 selects service provider 130. SLM 120 then sends message 3 to portal 140. Message 3 includes information sufficient for locating and contacting service provider 130. For example, message 3 can include the URL for service provider 130.

Message 3 can include other information. For example, message 3 can also identify the item of content and/or the content source.

After receiving message 3, portal 140 sends message 4 to client device 150. Message 4 includes the information for locating and contacting service provider 130 that was provided by message 3. Message 4 can be identical to message 3 (message 4 may simply be a forwarding of message 3). However, message 4 can include other (additional) information added by portal 140. For example, message 4 can also identify the item of content and/or the content source if that information is determined by portal 140 instead of service location manager 120.

In an alternate embodiment, in lieu of messages 3 and 4, SLM 120 sends a message directly to client device 150. The message from SLM 120 to client device 150 includes the information for locating and contacting service provider 130. The message can include other information such as the identity of the item of content and/or the content source.

In any case, client device 150 receives a message that includes information sufficient for locating and contacting service provider 130. Based on that information, communication is established between client device 150 and the service provider 130. In other words, the session initiated by client device 150 is automatically transferred from portal 140 to service provider 130. Importantly, the transfer from portal 140 to service provider 130 is seamless and transparent to an end user at client device 150.

In one embodiment, the message received by client device 150 (e.g., message 4) uses or is based on Synchronized Multimedia Integration Language (SMIL). Redirection of client device 150 from portal 140 to service provider 130 can be accomplished using dynamic SMIL rewriting.

Continuing with the example in view of FIG. 9, after receiving message 4 from portal 140 (or an equivalent message from SLM 120), client device 150 sends message 5 to service provider 130. Message 5 identifies the item of content and the type of service to be performed by service provider 120. Message 5 can include other information. For example, if the content source is known at this point to client device 150, that information can be included in message 5.

Upon receiving message 5, service provider 130 sends message 6 to content source 110. As mentioned above, content source 110 can be identified to service provider 130 in message 5. Otherwise, service provider 130 can locate content source 110. In message 6, service provider 130 requests that the item of content be provided.

In response to message 6, content source 110 sends the item of content to service provider 130 for servicing (illustrated by arrow 7 in FIG. 9). In one embodiment, the item of content is streamed to service provider 130.

In one embodiment, service provider 130 is always set up and ready to execute the specified service. That is, the specified service can be continuously executing on service provider 130, waiting for data to operate on. In another embodiment, the specified service is quiescent until either message 5 or the item of content is received by service provider 130. That is, service provider 130 may need to set up or start up the specified service, and will not do so until the potential need for the service is identified or until there is an actual need to perform the service.

In any case, service provider 130 can then perform the specified service on the item of content. The item of content can be cached by service provider 130 in whole or in part before servicing, or the item of content can be serviced as it is received by service provider 130.

The service result content is then sent by service provider 130 to client device 150 (illustrated by arrow 8 in FIG. 9). In one embodiment, the service result content is streamed to client device 150. The service result content can be cached by service provider 130 in whole or in part after servicing (before streaming), or the service result content can be streamed as it is serviced by service provider 130.

Once the service result content has been delivered by the selected service provider (e.g., service provider 130) and received by client device 150, the ongoing session can be terminated. In an embodiment in which a history or record is maintained by SLM 120, the history or record can be updated to reflect that the service provider 130 has completed its servicing tasks. Different approaches can be used to prompt an update of the record. In one approach, at or around the time that the SLM 120 is making a selection of a service provider, the SLM 120 estimates the amount of time needed to complete the service to be performed on the item of content. The record can be updated to reflect that the service has been completed when that amount of time has passed.

Alternatively, the selected service provider (e.g., service provider 130) can provide an indication to the SLM 120 when it has completed a service, and the record can be updated accordingly. These approaches can be extended to account for the delivery of the service result content to client device 150. For example, the amount of time estimated by the SLM 120 for service provider 130 to perform the service can be increased to account for any additional time needed by service provider 130 to send the service result content to client device 150. Similarly, service provider 130 can indicate to SLM 120 when it has completed sending the service result content to client device 150.

In the discussion above, the item of content is sent to service provider 130 in response to message 6. As mentioned previously herein, service provider 130 can instead store or cache content previously received and/or serviced, obviating the use of message 6 and the response to message 6 (e.g., obviating the data flow indicated by arrow 7 in FIG. 9).

Resource Monitoring for Service Provider Selection

Figure 10:
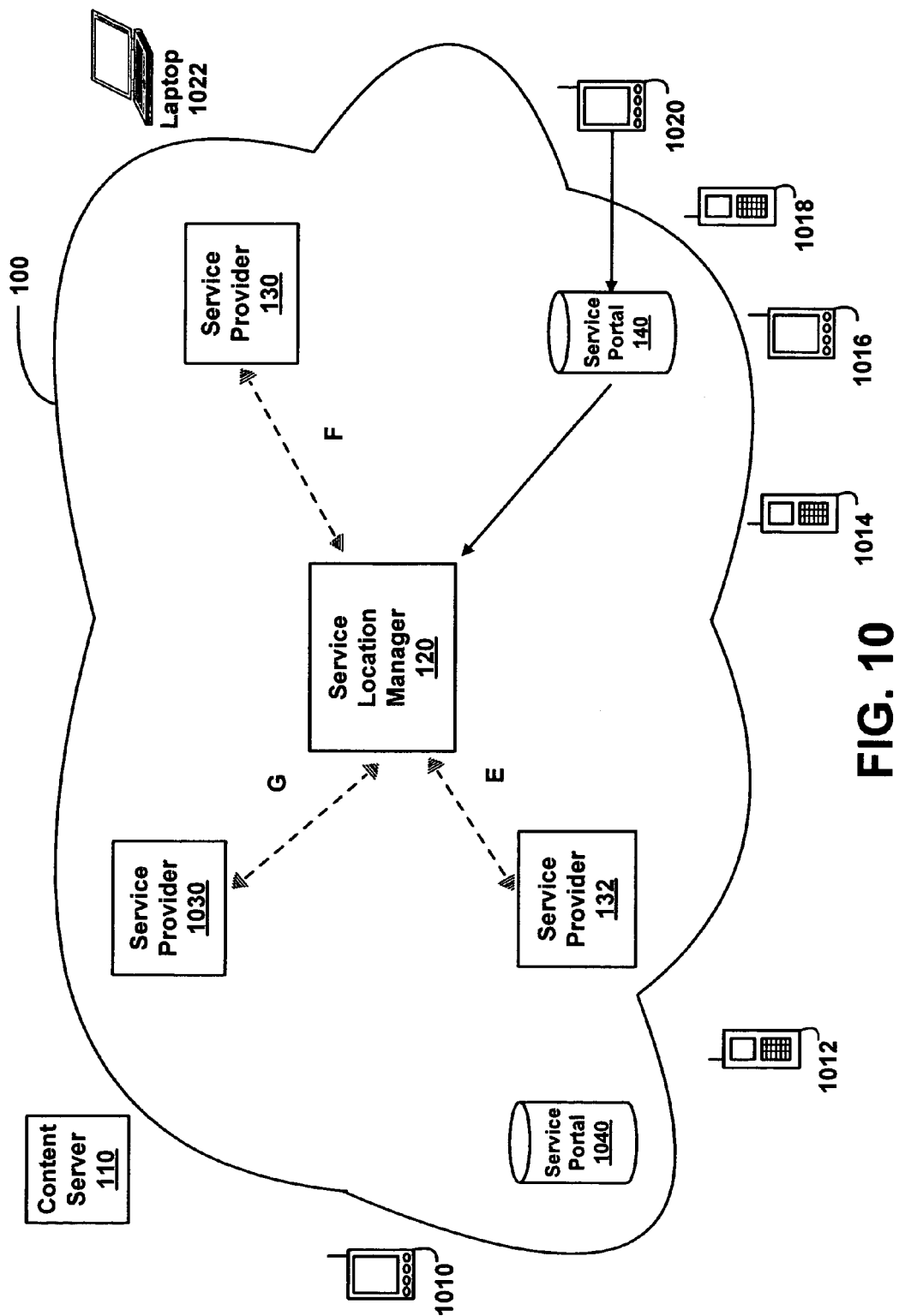
FIG. 10 illustrates resource availability monitoring for service provider selection according to one embodiment of the present invention.

FIG. 10 illustrates resource availability monitoring for service provider selection according to one embodiment of the present invention. According to one embodiment of the present invention, the service location manager (SLM) 120 examines the resource availability status of each of the media service providers (e.g., 130, 132 and 1030) that is under its control to determine which service provider will be selected to perform the media service task required by the current client request. There are various ways that this examination can be completed. The following discussion describes different resource monitoring approaches that may be implemented in accordance with the present invention. FIG. 10 shows service location manager (SLM) 120, service providers 130, 132, and 1030, network 100, service portals 140 and 1040, content source 110, and client devices 1010, 1012, 1014, 1016, 1018, 1020, and 1022.

Referring to FIG. 10, messages E, F and G represent the resource monitoring communications that are transmitted or received by service location manager (SLM) 120. These messages are represented in FIG. 10 by dashed double headed arrows E, F and G. These messages can constitute either a poll-based transmission of a request to a service provider, a push-based transmission of information regarding the resource availability of a service provider to the SLM 120, or a combination of both.

Poll-Based Resource Monitoring

According to one embodiment, monitoring the resource availability status of media service providers (e.g., 130, 132 and 1030) that are controlled by SLM 120 can be "poll-based." According to this approach, whenever the SLM 120 gets a new client (e.g., 1010, 1012, 1014, 1016, 1020, etc.) request for media services, it actively contacts each of the service providers that may have adequate resources (e.g., in terms of number and clock speeds of its CPUs, its installed memory, and its best-case network bandwidth) to determine resource availability (e.g., message E, F, or G). In response to this "resource poll", each service provider (e.g., 130, 132, and 1030) provides a description of its currently available resources (e.g., message E, F, or G). This may include the number of available compute cycles and the amount of memory that is available at a given point in time. Ideally, the response would also include some estimate of the network bandwidth that is available to the content source 110 and to the client (e.g., 1010, 1012, 1014, 1016, 1020 etc.). The SLM 120 can then collect this information and use it as a basis for selecting the appropriate service provider to perform the requested task. According to one embodiment, the SLM 120 selects the service provider (e.g., 130, 132, and 1030) that provides the best combination of available network-bandwidth, and computational and memory resources.

The "poll-based" approach has the advantage of providing up-to-date snapshots of available service provider (e.g., 130, 132, and 1030) resources. It also provides a clear indication of when a service provider (e.g., 130, 132, and 1030) is out of service, either due to a network or machine failure.

Push-Based Resource monitoring

According to one embodiment, resource information may be "pushed" from the service providers (e.g., 130, 132, and 1030) to the monitoring SLM 120. According to this embodiment, updates (e.g., messages E, F, or G) are provided on a periodic basis by a service-location supervisor (SLS), that may be implemented as a background daemon running on each media service provider (not shown). According to one embodiment, the background daemon may be implemented using system and network management software. In other embodiments, other implementations may be utilized.

For each client request, the SLM 120 accesses an available-resource database that is created from the collection (and the dating) of the SLS-provided information. This reduces the connection requirements incurred from resource monitoring from a quadratic to a linear dependence on the number of media service providers that are transmitting (e.g., pushing) information regarding available resources.

According to one embodiment, monitoring and "re-launch" capabilities may be imparted to the SLM 120 itself. This would involve the use of an SLM 120 daemon to monitor the timestamps of the latest SLS database refreshes and attempt to contact SLS machines that are out-of-touch for more than some preset time interval. In some instances, these contact attempts can fail, due to for example, an ongoing network or media service provider failure. However, since such attempts to re-launch the SLS contact would be done asynchronously, according to exemplary embodiments, they will not affect the response time of the SLM 120 to client requests.

Enhanced Push-Based Monitoring

According to one embodiment, the push-based monitoring approach can be modified to reduce the likelihood of the communication by service providers of out-of-date information to the SLM 120. This can be done by having the SLM 120 maintain a short-term record of the media service providers to which it has dispatched recent client tasks. The SLM 120 can then adjust its prediction of resource availability for new jobs accordingly. For example, when a media service task is dispatched to a media service provider less than 1 minute before the resource statistics where last transmitted from that service provider, the resource record of that service provider would be lowered by the resource budget requested by that previously dispatched media service job.

As previously discussed, the selection of a service provider can be made based on a combination of poll-based and push-based data. By using both types of data a more complete picture of available resources may be ascertained. This approach allows the service location manager to adapt its selection of a service location (e.g., service provider) to more closely coincide with available resources.

Figure 11A:
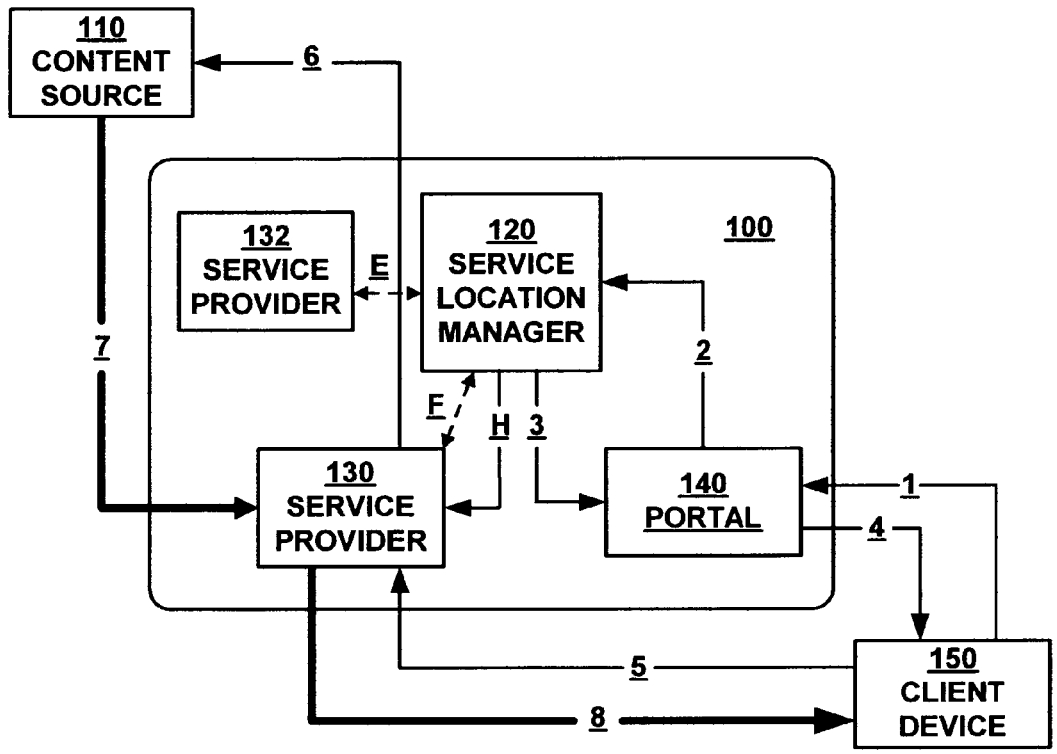
FIG. 11A is a block diagram showing information flow in and out of a system for servicing and delivering content based on resource availability according to yet another embodiment of the present invention.

FIG. 11A is a block diagram showing information flow in and out of system 100 according to another embodiment of the present invention. A difference between FIG. 9 and FIG. 11A is the addition of message H from service location manager (SLM) 120 to the selected service provider (e.g., service provider 130). The message H can be sent from service location manager 120 to service provider 130 at any time after message 2 and before message 5.

Message H can be used for any number of different purposes. For example, in a situation in which the type of service to be performed on the specified item of content is not continuously executing on service provider 130, message H can be used to alert service provider 130 to the approaching need for the service. Consequently, the set up and/or start up of the service can be initiated and perhaps completed before message 5 is received from client device 150, reducing overall latency.

Also, message H can be used to provide to service provider 130 the identity of the item of content and perhaps the identity of the content source 110. With this information, service provider 130 can request content source 110 to provide (e.g., begin streaming) the item of content before message 5 is received, further contributing to a reduction in latency. In addition, the use of message H in this manner can result in improved security, because the content source 110 does not have to be identified to the client device 150, for example.

Figure 11B:
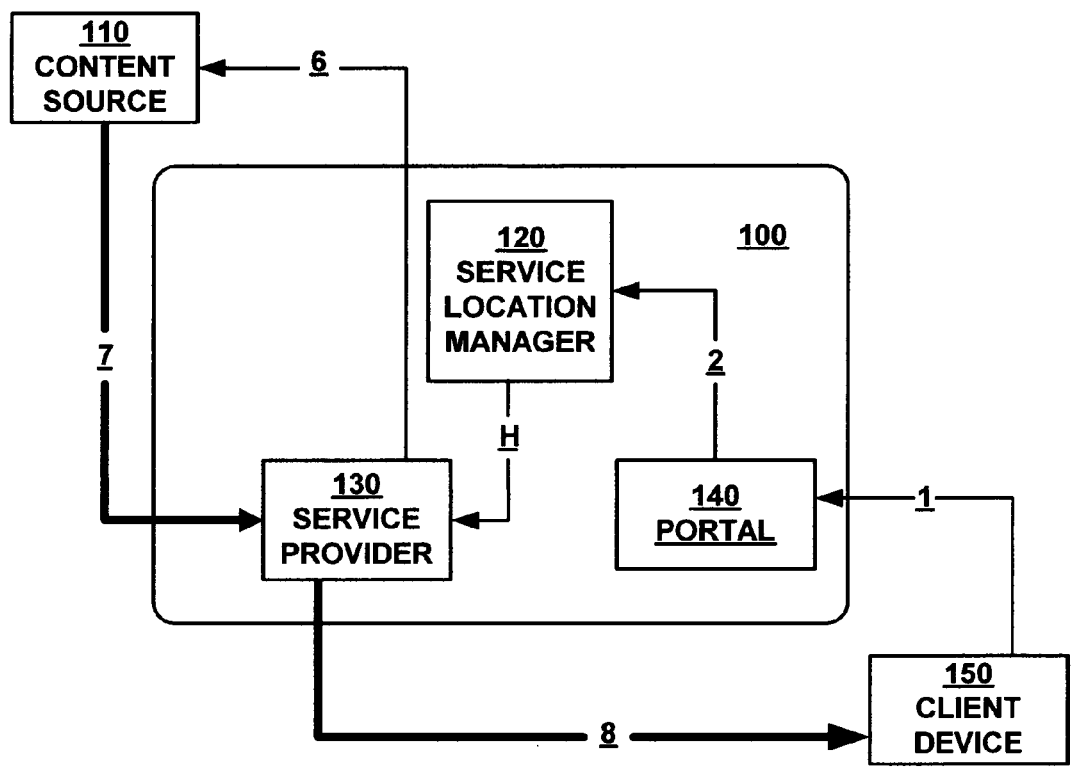
FIG. 11B is a block diagram showing information flow in and out of a system for servicing and delivering content to a client device according to still another embodiment of the present invention.

Furthermore, message H can be used in lieu of messages 3, 4 and 5 as illustrated in FIG. 11B. For instance, in addition to identifying the item of content and perhaps the content source, message H can also include information enabling service provider 130 to establish communication with client device 150. In other words, instead of having client device 150 initiate the transfer of communication from portal 140 to service provider 130, the transfer of communication can be initiated by service provider 130 in a manner that remains seamless and transparent to a user of client device 150.

As discussed with reference to FIG. 9, messages E, and F (of FIG. 3) represent the resource monitoring communications that are transmitted or received by SLM 120. These messages are represented in FIG. 3 by dashed double headed arrows E, F and G. These messages can constitute either a poll-based transmission of a request to a service provider, a push-based transmission of information regarding the resource availability of a service provider to the SLM 120, or a combination of both.

Figure 12:
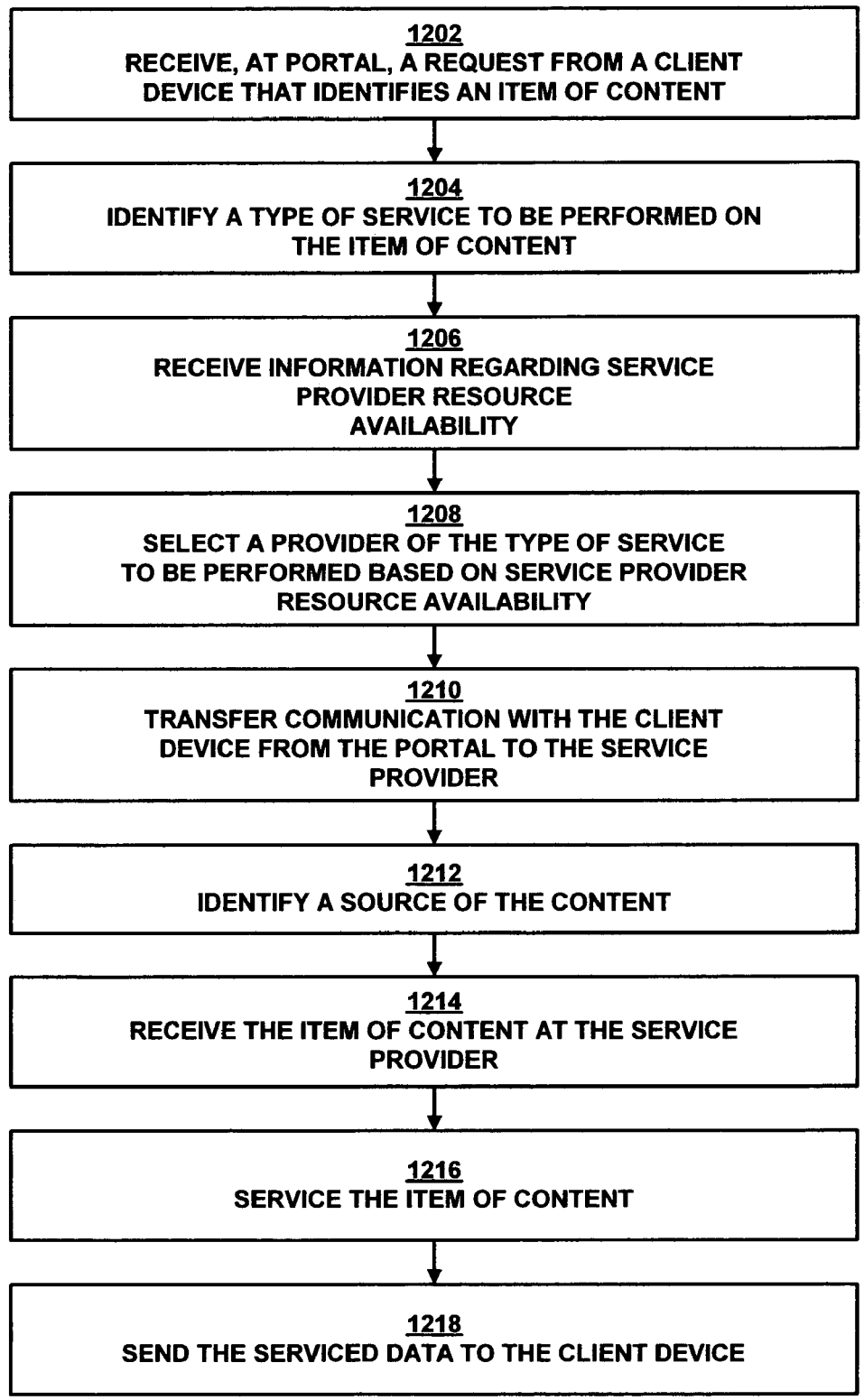
FIG. 12 illustrates a method for servicing and delivering content based on resource availability according to one embodiment of the present invention.

FIG. 12 is a flowchart 1200 of a method for servicing and delivering service result content according to one embodiment of the present invention. Although specific operations are disclosed in flowchart 1200, such operations are exemplary. That is, embodiments of the present invention are well suited to performing various other operations or variations of the operations recited in flowchart 1200. It is appreciated that the operations in flowchart 1200 may be performed in an order different than presented, and that not all of the operations in flowchart 1200 may be performed.

All of, or a portion of, the methods described by flowchart 1200 can be implemented using computer-readable and computer-executable instructions which reside, for example, in computer-usable media of a computer system or like device. In the present embodiment, flowchart 1200 is implemented by system 100 of FIGS. 9-11B. That is, some of the operations recited in flowchart 1200 are performed by portal (e.g., 140), others by service location manager (e.g., SLM 120), and yet others by service provider (e.g., 130, 132, and 1030) of FIGS. 9-11B.

In operation 1202 of FIG. 12, during a session with a client device, a portal receives a request from the client device, identifying an item of content. The request can include other information. In one embodiment, with reference to FIGS. 9 and 11A, portal 140 receives message 1 from client device 150.

In operation 1204 of FIG. 12, a type of service to be performed on the item of content is identified. The type of service can be identified in the request of operation 1202, or it can be derived based on information provided in that request. Referring to FIGS. 9 and 11A, the type of service can be identified by the client device 150, by the portal 140, or by the service location manager 120.

In operation 1206 of FIG. 12, information regarding current resource availability is received from a plurality of service providers. The information is ascertained from ongoing resource measurements. The resource measurements that are received can include both poll-based and push-based data. According to one embodiment, the selection can be made based on a combination of poll-based and push-based data. This approach allows the service location manager to adapt its selection of a service location (e.g., service provider) to coincide with available resources.

In operation 1208 of FIG. 12, a provider of the type of service is selected from a number of providers capable of performing the service. In one embodiment, with reference also to FIGS. 9 and 11A, a service provider (e.g., service provider 130, etc.) is selected by SLM 120. As mentioned above, The SLM 120 can use either poll-based or push-based resource availability information that allows the service location manager to adapt its selection of a service location (e.g., service provider) to coincide with available resources.

In addition, the SLM 120 can select a service provider at random or using a scheme such as a round-robin scheme. Alternatively, SLM 120 can maintain a record that reflects which of the service providers other sessions have been transferred to. In this latter approach, SLM 120 selects a service provider based on the information in the record.

In operation 1210 of FIG. 12, communication with the client device is transferred from the portal to the selected service provider. In other words, the session is transferred from the portal to the selected service provider.

In operation 1212 of FIG. 12, a source of the item of content is identified. Referring to FIGS. 9 and 11A, the source of the item of content can be identified by the client device 150, by the portal 140, by the SLM 120, or by the selected service provider (e.g., service provider 130). The content source is then contacted to begin delivery of data for the item of content to the selected service provider.

In operation 1214 of FIG. 12, the item of content is received by (e.g., streamed to) the selected service provider.

In operation 1216, the item of content is serviced according to the specified type of service. Data constituting the item of content can be serviced as the data are received at the service provider, or the data can be cached before servicing. As mentioned above, an item of content may have been serviced, may be in the process of being serviced, may not be serviced, or may not yet be serviced. Servicing of an item of content can include the analysis or processing of an item of content. Service result content may consist of: a modified version of the original serviced item of content (e.g., when background removal is applied to a video stream); an item of content that is derived from the original item of content (e.g., when optical character recognition is used to produce text output); an item of content that is passed through a service provider and is not modified but merely forwarded (e.g., content that does not require transcoding when received by a transcoding service provider); or an item of content that has been previously sent to a service provider and is now cached/stored on the service provider (e.g., content that was previously serviced and is now stored in memory at the service provider). Additionally, service result content may consist of any combination of the above examples.

In one embodiment, the service is executed continuously by the service provider. In another embodiment, the service is not set up or does not start operating until the client device establishes communication with the service provider. In yet another embodiment, the service is set up and/or starts up after the service provider is identified by the service location manager, before the client device establishes communication with the service provider. For example, with reference to FIGS. 11A and 11B, after SLM 120 selects service provider 130 as a provider of the specified type of service, a message E is sent to service provider 130, causing service provider 130 to set up and/or start up the service.

In operation 1218 of FIG. 12, the service result content is sent (e.g., streamed) to the client device. The data constituting the service result can be sent as the input data are serviced, or the service result data can be cached before it is sent.

The operations 1214, 1216 and 1218 can be performed concurrently. That is, the selected service provider (e.g., service provider 130 of FIGS. 9-11B) can begin servicing the item of content before the entire item of content is received at service provider 130, and service result data can begin to flow out of service provider 130 before the servicing of the entire item of content is completed. Similarly, the servicing of one portion of an item of content can be in progress while the result of servicing another portion of the item of content is being received by the client device.

Once the service result content is delivered to client device 150 (FIGS. 9 and 11A), the session can be terminated. It should be appreciated that a service session may be terminated upon the completion of a service session or prior to the completion of a service session where the requested tear down of the service session has been made. In an embodiment in which SLM 120 keeps some sort of record of providers that have been assigned sessions, the record can be updated once the session is terminated or once a service provider has serviced an item of content. Approaches for updating the record have been described above.

Figure 13:
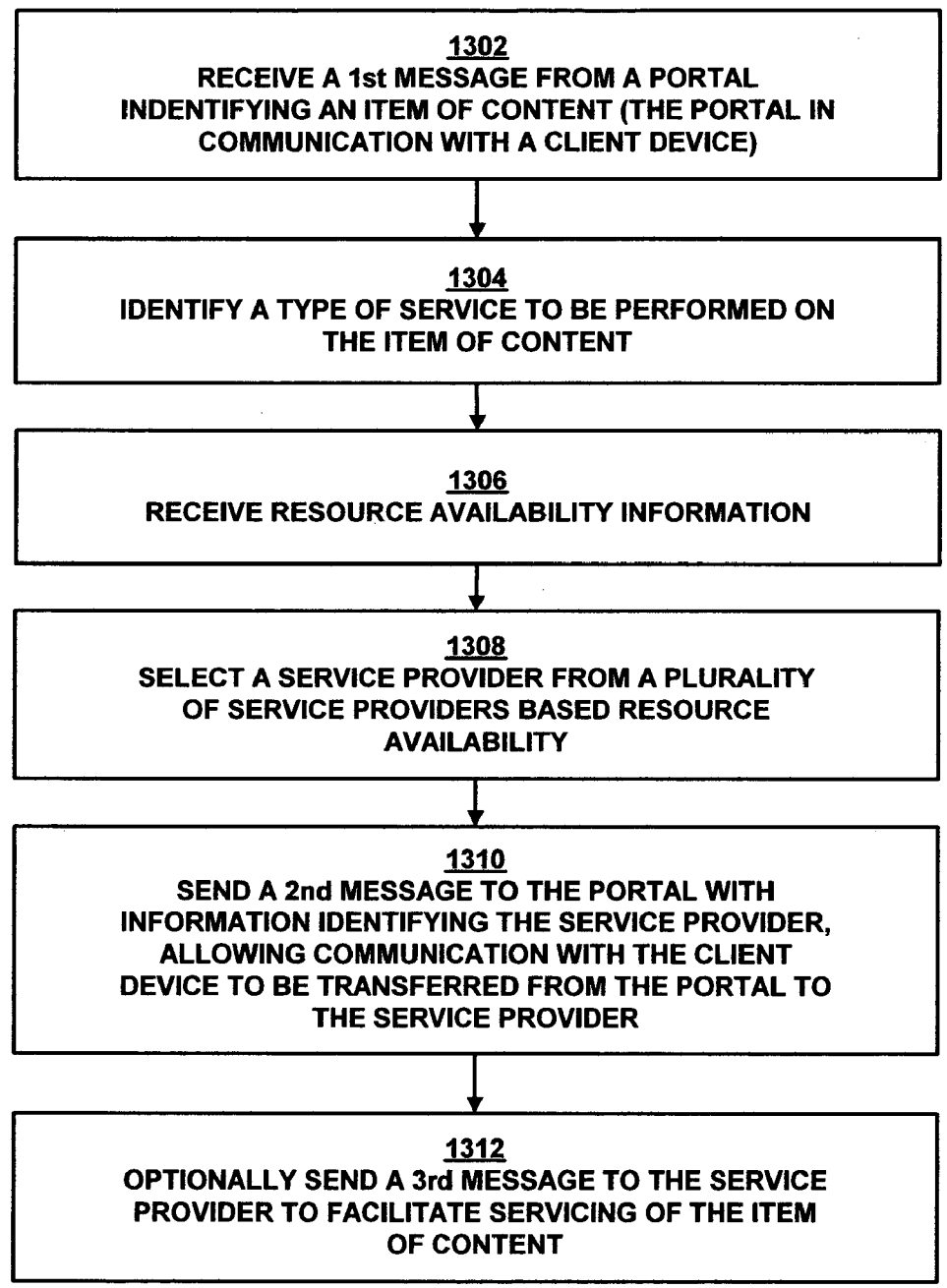
FIG. 13 illustrates a method for managing the servicing of content based on resource availability according to one embodiment of the present invention.

FIG. 13 is a flowchart 1300 of a method for managing the servicing of content according to one embodiment of the present invention. Although specific operations are disclosed in flowchart 1300, such operations are exemplary. That is, embodiments of the present invention are well suited to performing various other operations or variations of the operations recited in flowchart 1300. It is appreciated that the operations in flowchart 1300 may be performed in an order different than presented, and that not all of the operations in flowchart 1300 may be performed.

All of, or a portion of, the methods described by flowchart 1300 can be implemented using computer-readable and computer-executable instructions which reside, for example, in computer-usable media of a computer system or like device. In the present embodiment, flowchart 1300 is implemented by system 100 of FIGS. 9-11B. Specifically, flowchart 1300 is implemented by service location manager 120 of FIGS. 9-11B.

In operation 1302 of FIG. 13, referring also to FIGS. 9 and 11A, a first message (e.g., message 2) is received from portal 140, identifying an item of content. Portal 140 is in communication with client device 150.

In operation 1304 of FIG. 13, a type of service to be performed on the item of content is identified. The type of service can be identified in the message of operation 1302. Referring to FIGS. 9 and 11A, the type of service can be identified by the client device 150, by the portal 140, or by the service location manager 120.

In operation 1306 of FIG. 13, information regarding current resource availability is received from a plurality of service providers. The information is ascertained from ongoing resource measurements. The resource measurements that are received can include both poll-based and push-based data. According to one embodiment, the selection can be made based on a combination of poll-based and push-based data. This approach allows the SLM 120 to adapt its selection of a service location (e.g., service provider 130) to coincide with available resources.

In operation 1308 of FIG. 13, referring also to FIGS. 9 and 11A, a provider of a type of service to be performed on the item of content is selected (e.g., service provider 130 is selected). Approaches for selecting a service provider have been previously described herein.

In operation 1310 of FIG. 13, in one embodiment, a second message (e.g., message 3 of FIGS. 9 and 11A) is sent to the portal. In another embodiment, the second message is sent to the client device, bypassing the portal. The second message includes information that identifies the selected service provider, allowing communication between the client device to be transferred from the portal to the service provider (e.g., from portal 140 to service provider 130 of FIGS. 9 and 11A).

In operation 1312 of FIG. 13, in one embodiment, a third message (e.g., message H of FIGS. 11A and 11B) is sent to the selected service provider. The third message can include the identity of the item of content and/or the identity of the content source. The third message can also be used to alert the service provider, allowing the service provider to begin setting up and/or executing the service (if the service is not already executing). In response to the third message, the service provider can also contact the content source, to initiate delivery (e.g., streaming) of the item of content from the content source to the service provider. In lieu of a third message, the activities just described can begin in response to the client device and the service provider establishing communication. Service result content is then sent (e.g., streamed) from the service provider to the client device.

In summary, embodiments of the present invention provide methods and systems that can provide services to a large number of diverse client devices. A variety of services are provided to accommodate the preferences and requirements of the diverse clients. To avoid congestion, the services are provided by a number of service providers managed by a service location manager. Items of content requested by the client devices are directed to the service providers for servicing based on service provider resource availability. However, the client devices need only contact a well-published portal site to begin a session and to request items of content. The client devices are automatically and transparently transferred to the appropriate service provider during the session. From the perspective of the client device, there is a single point of contact. Transparent to the client device is the flow of messages and data through the content delivery system that results in the delivery of service result content to the client device via a service provider selected by the system. Transparent to the end user at the client device is the seamless transfer of the session from the initial point of contact to the selected service provider.

Managing Handoff of Media Service Sessions

Figure 14A:
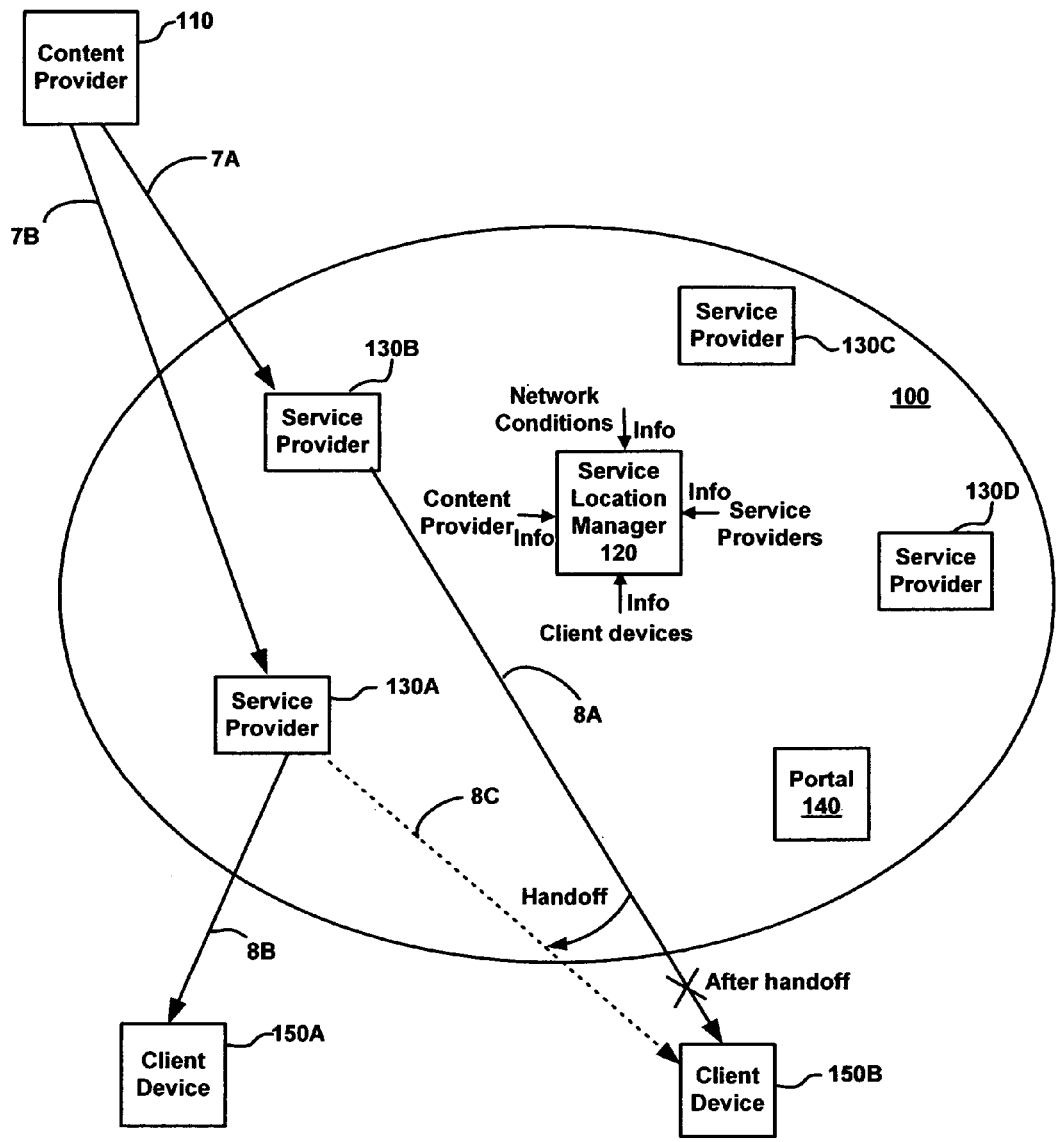
FIG. 14A illustrates a system for managing handoff of media service sessions among service providers in accordance with an embodiment of the present invention.

FIG. 14A illustrates a system 100 for managing handoff of media service sessions among service providers in accordance with an embodiment of the present invention. FIGS. 1, 2A, and 2B focused on establishing the media service session represented by arrows 7 and 8, whereas the media service session includes a content source/provider 110, a service provider 130, and a client device 150. However, FIG. 14A focuses on managing the handoff of media service sessions from one service provider to another service provider.

As described above, the system 100 includes a plurality of service providers 130A-130D, a service location manager 120 (or service manager), a portal 140, and a plurality of client devices 150A-150B. The functionality of these components is well described above. Additionally, these components are networked together. It should be understood that system 100 can have more than one service location manager 120. Moreover, these components can be implemented in hardware, software, or a combination thereof. In an embodiment, the media service session uses a streaming technique.

Figure 14B:
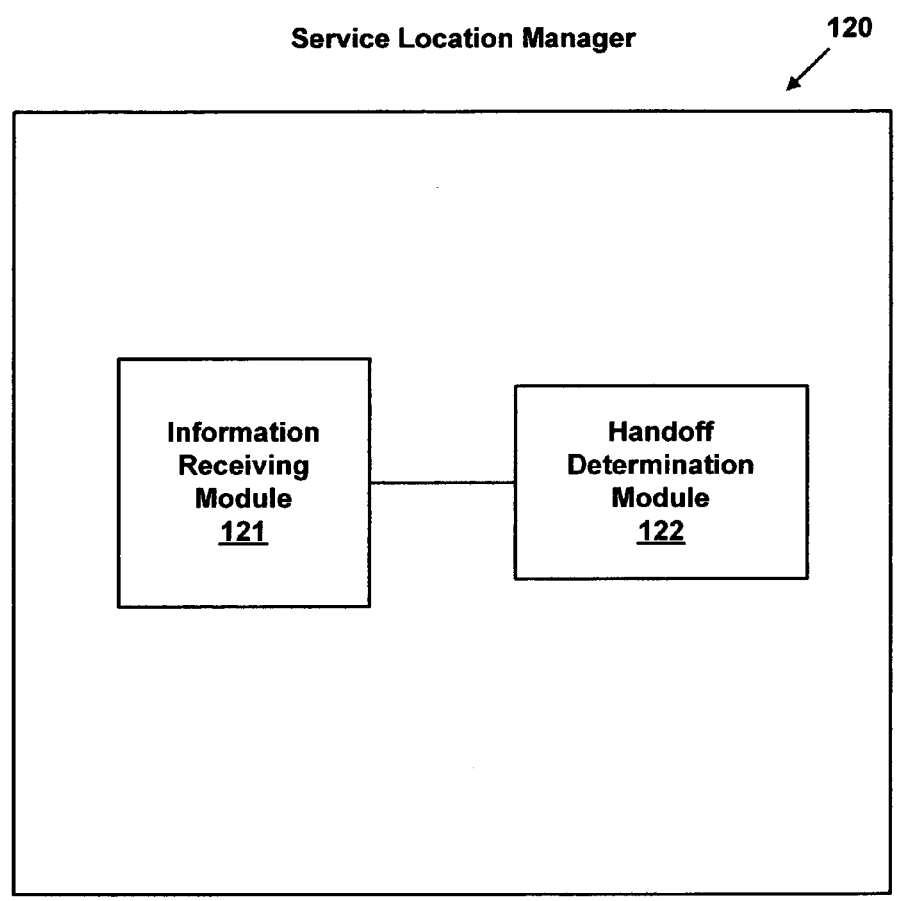
FIG. 14B illustrates a block diagram showing a service location manager in accordance with an embodiment of the present invention.

FIG. 14B illustrates a block diagram showing a service location manager 120 in accordance with an embodiment of the present invention. As depicted in FIG. 14B, the service location manager 120 includes an information receiving module 121 for receiving information, whereas the information relates to the media service sessions. Moreover, the service location manager 120 has a handoff determination module 122 for using the information to determine whether to initiate a handoff of any of the media service sessions from a service provider to another service provider. It should be understood that the service location manager 120 can have other configurations.

In practice, the service location manager 120 manages the handoff of media service sessions among the service providers 130A-130D. Here, there is a first media service session represented by arrows 7A and 8A, whereas the first media service session includes content provider 110, service provider 130B, and client device 150B. Moreover, there is a second media service session represented by arrows 7B and 8B, whereas the second media service session includes content provider 110, service provider 130A, and client device 150A.

As will be fully described below, the service location manager 120 has initiated a handoff of the first media service session from service provider 130B to service provider 130A. Thus, the handoff causes service provider 130A to establish the link 8C with client device 150B, while the service provider 130B terminates the link 8A with client device 150B. In effect, a third media service session is established and is represented by arrows 7B and 8C, whereas the third media service session includes content provider 110, service provider 130A, and client device 150B.

As depicted in FIG. 14A, the service location manager 120 receives a plurality of information relating to the media service sessions. The information can be received at the information receiving module 121 from numerous sources. For example, information is received from the service providers 130A-130D, the client devices 150A-150B, the content provider 110, and from the network conditions of the system 100. The information is any type of information that enables the service location manager 120 to determine whether to initiate handoff of any media service sessions. The service location manager 120 aggregates this information and is able to make better and more intelligent determinations on whether to initiate a handoff of any of the media service sessions from one service provider to another service provider. In particular, the service location manager 120 is able to coordinate the load balancing of the service providers 130A-130D, and to provide the required level of service to high priority client devices and to low priority client devices.

The service location manager 120 uses the information to predict and detect the occurrence of problems that can affect the media service sessions. In an embodiment, the handoff determination module 122 provides this functionality. Hence, the service location manager 120 pro-actively or in anticipation of these problems (e.g., service provider malfunctions, reduced processing speed by a service provider, etc.) initiates handoff of media service sessions among the service providers 130A-130D so that the client device does not experience a reduced quality of service. Moreover, the information enables the service location manager 120 to initiate the handoff before a need for the handoff is absolutely necessary, increasing quality of service and reducing interruptions to the client device. That is, fault tolerance is supported by the system 100.

Furthermore, the service location manager 120 uses the information to determine patterns that enable the service location manager 120 appropriately initiate handoff of the media service sessions. One pattern may indicate the time of day that particular service providers experience excessive loads. Another pattern may indicate network traffic levels throughout the day. The service location manager 120 is able to initiate handoffs of media service sessions from overutilized service providers to underutilized service providers in a coordinated manner throughout the day to avoid overloading service providers and network congestion and bottlenecks.

Moreover, the service location manager 120 is able to determine whether to initiate handoff of media service sessions due to the mobility of the client device. When a client device moves from a position A to a position B, the service location manager 120 may determine to initiate a handoff of the media service session in which the client device is involved due to several reasons. These reasons include increasing quality of service, reducing interruptions to the client device, avoiding overloading the service providers, and avoiding network congestion and bottlenecks.

Additionally, the service location manager 120 is able to determine whether to initiate handoff of media service sessions due to service module migration. As described above, the service providers 130A-130D can provide different types of services. Generally, each service is performed by executing the corresponding service module at the service provider 130A-130D. When a service module currently under execution at a service provider 130B needs to be shut down in order to release resources for other service modules with higher priority, the service location manager 120 may determine to initiate a handoff to migrate the current media service session to another service provider 130A so that the media service session is not interrupted.

Figure 15:
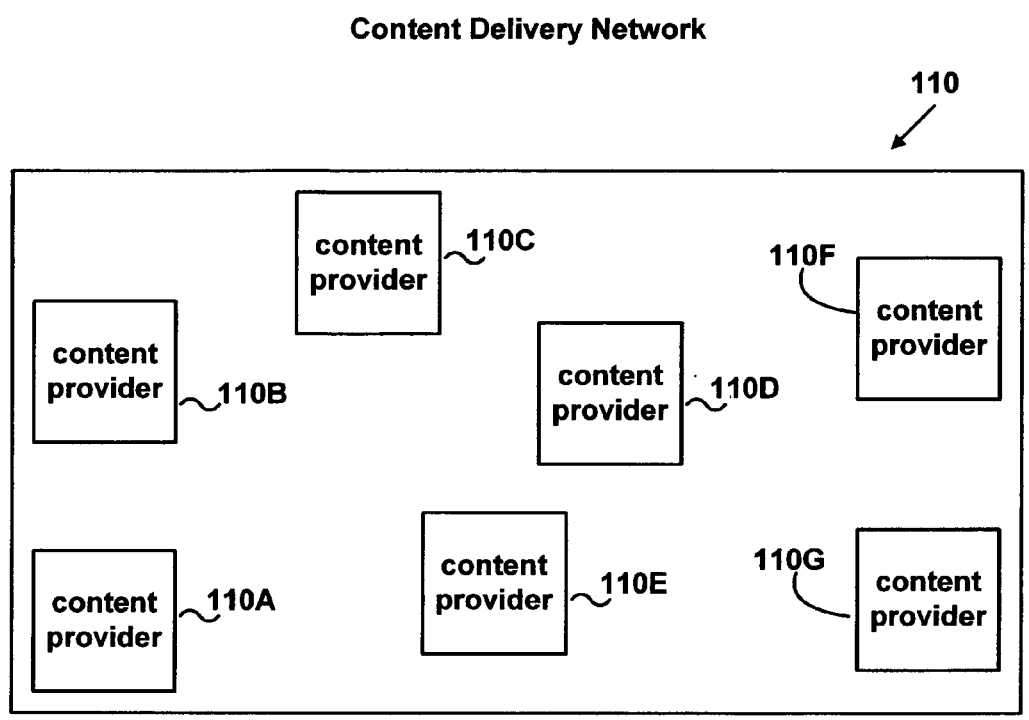
FIG. 15 illustrates a content delivery network that can operate with the system of FIG. 14A in accordance with an embodiment of the present invention.

FIG. 15 illustrates a content delivery network 110 that can operate with the system 100 of FIG. 14A in accordance with an embodiment of the present invention. In FIG. 15, the content provider is replaced with a content delivery network 110. The content delivery network 110 includes a plurality of content providers 110A-110G distributed within the content delivery network 110. The service location manager 120 receives information from the content delivery network 110 to enable the service location manager 120 to determine whether to initiate a handoff of a media service session.

If it is assumed in FIGS. 14A and 15 that the content provider 110A provides the links 7A and 7B to service providers 130A and 130B, the service location manager 120 may initiate a handoff of the media service session from service provider 130B to another service provider if another content provider (e.g., content provider 110G) replaces the content provider 110 for any reason. The service location manager 120 may determine that service provider 130D is closer to the content provider 110G, initiating a handoff from service provider 130B to service provider 130D. Thus, this capability increases the quality of service, reduces interruptions to the client device, avoids overloading the service providers, and avoids network congestion and bottlenecks.

Figure 16:
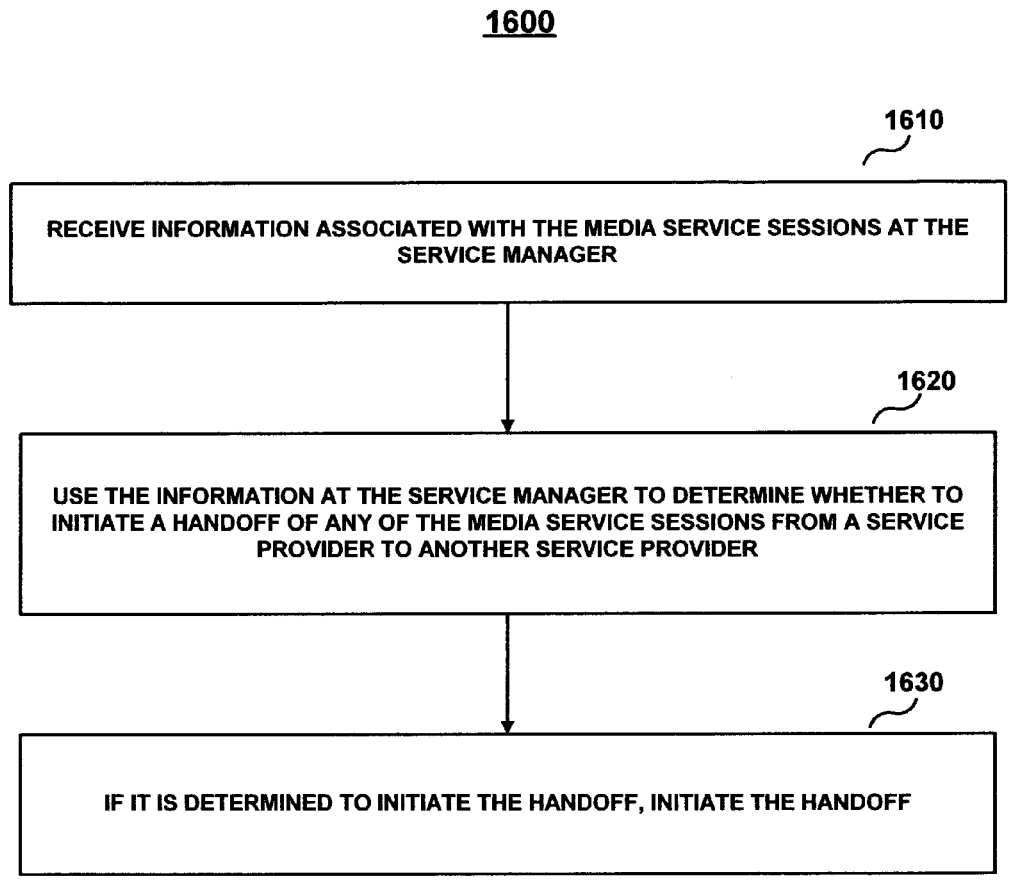
FIG. 16 illustrates a flow chart showing a method of managing handoff of media service sessions among service providers in accordance with an embodiment of the present invention.

FIG. 16 illustrates a flow chart showing a method 1600 of managing handoff of media service sessions among service providers in accordance with an embodiment of the present invention. Reference is made to FIGS. 14A and 15. In an embodiment, the present invention is implemented as computer-executable instructions for performing this method 1600. The computer-executable instructions can be stored in any type of computer-readable medium, such as a magnetic disk, CD-ROM, an optical medium, a floppy disk, a flexible disk, a hard disk, a magnetic tape, a RAM, a ROM, a PROM, an EPROM, a flash-EPROM, or any other medium from which a computer can read.

At operation 1610, the service location manager 120 receives information associated with the media service sessions from several sources (e.g., service providers 130A-130D, the client devices 150A-150B, the content provider 110, from the network conditions of the system 100, etc.). This information will enable the service location manager 120 to initiate handoffs of the media service sessions among the service providers 130A-130D.

Further at operation 1620, the service location manager 120 uses the information received to determine whether to initiate a handoff of any of the media service sessions from a service provider to another service provider. The handoff is intended to increase the quality of service, reduce interruptions to the client device, avoid overloading the service providers, and avoid network congestion and bottlenecks.

Moreover, at operation 1630, if the service location manager 120 determines to initiate the handoff, the handoff is initiated between the service providers (e.g., from service provider 130B to service provider 130A).

Service Management Using Multiple Service Location Managers

Figure 17A:
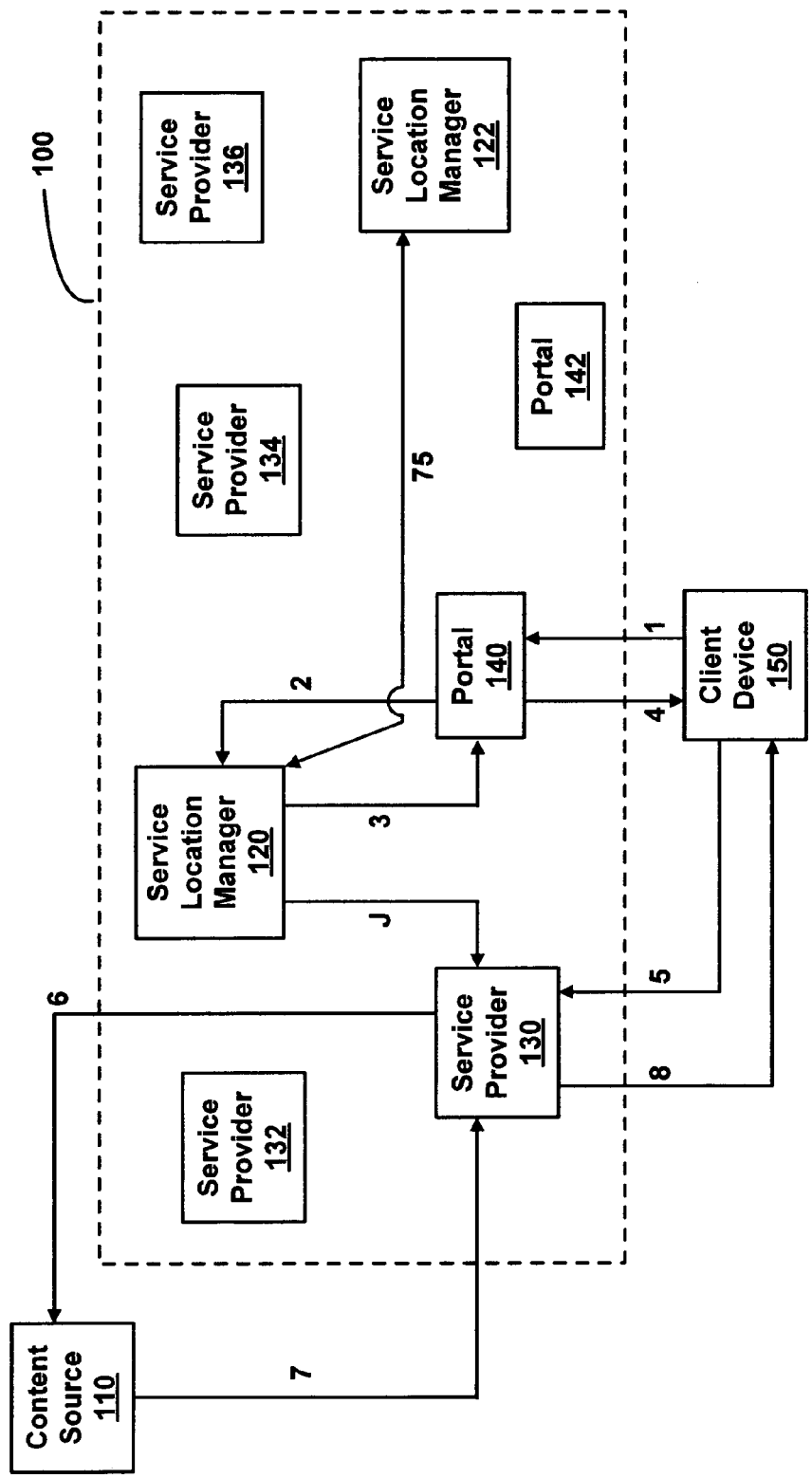
FIG. 17A is a block diagram showing information flow in and out of a system for servicing and delivering content to a client device according to one embodiment of the present invention.

FIG. 17A is a block diagram of a system 100 for servicing content from a content source 110 and for delivering the service result content to a client device 150 in accordance with an embodiment of the present invention. System 100 includes a plurality of service location managers exemplified by service location managers 120 and 122, a plurality of service portals exemplified by service portals 140 and 142, and a plurality of service providers exemplified by service providers 130, 132, 134 and 136. The service location managers 120 and 122, the portals 140 and 142, and the service providers 130, 132, 134 and 136 are logical entities that can be implemented on a single device or using multiple devices. Thus, system 100 can be representative of, for example, a single computer system that implements the functionality of service location managers 120 and 122, the portals 140 and 142, and the service providers 130, 132, 134 and 136. Alternatively, system 100 can encompass different nodes or devices in a computer system network. These nodes may be server computer systems, switches, routers or the like, having processing and memory capabilities sufficient to perform the various functionalities to be described herein. It is noted that the functionality provided by system 100 can be implemented using one or more devices. Furthermore, although system 100 is described with portals 140 and 142, there can be more than or less than two of these elements. In addition, there can be more or less service providers than the service providers 130, 132, 134 and 136. Moreover, there can be more service location managers than the service location managers 120 and 122.

System 100 can be implemented in an existing computer system network by overlaying the functionality of service location managers 120 and 122, service providers 130, 132, 134 and 136, and/or portals 140 and 142 onto the existing network. That is to say, all or a part of the functionality provided by system 100 can be incorporated into existing network nodes. Alternatively, all or part of system 100 can be implemented by adding nodes into an existing network. For example, existing content sources and portals may be used, with nodes added for servicing content and for managing service providers.

Within FIG. 17A, system 100 can communicate with a content source 110 and a client device 150. Although system 100 is described with a single content source 110 and client device 150, there can be more than one of each of these elements. Communication between system 100, content source 110 and client device 150, as well as communication within system 100, can include wired and/or wireless communication technologies.

Portals 140 and 142 can each be well-published portal sites that can each serve as the first point of contact between client device 150 and system 100. It is noted that portal 140 can perform an additional function of monitoring for billing purposes how long a client device (e.g., 150) has been coupled to system 100 and what content it has received. Content source 110 stores and provides access to one or more items of content.

Client device 150 can be virtually any kind of user device such as, but not limited to, a desktop or laptop computer system, a video-enabled handheld computer system (e.g., a portable digital assistant), a cell phone or any other type of computing device. Client device 150 can be used to request and subsequently receive an item of content. Alternatively, client device 150 can be used to provide one or more items of content to system 100. For example, client device 150 may deliver content to a service provider (e.g., 130) for a service to be performed (e.g., video background removal) on the content before it is subsequently stored by a content source (e.g., 110) or sent to another client device (not shown).

Within FIG. 17A, an item of content can refer to media or non-media data that can be live or recorded. For example, an item of content can include, but is not limited to, video-based data, audio-based data, image-based data, web page-based data, graphic data, text-based data or some combination thereof. For instance, an item of content can be a movie of digital video disk (DVD) quality.

A type of service may be performed on an item of content before the content is provided to client device 150. Alternatively, a type of service may be performed on an item of content after delivery of the content from client device 150 to a service provider (e.g., 130) has commenced. Types of services can include the processing of an item of content and/or the analysis of an item of content. For example, types of services can include video processing such as, but not limited to, transcoding, resizing of the video, jitter removal, dynamic cropping and resizing of the video stream based on spatial bounds determined from face detection, optical character reading from video, video background removal, and the like. Additionally, other types of services can include audio processing such as, but not limited to, audio background removal, audio silence detection, audio speed up or slow down, audio enhancement, noise reduction, speech recognition, speaker identification, speech/music discrimination, laughter detection, music analysis, and the like.

The analysis of an item of content can include, but is not limited to, speech recognition that produces a text transcript, or optical character recognition applied to one or more video images of a video stream to produce a text output. A video-based person tracking service that outputs a stream of records of person location and times is another example that can be used to illustrate analysis of an item of content. The locations might be expressed in terms of image coordinates, but may be more useful when expressed in terms of physical world coordinates (e.g., "x,y" coordinates referenced to the floor of a room). Another example that can be used to illustrate an analysis of an item of content pertains to a face detector service that outputs snapshots of faces extracted from a video stream, the times and image locations at which the snapshots were detected, identities for the faces, and/or the classification of the faces. Some portion of this information can be represented as text data.

As used herein, an item of content may have been serviced, may be in the process of being serviced, may not be serviced, or may not yet be serviced. In other words, an item of content, whether serviced or not, can still be referred to as an item of content. Servicing of an item of content can include the analysis or processing of an item of content. For clarity of discussion, the result of servicing an item of content may be referred to herein using terms such as "service result" or "service result content" or "service result data." Service result content may consist of, but is not limited to: a modified version of the original serviced item of content (e.g., when background removal is applied to a video stream); an item of content that is derived from the original item of content (e.g., when optical character recognition is used to produce text output); an item of content that is passed through a service provider and is not modified but merely forwarded (e.g., content that does not require transcoding when received by a transcoding service provider); or an item of content that has been previously sent to a service provider and is now cached (stored) on the service provider (e.g., content that was previously serviced and is now stored in memory at the service provider) so that it may be provided to requesters. Additionally, service result content may consist of any combination of the above examples.

Continuing with reference to FIG. 17A, services such as those described above can be performed by service providers 130, 132, 134 and 136. Service providers 130, 132, 134 and 136 each function to provide one or more types of services. That is, service providers 130, 132, 134 and 136 can each provide multiple and different types of services. For example, service provider 130 can be used for transcoding one item of content and for background removal of another item of content. Different types of services can be performed in parallel on different items of content. That is, service providers 130, 132, 134 and 136 can perform services on different but concurrent content streams. Service providers 130, 132, 134 and 136 can also provide caching services. For example, service provider 130, 132, 134 or 136 can cache an item of content, in whole or in part, before the item of content is serviced by service provider 130, 132, 134 or 136. Similarly, service provider 130, 132, 134 or 136 can cache the service result, in whole or in part, before the service result content is forwarded to the client device 150.

Service location managers 120 and 122 function to select a service provider (e.g., service provider 130, 132, 134 or 136) that can perform a requested type of service on an item of content to produce a service result that is provided to a client device 150. One or more service providers are known to each service location manager, and each service location manager selects among the service providers known to it in order to assign a service provider to perform a requested service. A service location manager may be understood to "supervise", or "to be a supervisor of", any service provider that is among the set of service providers from which it selects a service provider to perform a requested service. In various embodiments of the invention, the sets of service 6providers supervised by two different service location managers may be disjoint (e.g., containing no service providers in common), exactly the same, or partially overlapping (e.g., some service providers are in both sets, but some that are in one set are not in the other). For example, with reference to FIG. 17A, service providers 130, 132, 134 and 136, and any other available service providers, may all be supervised by both service location managers 120 and 122. Alternatively, service providers 130 and 132 may be supervised just by service location manager 120, while service providers 134 and 136 may be supervised just by service location manager 122. In another embodiment, service providers 130, 132 and 134 may be supervised just by service location manager 120 while service providers 134 and 136 may be supervised just by service location manager 122.

In some embodiments, each service location manager (e.g., 120 and 122 of FIG. 17A) maintains a record or listing of the service providers that it supervises. In some embodiments, for each service provider (e.g., 130, 132, 134 and 136 of FIG. 17A), the types of services that each service provider can perform, or can be made to perform, are also known to and recorded by each of the service location managers that supervise it. Further, in some embodiments, for each service provider, the available resources associated with each of the service providers are also known to and recorded by each of the service location managers that supervise it. The "available resources" of a service provider may refer to the computational, memory, network bandwidth, hardware, and other types of resources that are managed by the service provider and that may be disposed toward performing a requested service. In general, the available resources of a service provider may be less than its total resources. Within FIG. 17A, for example, if service location manager 120 supervises service providers 130 and 132, then the available resources associated with the service providers 130 and 132 are known to and recorded by service location manager 120. The resources associated with service providers 130, 132, 134 and 136 can include computational or hardware resources, such as but not limited to, the processor speed, total memory capacity, and special-purpose processors associated with each of the service providers. The resources associated with service providers 130, 132, 134 and 136 can also include network resources, such as but not limited to, the total bandwidth available at each of the service providers for receiving content and for sending content. In general, in one embodiment, service location manager 120 has knowledge of the available resources of the service providers (e.g., 130 and 132) it supervises while service location manager 122 has knowledge of the available resources of the service providers (e.g., 134 and 136) it supervises.

With reference to FIG. 17A, in some embodiments, the knowledge and records of the available service provider (e.g., 130, 132, 134, and 136) resources maintained by the service location managers (e.g., 120 and 122) may be based in part upon information obtained prior to the reception by the service location managers of any requests for services from client devices (e.g., 150). This information can be referred to as "static" resource information. In some embodiments, the knowledge and records of the available service provider resources maintained by the service location managers may be updated over time, after requests for services have been received and assigned by the service location managers, based on information received from the service providers. This information can be referred to herein as "dynamic" resource information. A service location manager can utilize both poll-based and push-based data gathering to update its records with dynamic resource information. Poll-based resource information gathering can involve the transmission of requests to service providers (e.g., 130 and 132), by a supervising service location manager (e.g., 120), as a means of eliciting information from the service providers regarding resource availability. Push-based information gathering can involve the periodic "push" or transmission of information regarding resource availability to a service location manager (e.g., 120) by the service providers (e.g., 130 and 132) it supervises. A combination of both poll-based and push-based information gathering can be employed according to one embodiment. In some embodiments, the knowledge and records of the available service provider resources maintained by the service location managers may be based in part upon both static and dynamic resource information.

In some embodiments, when a service location manager (e.g., 120 or 122) receives a request for an item of content that entails performing a service on the item of content, the service location manager (e.g., 120 or 122) may make a prediction or estimate of the resources needed to perform that service.

When a service provider is selected to perform a newly requested service, the service location manager's record of the estimate of the service provider's available resources can be revised to reflect that these resources are at least partially allocated to performing the newly requested service. For example, if the requested service is expected to require N megabytes of memory in service provider 130, then the service location manager's record of the available memory resources of service provider 130 is updated to indicate that N megabytes of memory have been allocated. Alternatively, the amount of available memory resources recorded by the service location manager (e.g., 120 or 122) for service provider 130 can be reduced by N megabytes. As will be seen, the record of available resources associated with a service provider can be similarly adjusted (e.g., increased) when, for example, a service is completed by a service provider.

As mentioned previously, multiple client devices may each participate in a session that may involve requesting a service to be performed on an item of content. For each session handled by the service location manager (e.g., 120 or 122) in which an item of content is to be serviced, the service location manager (e.g., 120 or 122) will select a service provider to perform the service. The various embodiments of the methodology described above are applied to each session in progress, so that the service location manager (e.g., 120 or 122) has an updated record of the resources allocated by and/or the resources available on each service provider supervised by the service location manager (e.g., 120 or 122).

In essence, according to one embodiment, the service location manager (e.g., 120 or 122) has a budget of resources available to perform services. More specifically, the service location manager (e.g., 120 or 122) has a budget of the resources available at each service provider that it supervises. For each session requesting that a service be performed, an estimate of the resources involved for that service can be made by the service location manager (e.g., 120 or 122). For each session dispatched to a service provider, the budget of available resources for that service provider can be reduced by the estimate. As sessions are terminated, or as services are completed, the budget of available resources of the service location manager (e.g., 120 or 122) can be increased to reflect that resources have become available again. Updates of the budget of available resources may be obtained dynamically, through poll-based or push-based data gathering between the service location manager and the service providers it supervises, while one or more services are in progress on the service providers. The estimate of the size and distribution of the resource budget is thereby always relatively current, and can be used as a basis by the service location manager (e.g., 120 or 122) for selecting a service provider for each new session.

Note that, in alternative embodiments, a service provider can be selected by the service location manager (e.g., 120 or 122) to perform a service based on the resources available on each service provider or based on the resources already allocated, without regard to the estimate of resources needed to perform that service, or a service provider can be selected by the service location manager (e.g., 120 or 122) to perform a service based on the estimate of resources needed to perform that service, without regard to the resources available or previously allocated for each service provider.

Two network-connected computing devices can be deemed "close" in a network sense if the latency and/or number of network "hops" between them is low, and/or if the bandwidth between them is high. Within FIG. 17A, one embodiment in accordance with the invention can include the functionality that any single service location manager (e.g., 120 or 122) would manage a "region" of service providers that are "close" to it in a network sense. The portal (e.g., 140 or 142) that the client device (e.g., 150) contacts may then pass the service request to a selected service location manager that is close to the requesting client, the content source, or both. For example, the service location manager may be selected based on the content source address or based on the measured closeness of it to the content source network address or the client network address or both. The service location manager regions may overlap. For example, each service location manager can supervise one or more of the same "border" service providers that are approximately as close to it as they are to one or more other service location managers. In these cases, each service location manager can forward records of its service assignments to "neighbor" service location managers that supervise at least one service provider in common, so that these separate service location managers do not independently assign too many services to "border" service providers.

Additionally, if a service location manager forwards all records of service assignments to a least one other service location manager, the service management functionality can be made fault tolerant. For example, if a portal (e.g., 140 or 142) cannot contact a given service location manager (e.g., 120), it can forward a request to a neighbor service location manager (e.g., 122) along with the information that the first service location manager is unavailable. This prompts the available neighbor service location manager to take over the management of the "border" service providers and some or all of the service providers that are in the failed service location manager's region.

In some embodiments, service location managers use information about one or more neighbor service location managers to achieve a greater balance in the distribution of the workload among the service location managers. For example, a service location manager with heavily overloaded service providers, or that is receiving service requests from portals at a very high rate, may begin to "off-load" some of the service requests it receives to neighboring service location managers. More specifically, if the rate at which a given service location manager receives service requests from portals exceeds some threshold, or if a queue of such requests pending for action by the service location exceeds a threshold length, or if the records of available resources on service providers managed by the service location manager indicate that the total available resources in some category falls below a threshold, that service location manager may select a second service location manager to which to forward future and/or pending service requests until the triggering condition is no longer met.

In some embodiments, service location managers may adapt the sets of service providers they supervise. This process of adaptation may consist of adding new service providers to the set supervised by a given service location manager, removing service providers from this set, or both. In some cases, this adaptation may result in an increase in the number of service providers supervised by a given service location manager, while in other cases it may result in a decrease or no change in this number.

In some embodiments, adaptation of the supervised set of service providers for a service location manager (e.g., 120) is triggered when the computational load of the service location manager exceeds a threshold. In response, the service location manager notifies a second service location manager (e.g., 122) that it should take over supervision of some subset of the service providers currently supervised by service location manager 120. In one embodiment, transfer of supervision is facilitated by the sending, from service location manager 120 to service location manager 122, of records regarding the available resources, service assignment status, and other information for the service providers whose supervision is to be transferred. In other embodiments, this transfer of service provider records between service location managers is omitted. In yet other embodiments, service location manager 120 notifies service providers it will cease to supervise and that they should begin sending resource status information to the new supervising service location manager 122. In other embodiments, service location manager 122 initiates push-based or poll-based information gathering for each of the newly supervised service providers on the list sent to it from service location manager 120.

In some embodiments, adaptation of the supervised set of service providers for a service location manager (e.g., 120) is triggered when the total availability of resources, within some category, over all supervised service providers falls below a threshold value. In response, the service location manager requests a second service location manager (e.g., 122) for permission to take over supervision of some subset of the service providers currently supervised by service location manager 120. If permission is denied, or if the number or available resources of service providers offered by service location manager 122 is insufficient, service location manager 120 may make a similar request of a third service location manager (not shown), a fourth (not shown), and so on, until permission to supervise a sufficient number of new service providers and/or service provider resources is granted. The "sufficient" number of new service providers, and/or the sufficient number of new service provider resources, required by service location manager 120 is determined, in one embodiment, based at least in part upon the current rate of service requests received by service location manager 120, the current queue of pending service requests for attention by service location manager 120, or both. In various embodiments, transfer of supervision of service providers between service location managers 120 and 122 may be accomplished by any of the means discussed above for the case in which service location manager 120 wishes to decrease the number of service providers it supervises.

In one embodiment in accordance with the invention, the processing load of each service location manager is monitored. Monitoring can be accomplished through, but is not limited to, occasional or periodic reporting of each service location manager's processor load, pending service request queue length, and/or other information relating to processing load, to another monitoring entity. The reporting may be either poll-based (at the request of the monitoring entity) or push-based (sent by the service location manager at times of its choosing). In some embodiments, the monitoring entity may comprise one or more of the portals (e.g., 140 and 142). In other embodiments, it may comprise one or more of the service location managers (e.g., 120 and 122). In yet other embodiments, it may comprise one or more dedicated computing devices attached to the network and able to communicate with at least some of the service location managers. In some embodiments, no single entity monitors all of the service location managers. For instance, in one embodiment, a given portal (e.g., 140) just monitors the service location managers (e.g., 120 and 122) to which it sends service requests. In other embodiments, monitoring is facilitated through arrangement of communication between the service location managers in a tree-like communication hierarchy, such that processing load status messages are sent between service location managers that are directly linked in the tree, with the messages being sent from the child service location manager to the parent service location manager in the hierarchy. In this way, the service location manager at the top of the tree gathers the status of all service location managers in the network. This service location manager may then inform other service location managers, portals, or other networked computing devices of the overall service location manager processing load status.

System 100 of FIG. 17A in operation is now more fully described. At the beginning of a session, client device 150 sends message 1 to a portal (e.g., 140). It is noted that message 1 identifies a particular item of content (e.g., the name of a movie).

Also, in one embodiment, message 1 includes information sufficient for identifying a type of service that should be performed on the item of content before the service result is delivered to client device 150 and/or to other destination devices. That information can take many forms. In one form, message 1 specifically identifies a type of service (e.g., background removal or speech recognition). In another form, message 1 identifies attributes of client device 150 and/or other destination devices, such as their memory capacity, screen size, processing capability and the like. Based on these attributes, system 100 (e.g., portal 140) can derive a type of service that should be performed (e.g., transcoding). In yet another form, message 1 identifies the type(s) of client device 150 and/or other destination devices, and based on stored knowledge of those types of devices, system 100 (e.g., portal 140) can derive a type of service that should be performed (e.g., transcoding).

Within FIG. 17A, message 1 can include other information. If the source of the item of content is known by client device 150, then the content source (e.g., 110) can also be identified in message 1. For example, message 1 can include the Uniform Resource Locator (URL) for content source 110. If the source of the item of content is not known to client device 150, the content source can be located by system 100 (e.g., by portal 140) if that information is not already known to system 100. In some cases, the client device 150 may be the source of the content.

After receiving message 1, portal 140 selects a service location manager (e.g., 120 or 122) to which to send message 2. It is noted that portal 140 can perform this selection in a wide variety of ways. For example, in one embodiment, portal 140 can maintain a record that includes a single service location manager (e.g., 120) with which to communicate among all possible service location managers of system 100. In this case, portal 140 selects the single service location manager according to its record. Alternatively, in another embodiment, portal 140 can maintain a record including a prioritized list of a subset of service location managers among the plurality of service location managers of system 100. It should be noted that this subset may include all of the plurality of service location managers of system 100, or it may not include some of the service location managers of system 100. From this record of prioritized service location manager list, portal 140 may select the highest priority service location manager (e.g., 120) to handle a new service request from a client device 150. However, if the highest priority service location manager is subsequently determined to be non-responsive to communication from portal 140, then portal 140 can try to communicate with the next highest priority service location manager (e.g., 122) of the record and so forth.

In other embodiments, portal 140 can maintain a record including a list of a subset of service location managers that are available to it among the plurality of service location managers of system 100. It should be noted that this subset may include all of the plurality of service location managers of system 100, or it may not include some of the service location managers of system 100. In one embodiment, portal 140 may select a service location manager randomly from the recorded list. Alternatively, in another embodiment, portal 140 may select a service location manager (e.g., 120) in a round robin manner from the recorded list. For a list of N service location managers, "round robin" selection can be carried out by selecting the first service location manager on the list to handle the first service request, then selecting the second service location manager on the list to handle the second service request, and so on, until the Nth request is received by the portal and passed to the Nth service location manager on the list. The next (N+1th) request can then be passed to the first service location manager on the list, and subsequent requests are passed to successive list service location managers in the order they appear on the list, until the last list entry is again reached and the process again "wraps around" to the first list entry.

In yet another embodiment, portal 140 of FIG. 17A may maintain a record, for each of the service location managers that are available to it from the plurality of service location managers of system 100, that can include the service location manager's available computational power, number of pending service requests, and/or expected latency in assigning a new service request after it is received. This record may be updated over time based on poll-based or push-based gathering of service location manager status, as discussed above. When a new service request is received from client device 150, portal 140 may then pass this request to the service location manager (e.g., 120) from the record that currently has the maximum available computational power, or that may currently be expected to handle the service request fastest once it is received. In this manner, portal 140 is selecting the service location manager that is the least busy.

In another embodiment, each service location manager may maintain a record of their total available computational power of the service providers it supervises, and may propagate this record (e.g., via either push-based or poll-based methods) to one or more portals (e.g., 140). When a new service request is received, portal 140 may then select to pass the request to the service location manager whose supervised set of service providers currently has the most total available computational power. In another embodiment, portal 140 of FIG. 17A may maintain a record including the available network bandwidth of each of the service location managers that are available to it from the plurality of service location managers of system 100. This record may be updated over time based on poll-based or push-based gathering of service location manager status, as discussed above. When a new service request is received from client device 150, portal 140 may select the service location manager (e.g., 120) that currently has the highest bandwidth, according to its record, to handle the service request.

Alternatively, in another embodiment, portal 140 may maintain a record including "network distances" between the service providers it supervises and other computing devices on the network, wherein these distances are a function of network latency and/or number of network "hops" between computing devices on the network. This record of distances may be updated over time based on poll-based or push-based gathering of network status information, and new record elements may be added when service requests are received that involve clients devices or content sources that were previously unknown to the service location manager. When a new service request is received from client device 150, portal 140 can select, according to its record, the service location manager (e.g., 120) that is "nearest" to itself, to client device 150, and/or to the content source required by the service, to handle the service request. However, if the nearest service location manager is subsequently determined to be non-responsive to communication from portal 140, then portal 140 can try to communicate with the next nearest service location manager (e.g., 122) of the record and so forth.

Finally, in yet another embodiment, portal 140 may maintain a record including, for each of the service location managers available to it among the plurality of service location managers of system 100, more than one of the types of information discussed above (e.g., service location manager computational power, pending service request queue length, expected latency in assigning a received request, total supervised service provider available computational power, network distance, and/or network bandwidth). When a new service request is received from client device 150, portal 140 may compute for each available service location manager a function of a combination of the types of information discussed above, according to its record. Portal 140 may then select the service location manager (e.g., 120) that is rated "best" according to the function (e.g., that with highest or lowest function value, depending on the function) to handle the service request.

Once portal 140 has selected a service location manager (e.g., 120), portal 140 sends message 2 to service location manager 120. In one embodiment, message 2 includes information sufficient for identifying a type of service that should be performed on the item of content before the service result is delivered to client device 150 and/or other destination devices. As just described, that information can take many forms. In one form, message 2 specifically identifies a type of service (e.g., background removal or speech recognition). In another form, message 2 identifies attributes of client device 150 and/or other destination devices, such as their memory capacity, screen size, processing capability and the like. Based on these attributes, system 100 (e.g., service location manager 120) can derive or determine a type of service that should be performed (e.g., transcoding). In yet another form, message 2 identifies the type(s) of client device 150 and/or other destination devices, and based on stored knowledge of those types of devices, system 100 (e.g., service location manager 120) can derive or determine a type of service that should be performed (e.g., transcoding). Based on the information provided by message 2, service location manager 120 identifies the type of service to be performed.

It is understood that message 2 can include other information. For example, message 2 can also identify the item of content and/or the content source.

In one embodiment, service location manager 120 (and 122) can maintain a record that includes a list of the service providers (e.g., 130 and 132) and the services they are capable of providing. In one such embodiment, the record maintained by service location manager 120 (and 122) also includes the total resource capacities associated with the service providers (e.g., 130 and 132) it supervises. The record maintained by service location manager 120 (and 122) can also include the resources that are available at each of the supervised service providers (e.g., 130, 132 and 134) for performing requested services. The record maintained by service location manager 120 (and 122) can also include the resources that each of the service providers (e.g., 130 and 132) have previously allocated to other service sessions.

Within the present example, service location manager 120 selects from among the service providers (e.g., 130 and 132) that it supervises which one is to perform the service identified from message 2. In one embodiment, service location manager 120 selects a service provider based on the information provided in the record described above. For example, service location manager 120 can select a service provider based on which service provider has the least amount of resources being utilized or the greatest amount of resources available for performing newly assigned services.

In another embodiment, service location manager 120 estimates the amount of resources associated with performing the service identified in message 2, and uses the estimate to select a service provider (e.g., 130, 132, 134 or 136) to perform the service. Alternatively, service location manager 120 can select a service provider it supervises to perform a service based on both the amount of resources available for performing services on the various service providers (or the amount of resources previously allocated) and the amount of resources estimated to be consumed by performing the service.

In yet another embodiment, service location manager 120 can select a service provider it supervises to perform a service based on information received from the service provider itself or from another service location manager (e.g., 122) that also supervises the same service provider. This information can include an indication that a particular service was started or is currently being performed by the service provider. It is appreciated that the information about the particular service can also include the amount of resources estimated to be consumed by performing the service.

It is noted that service location manager 120 and service location manager 122 can send their records to each other in a periodic or non-periodic manner shown by double arrow 75. In this fashion, if a service location manager (e.g., 120) subsequently becomes inoperable, a remaining service location manager (e.g., 122) has the information needed to assume the operational responsibility of the inoperable service location manager (e.g., 120) in a seamless manner. In this manner, fault tolerance is provided for the service location managers 120 and 122, as described in more detail below.

In the example of FIG. 17A, service location manager 120 selects service provider 130. The aforementioned service provider record is updated by service location manager 120 to reflect the selection of service provider 130. In one embodiment, the amounts of the various resources associated with service provider 130 are reduced by the estimated amount of resources expected to be used to perform the service (or the amount of resources allocated is increased).

Also, service location manager 120 sends message 3 to portal 140. Message 3 includes information sufficient for locating and contacting service provider 130. For example, message 3 can include a URL specifying service provider 130. It is noted that message 3 can include other information. For example, message 3 can also identify the item of content and/or the content source.

After receiving message 3, portal 140 sends message 4 to client device 150. Message 4 includes the information for locating and contacting the service provider 130 that was specified by message 3. It is noted that message 4 can be identical to message 3 (e.g., message 4 may be a forwarding of message 3). However, message 4 can include other (additional) information added by portal 140. For example, message 4 can also identify the item of content and/or the content source (e.g., 110) if that information is determined by portal 140 instead of service location manager 120.

In an alternate embodiment, in lieu of messages 3 and 4, service location manager 120 can send a message directly to client device 150. The message from service location manager 120 to client device 150 can include the information for locating and contacting service provider 130. The message can also include other information such as the identity of the item of content and/or the content source (e.g., 110).

In any case, client device 150 receives a message that includes information sufficient for locating and contacting service provider 130. Based on that information, communication is established between client device 150 and the service provider 130. In other words, the session initiated by client device 150 is transferred from portal 140 to service provider 130. Within one embodiment, it is noted that the transfer from portal 140 to service provider 130 is seamless and transparent to an end user at client device 150.

In one embodiment, the message received by client device 150 (e.g., message 4) uses or is based on Synchronized Multimedia Integration Language (SMIL). Redirection of client device 150 from portal 140 to service provider 130 can be accomplished using dynamic SMIL rewriting. The dynamic SMIL rewriting process can be comprised of substituting, for one or more placeholders in a template SMIL file, a URL specifying service provider 130. Rewriting of the SMIL file may be accomplished by service location manager 120 in this example. This SMIL file is then sent to the client device 150 that requested the service, either directly from service location manager 120 or via messages 3 and 4 as described above.

Continuing with the example in view of FIG. 17A, after receiving message 4 from portal 140 (or an equivalent message from service location manager 120), client device 150 sends message 5 to service provider 130. Message 5 identifies the item of content and the type of service to be performed by service provider 130. Message 5 can include other information. For example, if the content source is known at this point to client device 150, that information can be included in message 5.

Upon receiving message 5, service provider 130 sends message 6 to content source 110. As mentioned above, content source 110 can be identified to service provider 130 in message 5. Otherwise, service provider 130 can locate content source 110. In message 6, service provider 130 requests that the item of content be provided to it.

In response to message 6, content source 110 sends the item of content to service provider 130 for servicing (illustrated by arrow 7 in FIG. 17A). In one embodiment, the item of content is streamed to service provider 130.

In one embodiment, service provider 130 can always be set-up and ready to execute the specified service. That is, the specified service can be continuously executing on service provider 130, waiting for data to operate on. In another embodiment, the specified service can be quiescent until either message 5 or the item of content is received, or begins to be received, by service provider 130. That is, service provider 130 may need to set up or start up the specified service, and will not do so until the potential need for the service is identified or until content on which to perform the service has begun to arrive at service provider 130.

In any case, service provider 130 can then perform the specified service on the item of content. The item of content can be cached by service provider 130 in whole or in part before servicing, or the item of content can be serviced as it is received by service provider 130.

The service result content is then sent by service provider 130 to client device 150 (illustrated by arrow 8 in FIG. 17A). In one embodiment, the service result content is streamed to client device 150. The service result content can be cached by service provider 130 in whole or in part after servicing (before streaming), or the service result content can be streamed as it is serviced by service provider 130.

Within FIG. 17A, once the service result content has been delivered by the selected service provider (e.g., service provider 130) and received by client device 150, the ongoing session can be terminated. Accordingly, the service provider record maintained by service location manager 120 can be updated to reflect that the service provider 130 has completed its servicing tasks or that the session has been terminated. This record can also be updated to show that resources allocated to performing the service are available again. For example, the amount of resources available for performing services recorded for service provider 130 can be increased.

When a service provider (e.g., 130) is supervised by more than one service location manager (e.g., 120 and 122), it is desirable to propagate information regarding changes in status of the service provider to all supervising service location managers. Hence, in the above example, when service location manager 120 updates its record of service provider 130 to reflect that it has completed a particular service task assigned to it by service location manager 120, or that a particular session assigned to it by service location manager 120 has been terminated, it is desirable to propagate this information to service location manager 122. To accomplish this, a copy of the updated record of service location manager 120 regarding service provider 130 can be sent to service location manager 122, thereby informing service location manager 122 of the change in status of service provider 130. In this manner, the service location manager 122 is able to update its record if it also supervises service provider 130. Moreover, the transmission of this updated record from service location manager 120 to service location manager 122 can enable fault tolerance functionality, in that service location manager 122 is more fully prepared to assume the operations of service location manager 120 if the latter becomes non-responsive. Alternatively, in some embodiments, each service provider (e.g., 130) maintains a list of the service location managers (e.g., 120 and 122) that supervise it. In these embodiments, when service provider 130 completes a service task or when a session assigned to it is terminated, it may notify all service location managers (e.g., 120 and 122) that supervise it that it now has more resources available for performing services.

Different approaches can be used to prompt an update of the record of a service provider's status that is maintained by a given service location manager. In one approach with reference to the provided example, at or around the time that the service location manager 120 is making a selection of a service provider, the service location manager 120 can estimate the amount of time needed to complete the service to be performed on the item of content. The record can be updated to reflect that the service has been completed when that amount of time has passed. If service location manager 120 maintains a record of other service location managers supervising service provider 130, and if service location manager 122 is on that list, service location manager 120 may send an update of the record regarding service provider 130 to service location manager 122 when the estimated amount of time to complete the service has passed. Alternatively, for embodiments in which each service provider maintains a list of all service locations managers that supervise it, the service provider (e.g., 130) can indicate to all supervising service location managers (e.g., 120 and 122) when it has completed a service, and their respective records regarding service provider 130 can be updated accordingly. These approaches can be extended to account for the delivery of the service result content to client device 150. For example, the amount of time estimated by the service location manager 120 for service provider 130 to perform the service can be increased to account for any additional time needed by service provider 130 to send the service result content to client device 150. Similarly, service location manager 120 can estimate the length of time that the session is expected to last (e.g., if the item of content is a movie that lasts two hours, the session may be estimated as lasting about two hours). Alternatively, service provider 130 can indicate to supervising service location managers 120 and 122 when it has completed sending the service result content to client device 150. In another embodiment, service provider 130 can indicate to all supervising service location managers 120 and 122 when the sending of the service result content to client device 150 has been terminated by client device 150.

In the discussion above, the item of content is sent to service provider 130 in response to message 6. As mentioned previously herein, service provider 130 can instead store or cache content previously received and/or serviced, obviating the use of message 6 and the response to message 6 (e.g., obviating the data flow indicated by arrow 7 in FIG. 17A).

Within FIG. 17A, in one embodiment, the addition of message J from service location manager 120 to the selected service provider (e.g., 130) is shown. With reference to the present example, message J can be sent from service location manager 120 to service provider 130 at any time after message 2 and before message 5. Message J can be used for any number of different purposes. For example, in a situation in which the type of service to be performed on the specified item of content is not continuously executing on service provider 130, message J can be used to alert service provider 130 to the approaching need for the service. Consequently, the set-up and/or initiation of the service can begin and perhaps be completed before message 5 is received from client device 150, reducing overall latency.

Also, message J can be used to provide to service provider 130 the identity of the item of content and perhaps the identity of the content source 110. With this information, service provider 130 can request content source 110 to provide (e.g., begin streaming) the item of content before message 5 is received, further contributing to a reduction in latency. In addition, the use of message J in this manner can result in improved security, because the content source 110 does not have to be identified to the client device 150, for example.

Figure 17B:
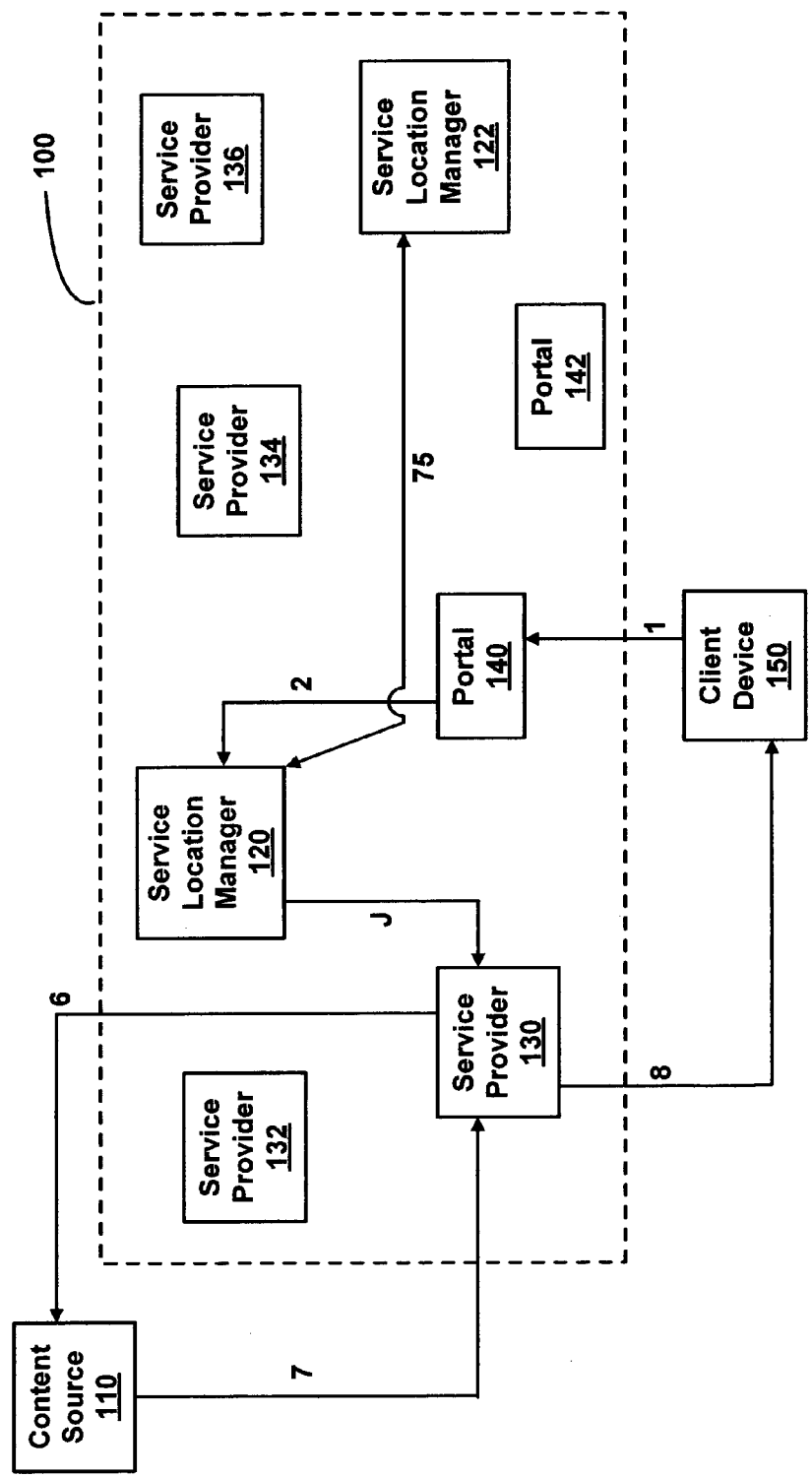
FIG. 17B is a block diagram showing information flow in and out of a system for servicing and delivering content to a client device according to another embodiment of the present invention.

Furthermore, message J can be used in lieu of messages 3, 4 and 5, as illustrated by FIG. 17b. For instance, in addition to identifying the item of content and perhaps the content source, message J can also include information enabling service provider 130 to establish communication with client device 150. In other words, instead of having client device 150 initiate the transfer of communication from portal 140 to service provider 130, the transfer of communication can be initiated by service provider 130 in a manner that can still be seamless and transparent to a user of client device 150.

Within FIG. 17A, system 100 can be implemented such that if service providers (e.g., 134 and 136) are too busy while their supervising service location manager (e.g., 122) is still able to process new service requests from a portal (e.g., 140), one or more service providers (e.g., 130) may be gained from a neighboring region supervised by another service location manager (e.g., 120). This "transfer" of one or more service providers can be facilitated if the neighboring service location managers (e.g., 120 and 122) share their updated records as shown by arrow 75.

In one embodiment, if a service provider (e.g., 134) is being supervised by two or more service location managers (e.g., 120 and 122) and it receives a new service assignment from one of them, the service provider may notify its other supervising service location manager(s) of the new service assignment. There are different ways for service providers to notify the service location managers that supervise it. For example, the service provider may immediately notify the other supervising service location manager(s) of the new service assignment. Alternatively, the service provider may include the new service assignment in its next periodic batch status notification to all of its supervising service location managers. In another embodiment, each service location manager (e.g., 122) may poll or query all of the service providers (e.g., 134 and 136) that it supervises on some periodic basis to find out their current processing loads and other status. In the response, the service provider may include the new service assignment. It is noted that with any of these notifications, a determination may be made as to whether the length of time to complete the service is less than a threshold value. If this length is less than the threshold value, the service provider may not report the assigned service since it involves so little time to complete.

Within FIG. 17A, it is noted that the new service assignment notification from a service provider (e.g., 134) to a service location manager (e.g., 120) may include an estimation of the amount of time to complete the new service assignment. However, that estimation can subsequently be expired by the service location manager once it receives a batch update from the same service provider of its current load status. Alternatively, a new service assignment notification may be issued by the service provider with a fixed expiration time. For example, a new service assignment notification may be given by the service provider along with a fixed expiration time of how long the service location manager should assume that the service provider is busy performing this service.

In one embodiment, each service location manager knows for each of its service providers the list of other service location managers that share supervision of that service provider. In this embodiment, a service location manager that dispatches a new service to a service provider may also notify the other service location managers that supervise that same service provider of this new assignment so that they can update their service provider status records accordingly.

Within system 100 of FIG. 17A, for a service provider (e.g., 130) that is supervised by multiple service location managers (e.g., 120 and 122), it is noted that status updates of the resource availability of service provider 130 may be provided to all supervising service location managers 120 and 122 in different ways. For example, service provider 130 may send a status update to one service location manager (e.g., 120), and if that service location manager 120 maintains a list of all other service location managers (e.g., 122) that supervise service provider 130, it may then provide the status update to these other supervising service location managers. Alternatively, in embodiments in which each service provider maintains a list of the service location managers that supervise it, service provider 130 may send status updates directly to all supervising service location managers 120 and 122.

Within system 100, it is noted that selection of service providers (e.g., 130, 132, 134 and 136) to be shared among multiple service location managers can be accomplished in a wide variety of ways. For example, the shared service providers can be selected at random, so that "regions" of service providers supervised by different of service location managers are well intermeshed. In another embodiment, the service providers may be divided into separate (non-overlapping) sets, with each set being supervised by each of N different service location managers, and with no service location manager that supervises service providers of one set also supervising service providers of another set. Alternatively, selection of shared service providers can be determined by probability distributions. For instance, given estimates of the distances between each of a set of service location managers and each of a set of service providers, wherein these distance estimates may be based on geographic factors, network factors, or both, the probability that a particular service provider is supervised by a given service location manager may increase with the nearness between them. Such a probability distribution is well represented by a Gaussian function of distance from the service location manager. Each service location manager can have this type of probability distribution of service providers being selected to be supervised by it. Hence, service providers that are near more than one service location manager could be assigned to be supervised by more than one service location manager.

In one embodiment of system 100, a "master" service location manager manages all of the other service location managers of system 100, by maintaining records of the processor loads of these service location managers and their network distances to other computing devices on the network. As described above, gathering of this information may be done in a hierarchical manner. In other embodiments, each service location manager communicates with the master directly. Information collected by the master service location manager may be distributed to portals (e.g., 140 and 142) for use in their processes of selecting service location managers with which to communicate. Alternatively, all portals may send their requests to the master service location manager, which forwards the requests down a hierarchy toward service location managers with the most processing capacity, or which are best positioned according to the network distance records of the service location managers to client devices and content sources involved in the service request, to handle assignment of the request.

Figure 18:
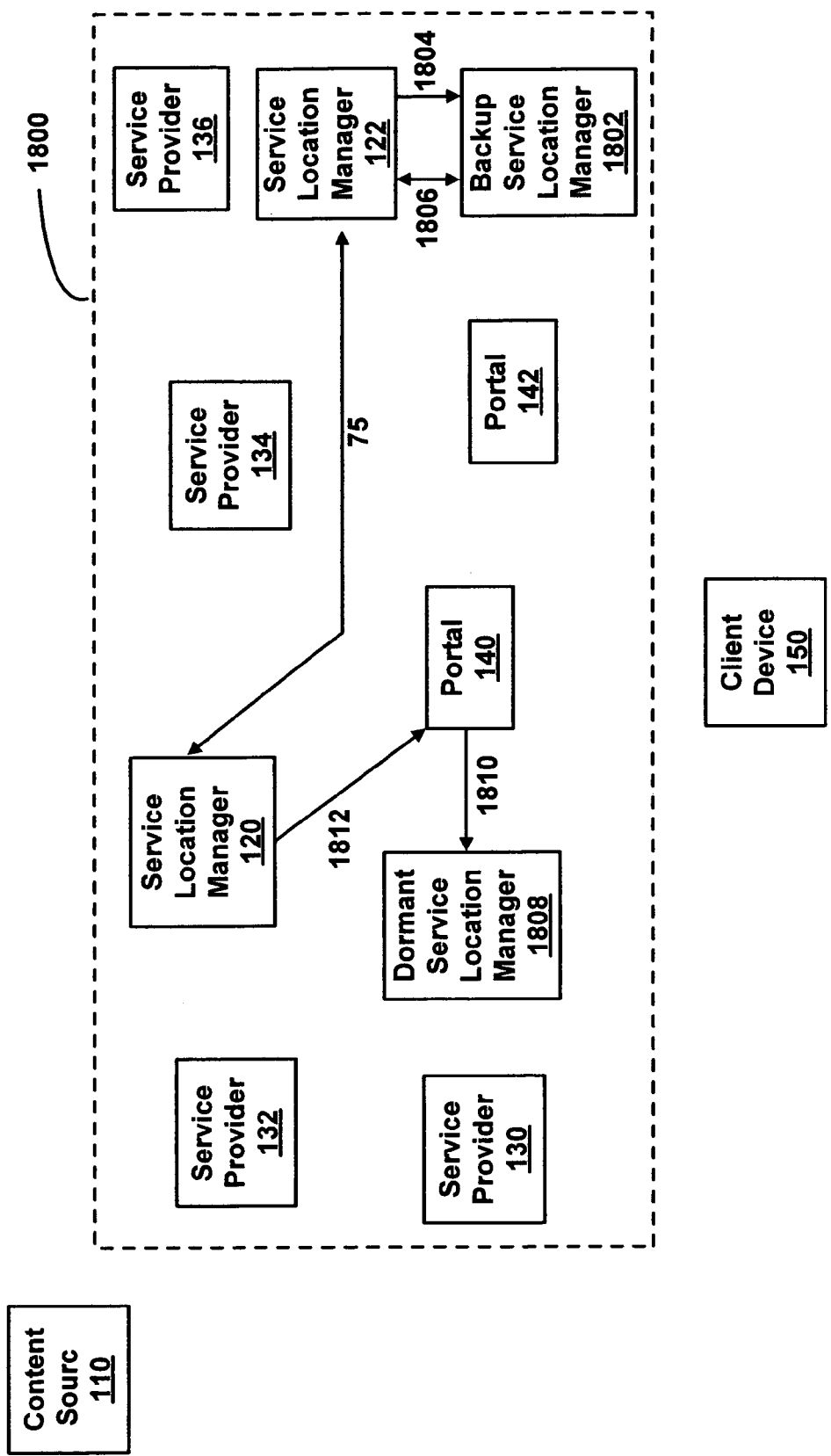
FIG. 18 is a block diagram of a system for servicing content in accordance with an embodiment of the present invention.

FIG. 18 is a block diagram of a system 1800 for servicing content from a content source 110 and for delivering the service result content to a client device 150 in accordance with an embodiment of the present invention. Specifically, system 1800 includes functions and components for implementing fault tolerance for service location managers 120 and 122. It is noted that the components of FIG. 18 having the same reference numbers as FIG. 17A can operate in a similar manner. However, there are some differences.

For example, as shown within system 1800, fault tolerance for the service location manager 122 can be provided through a backup service location manager 1802. As such, whenever the service location manager 122 updates its record(s) as described herein, service location manager 122 may send the updated records to the backup service location manager 1802 as shown by arrow 1804. Part of the functionality of backup service location manager 1802 may be to occasionally or periodically check on the operating status of service location manager 122 as shown by double arrow 1806. If backup service location manager 1802 determines that service location manager 122 is non-responsive or inoperable, backup service location manager 1802 is able to take over the operations of service location manager 122 since it has the updated record(s) from service location manager 122 along with the knowledge (e.g., pre-stored) of which service providers (e.g., 134 and 136) service location manager 122 supervised. Additionally, when backup service location manager 1802 has knowledge (e.g., pre-stored, or obtained from notifications received from other service location managers or portals) of the list of portals (e.g., 142) that may attempt to communicate with service location manager 122, backup service location manager 1802 may notify these portals that they should begin communicating with backup service location manager 1802 instead of with service location manager 122. Furthermore, upon assuming the operations of service location manager 122, backup service location manager 1802 may recruit its own backup service location manager (not shown) and start providing its updated record(s) to it. In this manner, backup service location manager 1802 can provide fault tolerance for service location manager 122. In some embodiments, backup service location manager 1802 may not only be a backup, but instead may actively service requests from portals before taking over the operations of service location manager 122 when it is found to be non-responsive. It is noted that all other service location managers (e.g., 120) of system 1800 could be implemented with a backup service location manager similar to backup service location manager 1802.

It is noted that other service location managers similar to backup service location manager 1802 can be "chained" together in order to provide further redundant fault tolerance. For example, the other service location managers could be chained together such that the active service location manager 122 would just update the next other service location manager (e.g., 1802) in line and it would update the next one and so on. Alternatively, the other service location managers could be chained together and operate so that the active service location manager 122 could update two or more other service location managers and those service location managers could update two or more other service location managers and so forth. In another embodiment, the active service location manager 122 would just update a first backup service location manager 1802. Then if the active service location manager 122 became inoperable, the first backup service location manager 1802 would become the active service location manager and it would begin updating the following, second backup service location manager in the chain. For all of the above examples, it is noted that the other service location managers may be active and able to handle service requests from portals at all times that system 1800 is operational, instead of merely serving as backups.

Within FIG. 18, another fault tolerance included within system 1800 is dormant or inactive service location manager 1808. Specifically, a portal (e.g., 140 or 142) that interacts with service location manager 120 can determine whether it is inoperable or non-responsive. If so, the portal (e.g., 140) is able to contact dormant service location manager 1808 shown by arrow 1810 in order to trigger it to start operating as the service location manager for the region previously supervised by service location manager 120. It is noted that the service location manager functionality would already be a part of dormant service location manager 1808, but this functionality has been inactive, or dormant service location manager 1808 has been operating in another function. Additionally, the dormant service location manager 1808 would have knowledge of the service providers (e.g., 130 and 132) that it is to supervise in order to assume the operations of service location manager 120. In one embodiment, before service location manager 120 becomes inoperable, service location manager 120 can be implemented such that it sends its updated record(s) to one or more portals (e.g., 140) shown by arrow 1812. Therefore, once portal 140 determines that service location manager 120 is inoperable, portal 140 is also able to provide dormant service location manager 1808 the updated record(s) of service location manager 120 shown by arrow 1810. It is appreciated that this functionality can be incorporated with one or more embodiments of the present invention described herein.

Figure 19:
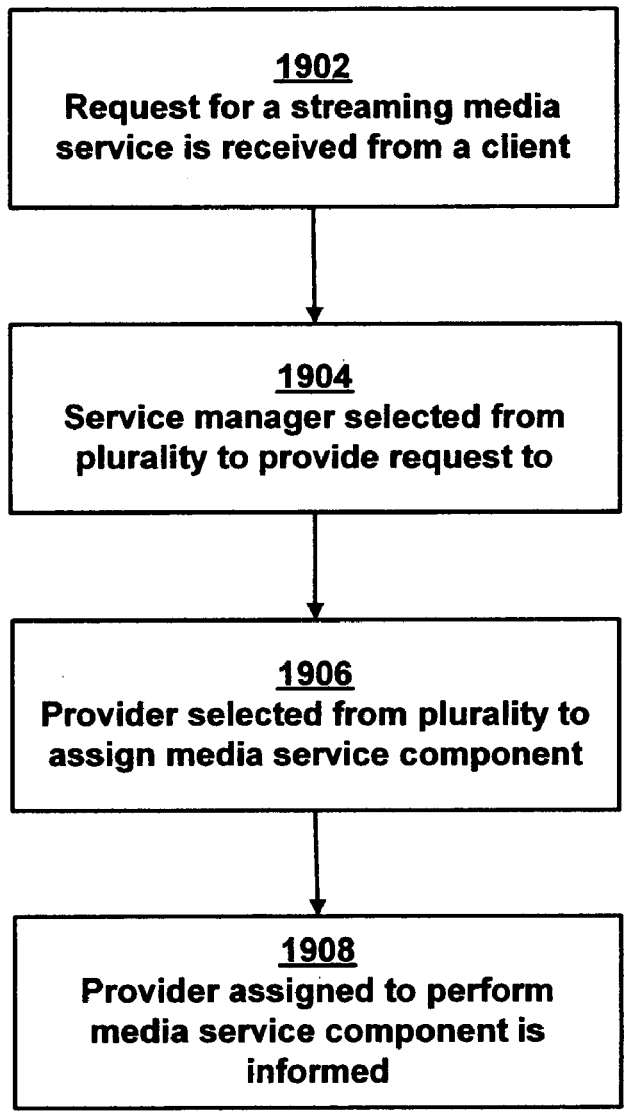
FIG. 19 is a flowchart of operations performed in accordance with an embodiment of the present invention for managing a streaming media service.

FIG. 19 is a flowchart 1900 of operations performed in accordance with an embodiment of the present invention for managing a streaming media service. Flowchart 1900 includes exemplary processes of embodiments of the present invention that can be carried out by a processor(s) and electrical components under the control of computer readable and computer executable instructions. The computer readable and computer executable instructions may reside, for example, in data storage features such as computer usable volatile memory, computer usable non-volatile memory and/or computer usable mass data storage. However, the computer readable and executable instructions may reside in any type of computer readable medium. Although specific operations are disclosed in flowchart 1900, such operations are exemplary. That is, the present embodiment is well suited to performing various other operations or variations of the operations recited in FIG. 19. It is noted that the operations of flowchart 1900 can be performed by software, by firmware, by hardware or by any combination thereof.

At operation 1902, a request for a streaming media service is received from a client wherein the streaming media service includes a media service component. It is noted that operation 1902 may be implemented in any manner similar to that described herein, but is not limited to such.

At operation 1904 of FIG. 19, a service location manager to which to provide the request is selected from a plurality of service location managers. It is appreciated that operation 1904 may be implemented in any manner similar to that described herein, but is not limited to such.

At operation 1906, a service provider to which to assign the media service component is selected from a plurality of service providers of a network. It is understood that operation 1906 may be implemented in any manner similar to that described herein, but is not limited to such.

At operation 1908 of FIG. 19, the service provider selected to perform the media service component is informed of its assignment, therein enabling the requested streaming media service to be performed on streaming media. It is noted that operation 1908 may be implemented in any manner similar to that described herein, but is not limited to such.

The foregoing descriptions of specific embodiments of the present invention have been presented for purposes of illustration and description. They are not intended to be exhaustive or to limit the invention to the precise forms disclosed, and it is evident many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for managing a streaming media service, said method comprising:

receiving a request for a streaming media service from a client, said streaming media service comprising a media service component;

selecting a service location manager to which to provide said request from a plurality of service location managers, said service location manager configured for selecting a service provider from a plurality of service providers;

selecting said service provider to which to assign said media service component from a plurality of service providers of a network;

informing said service provider of said assignment to perform said media service component, causing said service provider to prepare to perform said streaming media service on streaming media;

using information at said service location manager to determine whether to initiate a handoff of said streaming media service from said service provider to another service provider without altering said streaming media service; and if it is determined to initiate said handoff, initiating said handoff to said another service provider such that said streaming media service to said client is not interrupted.

2. The method as recited in claim 1, wherein said information comprises information received from said service providers and information associated with location and priority of said service providers.

3. The method as recited in claim 1, wherein said information comprises information received from any client device that is involved in said streaming media service.

4. The method as recited in claim 1, wherein said information comprises information associated with network conditions.

5. The method as described in claim 1, wherein said selecting said service location manager comprises:
maintaining a record comprising identifying information for a set of service location managers among said plurality of service location managers; and
selecting said service location manager in a round robin manner from said record.

6. The method as described in claim 1, wherein said selecting said service location manager comprises a comparison of available resources of a first set of service providers supervised by a first service location manager and available resources of a second set of service providers supervised by a second service location manager.

7. The method as described in claim 1, wherein said selecting said service location manager comprises a comparison of processing loads of at least two service location managers among said plurality of service location managers.

8. The method as described in claim 1, wherein said selecting said service location manager is based on an estimate of a network communication condition between two entities connected by the network.

9. The method as described in claim 1, further comprising:
notifying a second service location manager among said plurality of service location managers of the assignment of said service provider to perform said media service component.

10. The method as described in claim 1, wherein said service provider is supervised by more than one service location manager among said plurality of service location managers.

11. The method as described in claim 10, further comprising:
maintaining a record comprising identifying information of a set of service location managers among said plurality of service location managers, each service location manager of said set of service location managers supervising said service provider; and
notifying said set of service location managers according to said record of said assignment of said service provider to perform said media service component.

12. The method as described in claim 1, further comprising:
receiving resource availability information from said plurality of service providers, wherein said information is ascertained from ongoing resource measurements; and
said selecting said service provider based on said resource availability information.

13. The method as described in claim 12, wherein said resource availability information is pushed from said plurality of service providers.

14. The method as described in claim 12, wherein said receiving resource availability information occurs in response to polling of said service providers.

15. The method as described in claim 1, wherein said selecting said service provider is based on static service provider information or static network information.

16. The method as described in claim 15, wherein said static service provider information or static network information consists of at least one of the following: information concerning computational and memory resources, connectivity and expected bandwidth and latency between servers, client and content addresses, session dispatch history, and network proximity.

17. The method of claim 1, wherein said selecting said service provider comprises:
maintaining a record comprising assignments of service providers to perform media service components; and
said selecting said service provider based on said record.

18. The method of claim 1, wherein said selecting said service provider comprises:
maintaining a record comprising assignments of service providers to perform media service components;
receiving resource availability information from said plurality of service providers, wherein said information is ascertained from ongoing resource measurements; and
said selecting said service provider based on said resource availability information and said record.

19. The method as described in claim 1, wherein said selecting said service provider is based on an estimate of resources associated with performing said service.

20. A computer-readable medium comprising computer-executable instructions stored therein for implementing a method for managing a streaming media service, said method comprising:
receiving a request for a streaming media service from a client, said streaming media service comprising a media service component;
selecting a service location manager to which to provide said request from a plurality of service location managers, said service location manager configured for selecting a service provider from a plurality of service providers;
selecting said service provider to which to assign said media service component from a plurality of service providers of a network;
informing said service provider of said assignment to perform said media service component, causing said service provider to prepare to perform said streaming media service on streaming media; and
using information at said service location manager to determine whether to initiate a handoff of said streaming media service from said service provider to another service provider without altering said streaming media service, such that said streaming media service to said client will not be interrupted.

21. The computer-readable medium of claim 20, wherein said information comprises information received from said plurality of service providers and information associated with location and priority of service providers.

22. The computer-readable medium of claim 20, wherein said information comprises information received from any client device that is involved in said streaming media service.

23. The computer-readable medium of claim 20, wherein said method further comprising:
notifying a second service location manager among said plurality of service location managers of the assignment of said service provider to perform said media service component.

24. The computer-readable medium of claim 23, wherein said notifying is performed by said service provider or said service location manager.

25. The computer-readable medium of claim 20, wherein said method further comprising:
  receiving resource availability information from said plurality of service providers, wherein said information is ascertained from ongoing resource measurements; and
  said selecting said service provider based on said resource availability information.

26. The computer-readable medium of claim 25, wherein said resource availability information is poll-based information or push-based information.

27. A system for providing streaming content to a client device, said system comprising:
  a plurality of service location managers, each service location manager capable of managing a handoff of a service based on information received;
  a plurality of service providers, each service provider capable of performing said service on an item of streaming input content to produce said streaming content; and
  a portal providing a first point of contact for said client device, said portal for receiving from said client device a request for performance of said service on said item of streaming input content, said portal for selecting a service location manager to which to provide said request from said plurality of service location managers, said service location manager for receiving said request from said portal and for selecting a service provider from said plurality of service providers and informing said service provider of said assignment to perform said service on said streaming input content to produce said streaming content, wherein said service location manager uses information to determine whether to initiate a handoff of said service from said service provider to another service provider without altering said streaming media service, such that said streaming media service to said client will not be interrupted.

28. The system of claim 27, wherein said information includes information received from said service providers.

29. The system of claim 27, wherein said information includes information received from said client device.

30. The system of claim 27, wherein said information includes information associated with network conditions.

31. The system of claim 27, wherein said portal maintains a record comprising a prioritized listing of at least one service location manager among said plurality of service location managers and selects said service location manager in order of priority according to said prioritized listing.

32. The system of claim 27, wherein said portal selects said service location manager by comparing available resources of a first set of service providers supervised by said service location manager and available resources of a second set of service providers supervised by a second service location manager.

33. The system of claim 27, wherein said portal selects said service location manager based on an estimate of a network communication condition between two entities connected by the network.

34. The system of claim 27, wherein said service provider or said service location manager notifies a second service location manager among said plurality of service location managers of said assignment of said service provider to perform said service.

35. The system of claim 27, wherein said portal activates a second service location manager of said plurality of service location managers to perform the operation of said service location manager, provided said portal determines said service location manager to be non-responsive.

36. The system of claim 27, wherein said service provider is supervised by more than one service location manager of said plurality of service location managers.

37. The system of claim 27, wherein said service provider is supervised by a first service location manager, and wherein said first service location manager transfers supervision of said service provider to a second service location manager.

38. The system of claim 27, wherein said service location manager receives resource availability information from said plurality of service providers, and wherein said selecting said service provider is based on said resource availability information.

39. The system of claim 27, wherein said service location manager maintains a record comprising assignments of service providers to perform services, and wherein said selecting said service provider is based on said record.

40. The system of claim 27, wherein said service location manager selects said service provider based on static service provider information or static network information.

* * * * *